(12) United States Patent
Hogg et al.

(10) Patent No.: US 11,568,455 B2
(45) Date of Patent: Jan. 31, 2023

(54) SYSTEM AND METHODS FOR VULNERABILITY ASSESSMENT AND PROVISIONING OF RELATED SERVICES AND PRODUCTS FOR EFFICIENT RISK SUPPRESSION

(71) Applicant: Aon Risk Consultants, Inc., Chicago, IL (US)

(72) Inventors: Jason Hogg, Bedford, NY (US); Nicholas Dan, Chicago, IL (US); Jeffrey Bolas, Brooklyn, NY (US); Christopher Uriarte, Fort Lauderdale, FL (US); Adam Peckman, London (GB); Mani Dhesi, London (GB); Cory Allen Moreira, Palm Harbor, FL (US)

(73) Assignee: AON RISK CONSULTANTS, INC., Chicago, IL (US)

( * ) Notice: Subject to any disclaimer, the term of this patent is extended or adjusted under 35 U.S.C. 154(b) by 197 days.

(21) Appl. No.: 16/781,072

(22) Filed: Feb. 4, 2020

(65) Prior Publication Data

US 2021/0004878 A1    Jan. 7, 2021

Related U.S. Application Data

(63) Continuation of application No. 16/263,607, filed on Jan. 31, 2019, now Pat. No. 10,592,938.

(Continued)

(51) Int. Cl.
*H04L 29/06*    (2006.01)
*G06Q 30/02*    (2012.01)
(Continued)

(52) U.S. Cl.
CPC ..... *G06Q 30/0282* (2013.01); *G06F 16/9537* (2019.01); *G06Q 30/0641* (2013.01);
(Continued)

(58) Field of Classification Search
CPC . H04L 63/1433; H04L 63/0209; H04L 63/20; H04L 63/1425; H04L 63/145; H04L 63/10
(Continued)

(56) References Cited

U.S. PATENT DOCUMENTS

| 3,571,900 A | 3/1971 | Hardesty et al. |
| 7,584,508 B1 | 9/2009 | Kashchenko et al. |

(Continued)

FOREIGN PATENT DOCUMENTS

| CN | 111971658 | 11/2020 |
| EP | 3746891 | 12/2020 |
| WO | 2019152710 | 8/2019 |

OTHER PUBLICATIONS

International Preliminary Report on Patentability issued in PCT Application No. PCT/US2019/016147 dated Aug. 13, 2020.
(Continued)

*Primary Examiner* — Longbit Chai
(74) *Attorney, Agent, or Firm* — Gardella Grace P.A.

(57) ABSTRACT

In an illustrative embodiment, systems and methods for cyber vulnerability assessment include obtaining assessment data including information pertaining to domains of cyber security vulnerability of an enterprise and, for each security domain, a respective domain-level vulnerability score, identifying risk(s) relevant to the enterprise based on domain-level vulnerability score(s), identifying recommended products or services for mitigating each of the risks, and preparing a graphical user interface for selecting a portion of the recommended products or services. A user may select one or more products or services through the user interface for purchase and/or deployment planning. The domain-level vulnerability scores may be compared to peer vulnerabilities scores, target vulnerability scores, or prospective vulnerabil-
(Continued)

ity scores based upon application of certain recommended products or services.

20 Claims, 37 Drawing Sheets

Related U.S. Application Data

(60) Provisional application No. 62/690,512, filed on Jun. 27, 2018, provisional application No. 62/624,575, filed on Jan. 31, 2018.

(51) Int. Cl.
*G06F 16/9537* (2019.01)
*G06Q 30/06* (2012.01)
*H04L 9/40* (2022.01)

(52) U.S. Cl.
CPC ...... *H04L 63/1433* (2013.01); *H04L 63/0209* (2013.01); *H04L 63/20* (2013.01)

(58) Field of Classification Search
USPC .......................................................... 726/25
See application file for complete search history.

(56) References Cited

U.S. PATENT DOCUMENTS

| | | | |
|---|---|---|---|
| 9,294,498 | B1 | 3/2016 | Yampolskiy et al. |
| 9,648,036 | B2* | 5/2017 | Seiver ................ H04L 41/0853 |
| 10,592,938 | B2 | 3/2020 | Hogg et al. |
| 2004/0006704 | A1 | 1/2004 | Dahlstrom et al. |
| 2004/0230506 | A1 | 11/2004 | Casco-Arias et al. |
| 2005/0065807 | A1 | 3/2005 | DeAngelis et al. |
| 2007/0067846 | A1 | 3/2007 | McFarlane et al. |
| 2008/0183506 | A1 | 7/2008 | Mamorsky |
| 2009/0024663 | A1 | 1/2009 | McGovern |
| 2011/0138471 | A1 | 6/2011 | Van de Weyer et al. |
| 2013/0144659 | A1 | 6/2013 | McLaughlin et al. |
| 2013/0227697 | A1 | 8/2013 | Zandani |
| 2014/0137257 | A1 | 5/2014 | Martinez et al. |
| 2014/0173739 | A1 | 6/2014 | Ahuja et al. |
| 2015/0356477 | A1 | 12/2015 | Milkman et al. |
| 2015/0381649 | A1 | 12/2015 | Schultz et al. |
| 2016/0234247 | A1 | 8/2016 | Ng et al. |
| 2016/0248800 | A1 | 8/2016 | Ng et al. |
| 2016/0373478 | A1 | 12/2016 | Doubleday et al. |
| 2017/0046519 | A1 | 2/2017 | Cam |
| 2017/0279843 | A1 | 9/2017 | Schultz et al. |
| 2018/0124091 | A1 | 5/2018 | Sweeney et al. |
| 2018/0124114 | A1 | 5/2018 | Woods et al. |
| 2018/0146004 | A1 | 5/2018 | Belfiore, Jr. et al. |
| 2018/0270265 | A1 | 9/2018 | Sage |
| 2019/0138512 | A1 | 5/2019 | Pourmohammad et al. |
| 2019/0236661 | A1 | 8/2019 | Hogg et al. |
| 2020/0106801 | A1 | 4/2020 | Evans |
| 2020/0252423 | A1 | 8/2020 | Hogg |

OTHER PUBLICATIONS

International Search Report and Written Opinion issued in International Application No. PCT/US2020/015705 dated Apr. 27, 2020.
International Preliminary Report on Patentability issued in PCT Application No. PCT/US2020/015705 dated Jul. 27, 2021, 7 pages.
Supplementary European Search Report issued in European application No. 19747325.9 dated Nov. 20, 2020, 8 pages.
Extended European Search Report mailed in European Application No. 20748609.3 dated Mar. 11, 2022, 9 pages.
Eling, M. & Schnell, W., What do we know about cyber risk and cyber risk insurance? The Journal of Risk Finance, 17(5), 2016, pp. 474-491.
International Search Report and Written Opinion issued in International Application No. PCT/US2019/016147 dated Apr. 25, 2019.
Non-Final Office Action issued in U.S. Appl. No. 16/263,607 dated Apr. 8, 2019.
Final Office Action issued in U.S. Appl. No. 16/263,607 dated Aug. 7, 2019.
Notice of Allowance issued in U.S. Appl. No. 16/263,607 dated Nov. 6, 2019.

* cited by examiner

Cyber Resilience Evaluation 400

Your Cyber Resilience Evaluation submitted on 2017-12-01 is in progress. Please allow up to one week for your custom Report to be made available.

View Evaluation Score 405

- About Your Company 402 — 100% Complete (418a)
- Critical Data in Systems 404 — 100% Complete (418b)
- Data Security 406 — 100% Complete (418c)
- Identity and Access Management 408 — 100% Complete (418d)
- Endpoint & Security Systems 410 — 100% Complete (418e)
- Cloud/Network Security 412 — 100% Complete (418f)
- Physical Security 414 — 100% Complete (418g)
- Application Security 416 — 100% Complete (418h)

Offline javascript:void(0)

FIG. 4A

Cyber Resilience Evaluation — 420

- Critical Systems and Data — 9 Questions — 430a
- Data Security — 22 Questions — 430b
- Identity and Access Management — 9 Questions — 430c
- Endpoint Protection — 19 Questions — 430d
- Network Security — 7 Questions — 430e
- Physical Security — 7 Questions — 430f
- Application Security — 7 Questions — 430g
- Third Party — 5 Questions — 430h
- Business Resilience — 11 Questions — 430i (Each shown at 0%)

424

426 — Critical Systems and Data - Architecture

Architecture | Sensitive and Confidential Data | Detection and Response

428

Number of in-house Data Centres: — 432

[ Next ]

Number of external Data Centres (i.e. Off Prem, Cloud, Co- Locations): — 434

Business Critical Applications (check all that apply) — 436
- ☐ Payment Process
- ☐ Finance (Payroll, Accounts Payable)
- ☐ Human Resources (HR)
- ☐ Enterprise Resource Planning (ERP)/Supply Chain Management
- ☐ Customer Relationship Management (CRM)
- ☐ None of the above Comments

Industry Control Systems and Internet of Things (check all that apply) — 438
- ☐ Supervisory Control and Data Acquisition (SCADA) Systems
- ☐ Distributed Control Systems (DCS)
- ☐ Programmable Logic Controllers (PLC)
- ☐ None of the above Comments

CYBER IQ

750

Select Framework [Security Domain ▼]

Model Recommendations

Show Recommendations
- Ignored

Security Domains: 744c
- Data ③
- Identity & Access ⑫
- Network & Cloud ⑧
- Endpoint & Systems ⑨
- Physical Spaces ⑨
- Applications ⑮
- Third Party ⑫
- Business Resilience ②

Refine Recommendations

Urgency
- ☐ High
- ☐ Medium
- ☐ Low
- ☐ None

Type:
- ☐ Strategic
- ☐ Tactical

Impact:
- ☐ 0-5 Risks Mitigated
- ☐ 6-10 Risks Mitigated
- ☐ 11-20 Risks Mitigated
- ☐ 21-35 Risks Mitigated
- ☐ 35+ Risks Mitigated

Requirements:
- ☐ Compliance
- ☐ Regulations

Groupings:

Recommendations: All — 754a — 756a — 766

Data Mitigates 15 Risks · Has 3 Dependencies — 752a

Define an encryption policy which outlines requirements for encrypting data-at-rest/data-in-transit while dealing with sensitive information. Implement encryption uniformly across all sensitive data stores on premise and on AWS.

[Ignore] [Apply] — 760a / 754b — 756b
758a

Data Mitigates 12 Risks · Has 2 Dependencies — 752b

Define a Data Classification policy which classifies both structured and unstructured data stored and handled in the environment.

[Ignore] [Apply] — 760b / 754c — 756c
758b

Network & Cloud Mitigates 12 Risks · Has 2 Dependencies — 752c

Set up URL filtering and DNS filtering to monitor Web/DNS traffic in order to minimize potential for malicious events.

[Ignore] [Apply] — 760c
758c

Identity & Access Mitigates 12 Risks · Has 2 Dependencies

PLAN BUILDER

⊙ Current score, 0 applied recommendations.

68 ⟶ 72 — 768

Modeled score with 1 applied recommendation

Identity & Access
Mitigates 12 Risks · Has 2 Dependencies

Implement individual accounts for all shared services. Use of shared accounts must be strongly discouraged.

1300 → Attack Vector Relevance Matrix:

$$\begin{bmatrix} R_1 & R_2 & R_3 & R_4 & \ldots & R_m \end{bmatrix}$$

FIG. 13A

1302 → Vectors to Adjust for:

$$\begin{bmatrix} V_1 & V_2 & V_3 & V_4 & \ldots & V_m \end{bmatrix}$$

FIG. 13B

1304 → Sensitivity, by Domain and Vector Matrix:

$$\begin{pmatrix} S_{1,1} & S_{1,2} & S_{1,3} & S_{1,4} & \ldots & S_{1,n} \\ S_{2,1} & S_{2,2} & S_{2,3} & S_{2,4} & \ldots & S_{2,n} \\ S_{3,1} & S_{3,2} & S_{3,3} & S_{3,4} & \ldots & S_{3,n} \\ \vdots & & & & & \\ S_{m,1} & S_{m,2} & S_{m,3} & S_{m,4} & \ldots & S_{m,n} \end{pmatrix}$$

Domain-by-Domain Adjustment Data:

$$\begin{pmatrix} A_1 & A_2 & A_3 & A_4 & \ldots & A_n \end{pmatrix}$$

Target Data:

$$\begin{pmatrix} T_1 & T_2 & T_3 & T_4 & \ldots & T_n \end{pmatrix}$$

Adjusted Target Data:

$$\begin{pmatrix} AT_1 & AT_2 & AT_3 & AT_4 & \ldots & AT_n \end{pmatrix}$$

Controls Matrix:

$$[\, C_1 \;\; C_2 \;\; C_3 \;\; C_4 \;\; \ldots \;\; C_q \,]$$

Vector Sensitivity to Control Matrix:

$$\begin{pmatrix} S_{1,1} & S_{1,2} & S_{1,3} & S_{1,4} & \ldots & S_{1,m} \\ S_{2,1} & S_{2,2} & S_{2,3} & S_{2,4} & \ldots & S_{2,m} \\ S_{3,1} & S_{3,2} & S_{3,3} & S_{3,4} & \ldots & S_{3,m} \\ \vdots \\ S_{q,1} & S_{q,2} & S_{q,3} & S_{q,4} & \ldots & S_{q,m} \end{pmatrix}$$

Vector Relevance Adjustment Matrix:

$$[\, A_1 \;\; A_2 \;\; A_3 \;\; A_4 \;\; \ldots \;\; A_m \,]$$

FIG. 14D

Consultant Dashboard

◊ IN PROCESS  ⌂ SUBMITTED  ▭ FINAL  ✉ CYQU INVITATION

Submitted

[Type to filter results...]

| Username | Assessment Type | Start Date | Submit Date | Final Date |
|---|---|---|---|---|
| aahmed@strozfriedberg.com | INS | 10/09/2018 | 10/09/2018 | |
| aigtest10@abc.com | INS | 10/08/2018 | 10/08/2018 | |
| aigtest1008@abc.com | INS | 10/08/2018 | 10/08/2018 | |
| testaig1@abc.com | INS | 10/03/2018 | 10/03/2018 | |

Download Assessment
Upload Final Report
Consultant Feedback —— 1830
Preview Final Report
Send to In Process

SYSTEM AND METHODS FOR VULNERABILITY ASSESSMENT AND PROVISIONING OF RELATED SERVICES AND PRODUCTS FOR EFFICIENT RISK SUPPRESSION

RELATED APPLICATIONS

This application is a continuation of and claims priority to U.S. patent application Ser. No. 16/263,607 entitled "System and Methods for Vulnerability Assessment and Provisioning of Related Services and Products for Efficient Risk Suppression," filed Jan. 31, 2019, which claims priority to U.S. Provisional Patent Application Ser. No. 62/690,512 entitled "Systems and Methods for Vulnerability Assessment and Provisioning of Related Services" and filed Jun. 27, 2018; and U.S. Provisional Patent Application Ser. No. 62/624,575, entitled "System and Methods for Vulnerability Assessment and Provisioning of Related Services," filed Jan. 31, 2018. All above identified applications are hereby incorporated by reference in their entireties.

BACKGROUND

Cybersecurity risk relates, in some examples, to losses arising from compromise of sensitive data (e.g., payment data held by merchant or medical data held by health care providers), computer system penetration, compromise of personal information related to identity fraud, and eventualities of the like. These sorts of losses can arise from malefactors who adjust their actions in response to present-tense environmental variables governing opportunity: newly discovered exploits, recent trends in cyber security, and so on. Assessment of cyber security risk has heretofore relied heavily upon human capital, resulting in subjective risk assessments based upon individual experts' methods and professional background. Consequently, the factors that are significant in cyber risk assessment of an individual or an entity's systems, properties and facilities change rapidly, but their risk assessment continues to be performed by individuals and is therefore performed with a level of expertise that can be no better than the particular individual assigned to the task. Moreover, as risk factors emerge in one industry, knowledge of those factors tends to remain confined to professionals within that industry, leaving other industries vulnerable, and rendering the vulnerability assessments performed in those other industries under-informed.

An additional complicating matter in the marketplace for cyber risk assessment and mitigation is that third party services available for assisting an individual or enterprise in managing cybersecurity risk must be found and subscribed to on an individual basis. For example, an individual may seek out services to detect and prevent identity fraud, or to determine whether his or her personal information is already compromised and published on the dark web. A small or medium size business may, for example, seek secure managed virtual private network (VPN) services. These sorts of service are sold individually, and a consumer must hunt and peck from website-to-website to understand the array of offerings, and intelligently select from among them. Additionally, this hunt-and-peck process carries with it the possibility that a service provider or insurer loses the opportunity to provide services to a would-be client, in the event that the client leaves the provider's website to seek out companion services published elsewhere. It also raises the prospect that an insurer or service provider may be ignorant of one or more of the risk suppression services its client imposes because the service was subscribed to via another vendor, where the transaction was "out of sight" of the insurer or service provider.

There exists a need for risk assessment that is not beholden to individual subjective judgment, elimination of delays in identifying potential service providers and insurers for protecting against cybersecurity risk, and elimination of the present-day hunt-and-peck process for locating risk suppression services.

Additionally, it may be the case that the operator of the platform desires to assess the risk of users or the organizations they represent vis-à-vis more than one variety of hazard. For example, in addition to assessing cyber security risks, the operator of the platform may desire to assess the risk of the user or the organization he represents with regard to violation of a regulatory framework such as the European Union's General Data Protection Regulation or the United States' Health Insurance Portability and Accountability Act. It is inefficient to have to reprogram the platform to attend to each of these various hazards.

There exists a need to suppress database call load in such contexts and to allow for such platforms to be refocused from hazard to hazard while reducing the programming effort required for such refocusing.

SUMMARY OF ILLUSTRATIVE EMBODIMENTS

In one aspect, the present disclosure relates to a platform and methods for cyber security vulnerability assessment and management. The platform and methods may enable an automated or semi-automated cyber security resilience evaluation. Scoring for the evaluation may be performed to identify risks or exposures of an enterprise's information technology (IT) systems to various cyber security threats. The assessment provided by the platform and methods may include a graphical display enabling an end user to identify weaknesses across a number of security domains. Further, security sub-domain assessments may direct users to specific areas needing improvement. The enterprise may be assessed in view of a target vulnerability rating and/or peer benchmark vulnerability ratings to enable visual comparison of the enterprise's present state. Further, the platform and methods may provide one or more recommendations for mitigating one or more cyber security risks including, in some examples, products, services, and insurance policies. The user may be presented with a prospective vulnerability score representing an improvement in score upon applying one or more remedies.

In one aspect, the present disclosure relates to a platform and methods for recommending and enabling cyber security risk mitigation to mitigate cyber security vulnerabilities identified through automated or semi-automated assessment of the IT systems of enterprises. The platform and methods may provide information regarding products, services, and/or insurance policies designed to remedy one or more deficiencies in cyber security resilience in an enterprise's IT systems. Further, the platform and methods may supply purchase mechanisms for adding the recommended product(s), service(s), and/or policy(ies) to the enterprise's infrastructure. The purchase mechanisms may include federating one or more third party providers to integrate sales between the user and the third party through the platform. A user of an interactive cyber security assessment tool, in some embodiments, is presented with an interactive roadmap display for selecting, planning, and budgeting for applying a series of remedies to the IT infrastructure of the enterprise.

Certain remedies may include dependent remedies (e.g., dependencies) which are related to and depend upon the application of a set of one or more additional remedies to mitigate one or more risks. The interactive roadmap display may include a timeline and prioritization of laying out a plan of application of multiple remedies.

In one aspect, the present disclosure relates to a platform and methods for presenting an interactive cyber vulnerability assessment to a user including cyber security evaluation questions presented in a number of security domains. The interactive cyber vulnerability assessment may be presented through a browser interface. The graphical user interface for the cyber vulnerability assessment may be built through parsing a document containing a set of interlinked data matrices containing information for the security domains, questions, response controls for each question, and score information corresponding to each potential response. Further, the document may include one or more matrices for storing responses and other progress information related to a user interacting with the cyber vulnerability assessment. The interactive cyber vulnerability assessment, in some embodiments, may be accessed and re-accessed by one or more users, with user progress stored within the matrices of the document for population of the interactive cyber vulnerability assessment upon future access. One user may include an expert or evaluator, presented with additional controls by the platform and methods for adding feedback or comments within a completed assessment questionnaire. The document including the completed questionnaire information and expert commentary may be used to generate a graphical report for review by an enterprise. The report may be interactive (e.g., presented via a browser).

In one aspect, the present disclosure relates to a platform and methods for evaluating cyber security risks and vulnerability scoring based upon real life outcomes of enterprises having cyber vulnerability assessment information as well as cyber insurance claims information collected by a platform and methods for cyber security vulnerability assessment. The platform and/or methods may access incident data regarding cyber attacks as well as scores calculated for the enterprise involved in each cyber attack and analyze the information to determine target vulnerability scores for avoidance of future cyber attacks in other enterprises.

In some embodiments, a system for collecting and managing cybersecurity assessment information using an interactive questionnaire includes a document including: a security domain matrix including a number of domain fields arranged for storing information regarding a number of security domains, where the number of domain fields includes, for each domain of the number of security domains, a progress field for collecting and storing a progress of a user of the interactive questionnaire through a respective section a number of sections of the interactive questionnaire corresponding to a respective security domain of the number of security domains; a questions matrix including a number of questions fields arranged for storing information regarding a number of questions, each question logically linked to a respective security domain of the number of security domains of the security domain matrix, where for each question of the number of questions, the number of questions fields includes at least one text string containing a question for presentation to a user of the interactive questionnaire, and at least one response control type of a number of response control types for presentation to the user of the interactive questionnaire for obtaining a response to the respective question; a responses matrix including a number of response fields arranged for storing information regarding a number of responses related to the number of questions, each response logically linked to a respective question of the number of questions of the questions matrix, where, for each response of the number of responses, the number of response fields includes a respective score of a number of response scores corresponding to the response; and a selections matrix including a number of selections fields arranged for storing information regarding user selections of a portion of the number of responses, each selection field logically linked to a respective question of the number of questions of the questions matrix. The system may include a vulnerability assessment engine configured t obtain the document, render, by processing circuitry, the document as the interactive questionnaire by parsing the security domain matrix and the questions matrix, and causing presentation of at least a portion of the number of questions and, for each question of the portion of the number of questions, the respective response control type at a remote computing device of the user, receive, from the remote computing device responsive to the user interacting with the interactive questionnaire, one or more selections of a respective one or more responses of the number of responses, and store, by the processing circuitry in the selections matrix of the document, the one or more selections.

In certain embodiments, the document includes a categories matrix including a number of categories fields arranged for storing information regarding a number of categories of each domain of the number of domains of the domains matrix, each category of the number of categories being logically linked to a respective security domain of the number of the number of security domains of the security domain matrix. For each domain of the number of security domains, the number of categories fields may include a category progress field for collecting and storing a progress of a user of the interactive questionnaire through a respective subsection of a number of subsections sections of the interactive questionnaire corresponding to a respective category of the number of categories. Each question of the number of questions of the questions matrix may be logically linked to a respective security domain of the number of security domains of the security domain matrix through a respective category of the number of categories of the categories matrix.

In some embodiments, the vulnerability assessment engine is further configured to determine a respective score corresponding to each selection of the one or more selections, and render, in the interactive questionnaire, at least one score corresponding to the respective domain of the number of domains corresponding to a portion of the one or more selections. The vulnerability assessment engine may be further configured to, after completion of the interactive questionnaire by one or more users, calculate a number of category scores including a respective category score for each category of the number of categories by accessing respective scores for each selection of the number of selections corresponding to each category of the number of categories, and calculate, from the number of category scores, a number of domain scores corresponding to each domain of the number of domains. The vulnerability assessment engine may be configured to, after completion of the interactive questionnaire by one or more users, generate, using the document, a report including the number of category scores and the number of domain scores. The vulnerability assessment engine may be configured to, based upon at least one of the number of category scores and the number of domain scores, identify, for at least one domain of the number of domains, one or more remedies for mitigation of security vulnerabilities.

In some embodiments, the document is associated with one or more users, and the vulnerability assessment engine is configured to obtain a user identification, and obtain the document based on the user identification. The vulnerability assessment engine may be configured to, after completion of the interactive questionnaire by one or more users, present a completed view of the interactive questionnaire to an expert user, where the completed view of the interactive questionnaire includes a number of text input controls for adding expert commentary. The number of text input controls may be provided for each domain of the number of domains and each question of the number of questions.

In some embodiments, a method may include obtaining, by processing circuitry, a number of sets of assessment data, each set of assessment data corresponding to a respective entity of a number of entities, obtaining, by the processing circuitry, claims data related to a number of claims submitted by the number of entities due to a respective cyber attack on each entity of the number of entities, converting, by the processing circuitry, the assessment data and the claims data into a set of training data for identifying a number of hindsight vulnerability scores for each entity of the number of entities based on the respective cyber attack, applying principal component analysis, by the processing circuitry, to the training data to identify a refined training data set, transforming the refined training data set to be projected on a set of axes yielded by applying the principal component analysis, and applying a scoring model to the transformed refined training data set to obtain the number of hindsight vulnerability scores applicable to a peer enterprise of the number of enterprises. Converting the assessment data and the claims data into the set of training data may include weighting a subset of the claims data related to a subset of recently filed insurance claims of the number of insurance claims.

The forgoing general description of the illustrative implementations and the following detailed description thereof are merely exemplary aspects of the teachings of this disclosure and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIGS. 4A and 4B depict example screen shots associated with a user interface for gathering information regarding cyber security vulnerability of an entity;

FIGS. 7A-7H depict example screen shots associated with a user interface for vulnerability management;

FIGS. 13A-13F depicts example organizations of vector data for use in the operational flow of FIG. 12;

FIGS. 14B-14D depicts example organizations of data for use with the operational flow of FIG. 14A;

FIGS. 18A-18C depict screen shots of an example consultant user interface;

DETAILED DESCRIPTION OF ILLUSTRATIVE EMBODIMENTS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

Figure 1A:
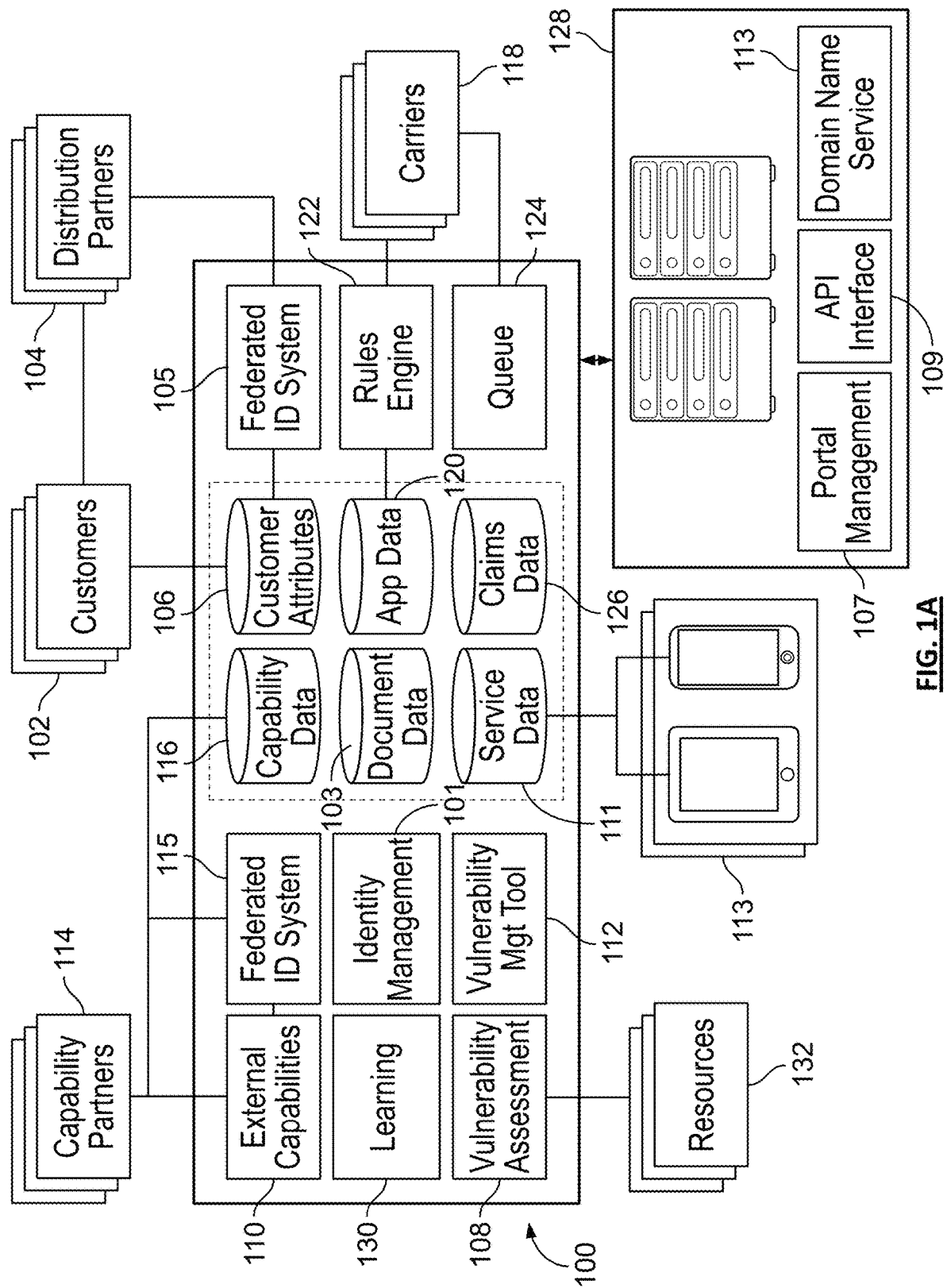
FIG. 1A depicts a block diagram of an example platform for vulnerability assessment, identification of services related to vulnerability management and suppression, and cyber risk insurance brokerage.

FIG. 1A depicts an example computerized platform 100 for cybersecurity vulnerability assessment, management, and insurance coverage. In the context of this document, the platform 100 and its various embodiments, and the embodiments of the methods, systems and schemes used in connection with the platform 100, will be discussed in the connection with cyber insurance. It is understood that the platform 100, along with the principles disclosed herein, can be used in connection with insurance policies covering other forms of loss.

According to some embodiments, the platform 100 is embodied to end users as an online asset, such as (but not limited to) a website or a user interface portal, and its functions and data are therefore available to remote systems and parties through a network, such as via the Internet, via a VPN, via a wireless network, via a local area network, or via a wide area network. The platform 100 may be accessed by customers 102. According to some embodiments, and as shown and discussed in connection with FIG. 3, the platform 100 exposes its functions and associated user interfaces via a web server or via application interfaces (API's) having endpoints exposed to a network to which customers 102 have access, such as the Internet. Customers 102 may therefore use a web browser to access the platform 100 directly. In instances in which a customer 102 accesses the platform 100 directly, the customer's attribute information (name/entity name, address, SSN/EIN, access information) may be collected via an account creation process and stored in a customer attribute data store 106. Examples of customers 102 are individuals and enterprises of any variety, particularly including small and medium sized businesses.

In some instances, a customer 102 may have a relationship with an enterprise in a field that is compatible with brokerage of cyber insurance. The enterprise may become a distribution partner with the platform 100 such that a distribution partner system 104 is linked into the platform 100 for exposing clients to services available via the platform 100. For example, a high net worth individual may have, or may enter into, a relationship with a financial services company. The financial services company, this example, may have its own system 104 via which it provides services to its customers 102. For example, the financial services company may have a website by which it provides investment services to its customers 102 or may have its own enterprise software via which it provides services to its customer 102 while the customer may be face-to-face with one of its representatives or in contact some other way such as telephonically.

In some implementations, the system 104 is integrated with the platform 100, so that it can provide access to the platform's 100 functions and data. For example, the system 104 may include a cross-domain iFrame, an HTML import such as a link, or a similar reference to the platform 100, or may include a hyperlink to the platform 100, itself, all of which serve to expose the functions, data and user interface of the platform 100. By virtue of such a reference, customers 102 accessing services offered by the system 104 of the enterprise are able to access the platform 100, and the compatible partner becomes a distribution partner for the services available on the platform 100. Another example of a compatible enterprise is a producer or distributor of secure network equipment that sells its network devices to enterprises desiring to manage their cyber risk by employing network elements that detect cyber threats.

According to some embodiments, the platform 100 includes a federated identity system 105 to coordinate user credential management with the distribution partner's system(s) 104. Thus, again carrying on with the example where the compatible enterprise is a financial services company, in the event that a customer 102 of the financial services company is logged into the financial company's website, the individual may select a link or some other user interface element to access cyber security services. Upon selecting the link (or other element), the customer 102 is presented capabilities, data, and optionally a user interface, itself, from the platform 100. By virtue of the federated identity system 105 employed by the platform 100, the customer is authenticated by the platform 100 and authorized to use some of its services. According to some embodiments, the federated identity system 105 performs a user attributes exchange with system 104, so that the platform 100 is not required to redundantly pose certain identification questions to the customer (e.g., the platform 100 does not need to prompt the customer to enter his name, address, SSN, etc., or in the context of a business enterprise, name of enterprise, state of incorporation, address of headquarters, EIN, etc.). The result is that customer attribute data store 106 may come into possession of information by which to maintain a user account for the customer 102, while the customer 102 accesses the services through the system 104 of the compatible enterprise. The federated identity system 105 may also attribute each particular customer 102 that is federated into the customer attribute data store 106 with the particular distribution partner (e.g., compatible entity) that brought the customer to the platform.

According to some embodiments, the user interface presented to the customer in the wake of selecting the link (or other user interface element) on the system 104 of the compatible enterprise is customized for presentation via the particular distribution partner. The user interface, in some examples, may contain colors, fonts, font sizes, logos, and/or other style elements so as to appear in line with, and as though it originated from, the system 104 of the compatible enterprise. According to other embodiments, the user interface is not customized, and the user is aware of accessing services from the platform 100 as opposed to from the distribution partner 104. In an illustrative example, a link may be presented in the form of "push" or "pull" advertisement on the distribution partner 104 system, which presents the platform 100 to the user in a new tab.

In summary, a distribution partner enterprise may permit its customers 102 to access the capabilities, data, and user interfaces of the platform 100 either by providing access through its own system 104, or by directing its customers 102 to the platform 100 directly.

A customer 102 that accesses the platform 100 may access the various services provided through it, including vulnerability assessment service(s) 108, and external service(s) 110 that have been federated into the platform 100, the output of which in some cases informs the vulnerability assessment and/or cyber insurance brokerage services.

Vulnerability assessment service(s) 108, in some embodiments, involve participating in an interactive automated questionnaire to provide details relevant to potential cyber security risks of the individual or entity. For example, the vulnerability assessment may be conducted via a self-attested questionnaire presented to the customer 102 via the platform by the vulnerability assessment service(s) 108. The output of the vulnerability assessment, in some implementations, includes a composite vulnerability score spanning a number of security domains, composite individual vulnerability scores assigned to each security domain and spanning a number of corresponding security subdomains, and individual vulnerability scores assigned to each security subdomain. According to some embodiments, the output of the vulnerability assessment, including each of the self-attested answers and each of the scores is stored in a service data store 111. An example embodiment of a self-attestation questionnaire and scoring scheme is presented with reference to FIGS. 4A and 4B.

In the event that the customer is a medium or large enterprise, in some implementations, the vulnerability assessment is conducted by a field representative of the platform 100 or third-party field agents engaged or otherwise assigned by the operators of the platform 100. The field agents may operate on-site at the enterprise, interviewing personnel, examining policies and procedures, observing operations and behaviors, and performing cyber exploration, penetration, and vulnerability examinations. The field agents may record their findings in portable computing device 113 via a user interface for entering their findings. According to some embodiments, the range of findings offered to the field agents is finite and grouped into one or more organization schemes, as will be discussed later. For example, the user interface may permit a given field agent assessing a particular enterprise to select from among thousands of potential findings (example: "at-rest data is unencrypted"), and those findings may be organized under security domains (example: "Protect" or "Data") according to various organizational schemes (example: National Institute of Standards and Technology Cyber Security Framework, etc.) selected by the enterprise for its convenience. Findings may be further organized pursuant to subdomains, discussed later. According to some embodiments, in the event that the existing finite offering of findings lacks an applicable finding for a particular enterprise, a field agent may add a finding to the finite offering of findings and may categorize the finding in each of a number of organizational schemes, for presentation to other field agents conducting vulnerability assessments in the future. In some embodiments, executive(s) from the enterprise, such as the Chief Information Security Officer (CISO) may access and manage the vulnerability findings arising out of the assessment via a vulnerability management tool 112, an example of which is described with reference to FIGS. 7A-7H. The findings generated by the field teams, in some implementations, are stored in the service data store 111.

In addition to vulnerability assessment service(s) 108, in some implementations, the platform 100 offers customers 102 the opportunity to consume various external services 110 that have been federated into the platform. The external services 110 are the sorts of services that are of interest to those interested in insuring against cyber security losses, e.g., services related to identifying, suppressing, and otherwise managing cyber security risks. The external services 110 may include services offered by the operator of the platform 100 as well as services offered by systems 114 operated by third parties. In some non-limiting examples, the external services 110 may include a service to determine whether an individual's information has been published on the dark web, a service to determine whether one's electronic credentials or personally identifiable information has been published online, a service to control the application for financial accounts in one's name, and/or a service by which an enterprise or individual can acquire secure virtual private networking services.

According to some embodiments, the platform 100 includes a federated identity system 115 that is a counterpart to the federated identity system 105 discussed previously in connection with the systems 104 of distribution partners. Therefore, customers of the platform 100 can create accounts and consume services from third parties (partners 114) without having to explicitly go through an account creation process, or merely having to go through a reduced process, because the federated identity system authenticates, authorizes and shares user attributes with the systems 114 of third-party partners 114. In the event that a customer 102 was federated on to the platform 100, for example, his or her attribute data stored in customer attribute data store 106 can be re-federated with the system 114 of a given third-party partner.

According to some embodiments, the platform 100 includes a user interface (or API's) by which the operator of a would-be third-party partner system 114 can establish secure interfaces with the platform 100. The secure interfaces, in some examples, can be used by the third-party partner system 114 to identify itself, identify one or more services it wishes to federate into the platform 100, identify the data needed for a customer to create an account with the third-party partner system 114, identify the data required to consume each of its services, identify any endpoints for the platform 100 to call to create a user account or consume a service, and identify the locations of any libraries, SDK's or units of software 110 that the platform 100 can use to call the aforementioned endpoints to effect initiation of the service or so to can provide the service, itself. This data, in some implementations, is stored in the capabilities data store 116. In this manner, third-party partners 114 that desire to expose their compatible cyber security services can do so without the operators of the platform 100 being required to perform a custom integration with the systems 114 of the external third-party partners.

In some embodiments, the external capabilities 110 include capabilities that an enterprise or individual may wish to consume in the event of compromised computer systems (e.g., digital forensic and/or incident response services). These services may originate from systems operated by the operator of the platform 100 or by third parties. Such digital forensic services may include, in examples, a front end interface that allows security experts to sort, filter and generally make sense of different events that have taken place on endpoints throughout an enterprise's network, a tool that operates upon digital images of computers to perform forensic functions typically performed upon file systems of compromised computers (e.g., identify every file that was deleted, identify every removable device that was connected to the computer, identify all information about all remote desktop connections to this computer, and the like), a tool that operates against a file system of a computer to identify files that match certain patterns, defined, for example by regular expressions, which are defined by the user, where the patterns indicate compromise of the system, and/or a tool that continuously monitors the "attack surface" of an enterprise (e.g., the Uniform Resource Locator (URL) and/or Uniform Resource Indicator (URI) access points, Internet Protocol address ranges of an enterprise) and identify any changes.

According to some embodiments, the output of external capabilities 110 that have been consumed by any customer 102 are stored in the service data store 111.

According to some embodiments, insurance carrier systems 118 can access the platform 100 to obtain information about potential policies they may bid on. Customers 102 are also able to access the platform 100 to view bids on coverages and may accept a bid and enter into a binding insurance contract with a carrier system 118. One consequence of this carrier access to the system is that insurance policies that are out to bid and have at least one pending bid may be preemptively accepted by a customer prior to entry of competing bids. In other words, a would-be bidder could lose the opportunity to bid at all since knowledge of a policy out to bid is a time-sensitive matter.

Thus, according to some embodiments, the platform 100 includes a rules engine 122 that permits a carrier system 118 to determine which policies from the application data store 120 it wishes to bid on, and which it does not. For example, a carrier system 118 may use the rules engine 122 to establish a rule that it only wishes to examine policies from customers having a composite vulnerability score over a threshold determined by the carrier, or the carrier system 118 may use the rules engine 122 to establish a rule by which only those policies pertaining to customers having a composite score in a particular security domain that exceeds a threshold determined by the carrier be presented for review by the carrier. Similarly, the carrier system 118 may use the rules engine 122 to establish a rule by which only those policies pertaining to customer having a score in a particular security subdomain that exceeds a threshold determined by the carrier become available for review by the carrier system 118. The rules engine 122 may permit logical combinations of conditions, as well. In other words, the rules engine 122 may permit rules to be joined by logical operators, such as a logical "and," a logical "or," a logical "exclusive or," a logical "nand," a logical "nor," and also may permit negation of a rule as well. For example, a carrier may use the rules engine 122 to establish a rule by which only those policies from customers having a composite vulnerability score over a threshold determined by the carrier become available for review by the carrier system 118, if and only if the particular customer also has a composite score in a particular security domain that exceeds a threshold determined by the carrier. Policies that meet a carrier's criteria for review, in some implementations, are placed in a queue 124 for representative(s) of the carrier system 118 to review.

The rules engine 122, in some implementations, permits the carrier system 118 to establish rules pertaining to prioritizing the queue 124 of policies to be examined for bid. For example, the carrier system 118 may use the rules engine 122 to establish a rule that policies that meet the carrier's threshold for examination should be prioritized based upon the number of other carriers already having bid on a particular policy. In another example, a given carrier system 118 may use the rules engine 122 to establish a policy to prioritize the queue 124 based upon revenue of the customer 102 seeking the policy. Other uses of queue prioritization are possible. Additionally, while described as a single queue, in some implementations, each carrier 118 may establish a number of queues, for example for review by different representative divisions. The divisions, in some examples, may be established across entity type, entity geographic region, entity size, and/or policy type(s).

According to some embodiments, the platform 100 alerts a carrier's system 118 in the event that a time sensitive or high priority policy needs to be reviewed for a bid to be placed. For example, the rules engine 122 may issue or coordinate with a communicates engine for issuance of an email, text message, portal notification, voice mail, or other notification to one or more designated parties chosen by a carrier.

According to some embodiments, a carrier may use the rules engine 122 to establish logical and mathematical rules by which a bid may be automatically placed. In an illustrative example, the rules engine 122 may automatically place a bid on a policy, on behalf of a given carrier system 118 if the policy covers only certain types of losses, and if the would-be customer's composite vulnerability score exceeds a chosen threshold, and if the would-be customer's composite vulnerability score in a particular security domain exceeds a chosen threshold. In some implementations, the bid, itself, may be automatically priced based on rules the carrier system 118 establishes in the rules engine 122. For example, the price, coverages and policies may be arrived at as a mathematical function of customer attributes (e.g., size, revenue, geography, industry, etc.) and values of one or more vulnerability scores. Additionally, according to some embodiments, the operator of the platform 100 may provide insurance coverages in addition to providing brokerage services, in which case the operator's own systems that facilitate bidding on insurance policies may connect with the rules engine 122 in order to automatically bid on policies.

According to some embodiments, the platform 100 is hosted in one or more data centers 128. In some embodiments, one or more data centers, such as, data center 128 may be communicatively coupled to a network. In at least one of the various embodiments, the data center 128 may be a portion of a private data center, public data center, public cloud environment, or private cloud environment. In some embodiments, the data center 128 may be a server room, or server farm that is physically under the control of an organization, such as a third-party organization. The data center 128 may include one or more enclosures of network computers. The enclosures (e.g., racks, cabinets, or the like) of network computers may be blade servers in data center 128. In some embodiments, the enclosures may be arranged to include one or more network computers arranged to monitor server computers, storage computers, or the like, or combination thereof. Further, one or more cloud instances may be operative on one or more network computers included in the enclosures.

In some embodiments, the data center 128 includes one or more public or private cloud networks. Accordingly, the data center 128 may include multiple physical network computers, interconnected by one or more networks. The data center 128 may enable and/or provide one or more cloud instances. The number and composition of cloud instances may vary depending on the demands of individual users, cloud network arrangement, operational loads, performance considerations, application needs, operational policy, or the like. In at least one of the various embodiments, the data center 128 may be arranged as a hybrid network that includes a combination of hardware resources, private cloud resources, public cloud resources, or the like.

FIG. 4A depicts an example screen shot of a user interface 400 for assessment of vulnerability. The user interface 400, for example, may be presented to the user 102 by the platform 100. The user interface 400 contains a number of selectable controls 402-416. Each control 402-416, for example, represents a section of questions to be posed to a user. The user, in some embodiments, responds to the questions attesting to the state of affairs of the entity he or she represents—for example a small business, corporation, university, or other entity. As discussed with reference to FIG. 6, in some embodiments, the answers to the questions are then evaluated (e.g., by the assessment module 108 of FIG. 1A), and vulnerability scores are calculated and presented back to the user (depicted in FIGS. 5A-5D). According to some embodiments, the vulnerability scores are stored in the application data store 120 of FIG. 1A, for example to be used as part of the information set that an insurance carrier evaluates when bidding on a policy (e.g., when electing whether or not to offer to provide coverage, and, if so, pursuant to what price, policy and coverage limits).

As shown in FIG. 4A, each control 402-416 includes a corresponding progress bar 418a-h that indicates the proportion of questions in the particular question set corresponding to the control 402-416 on which the corresponding progress bar 418a-h is positioned have been answered. With the exception of a first control 402 entitled "About Your Company," each of the controls 402-416, in some embodiments, corresponds to a different security domain. Thus, "Critical Data in Systems" 404 and "Data Security" 406 are examples of security domains. A set of questions relating to the entity's state of affairs, practices, and policies may be posed to the user for each security domain. Thus, the vulnerability assessment engine 108, in some embodiments, poses a set of questions to the user pertaining to the practices, policies and states of affairs of the entity that the user represents, as it relates to the entity's critical data in systems. The vulnerability assessment engine 108, in some embodiments, also poses a set of questions pertaining to data security, and so on. Certain questions may be in free form (e.g., the user enters textual responses into a text box control). Other questions may be multiple choice or many choice (e.g., selection of radio button(s), item(s) from a drop-down menu, and/or check box(es)).

The user may navigate through the questions by selecting a control 402-416. For example, in the wake of having selected the control 402 entitled "About Your Company," the user may be presented with questions pertaining to the identity of the company, the identity of the user, himself or herself, contact information, industry of the company, and other client information.

Certain controls may correspond to security domains and, within each security domain question section, there may be multiple subcategories. Further to the example of "About Your Company" 402, the questions may be divided into sub-categories "Client Information" and "Contact Information". In some embodiments, the user is presented with questions pertaining to critical data in systems operated by the entity through the control 404. The questions may be subdivided into subdomains such as, in some examples, "Architecture," and "Sensitive Data". In some embodiments, the user is presented with questions pertaining to data security upon selection of the control 406. In some implementations, the user is presented with questions pertaining to identity and access management upon selection of the control 408. This category, for example, may include one or more questions related to password management. In some implementations, the user is presented with questions pertaining to endpoint security systems upon selection of the control 410. In some implementations, the user is presented with questions pertaining to cloud and network security upon selection of the control 412. In some implementations, the user is presented with questions pertaining to physical security upon selection of the control 414. In some implementations, the user is presented with questions pertaining to application security upon selection of the control 416.

Beyond the security aspects presented in FIG. 4A, in some embodiments, the user may be questioned regarding a number of additional security domains and/or domain subcategories. In some examples, the questions may be related to tampering and alteration aspects of physical security, training aspects of application security, secure development aspects of application security, third party contract aspects of third party engagement, due diligence aspects of third party engagement, business continuity and disaster recovery aspects of business resilience, incident response aspects of business continuity and disaster recovery, and/or incident response aspects of business continuity and disaster recovery.

Figure 1B:
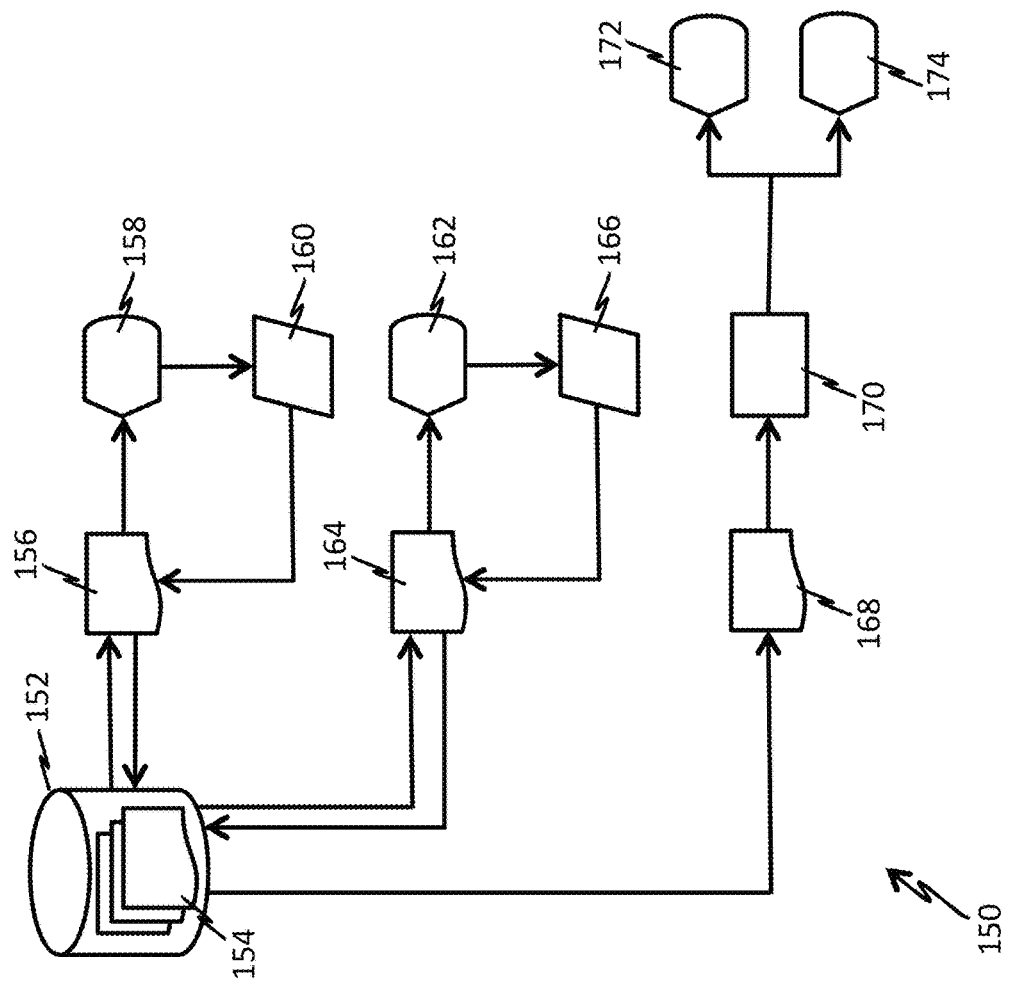
FIG. 1B depicts an operational flow diagram of an example method for assessment of exposure to and suppression of various hazards.

FIG. 1B depicts an operational flow of a process 150 for assessment of exposure to and suppression of various hazards. According to some embodiments, the process 150 may include elements accessible via a public network such as the Internet. According to some embodiments, the process 150 may be performed in part through interaction with a user via a web browser. A user may execute the process 150 on his own behalf or on behalf of an organization he represents. For example, the user may log into the platform 100 of FIG. 1 via a browser interface, and the system 100 will respond by posing a set of questions to the user through the process 150. The questions may pertain to various topics related to risk exposure vis-à-vis some hazard.

By way of illustration and not by way of limitation, the process 150 may assess the risk of an organization being subjected to a cyber security hazard. Hazards arising in the realm of cyber security may be the consequence of an organization's policy choices and tool selection (or lack thereof) in certain categories of consideration. For example, access control is an important consideration in cyber security: an organization's employees should have access to only those systems that are needed for the purpose of performing their jobs. Thus, a secure organization will take steps to ensure that only the proper set of employees is authorized to access any given system, and that unauthorized access is not permitted. To probe an organization's risk exposure arising out of its policies and tools related to access control, a set of questions pertaining thereto may be posed by the process 150, and access control may be referred to as a "domain" of cyber security. Another important consideration is endpoint system security: each endpoint on a network should deploy certain safeguards to identify and prevent malicious access. The process 150 may thus pose a set of questions pertaining to endpoint system security, and endpoint system security may also be referred to as another "domain" of cyber security. Thus, to assess an organization's exposure to hazards arising in the realm of cyber security or any other realm, the process 150 may pose many sets of questions, one set for each domain of high-level considerations pertaining to cyber security (or any other particular hazardous realm).

According to some embodiments, domains of consideration pertaining to a hazard may be sub-divided into categories. Returning to the previous example wherein the process 150 assesses cyber security risk, one important area of consideration within the topic of access control is password configuration. For example, policies and tools should be employed to require that passwords be of a certain length, be changed at prescribed intervals, not be shared among users, not be reused, and so on. Therefore, within the domain of access control, a set of questions pertaining to password configuration may be posed, and password configuration may be referred to as a category within the broader topical domain of access control. Another important topic within access control is two-factor authentication, which is a scheme by which a user is forced to demonstrate his knowledge of a secret (e.g., a password) in combination with either possession of a particular article (possession of a particular cell phone or particular computer) or presentation of a particular personal attribute (e.g., presentation of a particular biometric parameter such as a fingerprint, facial image or the like). Thus, two-factor authentication if implemented, results in a situation in which a password alone will not permit a party access to an organization's systems. Therefore, within the domain of access control, another set of questions pertaining to the narrower topic of two-factor authentication and its scope of implementation may be posed, and two-factor authentication may be referred to as a category within the domain of access control.

The questions posed by the process 150, in some implementations, enquire into an individual's or organization's risk profile vis-à-vis any particular hazard, proceeding on a broad topical domain-by-domain basis, where any given domain may or may not be constituted of narrower more focused individual categories. Therefore, the set of questions posed by the process 150 may in fact be constituted of many individual subsets of questions, each such subset being related to a particular broad topical domain or category within a domain.

According to some embodiments, the risk profile of a user or the organization on behalf of which the user is accessing the process 150 is quantified in the form of a risk score. According to some embodiments, a risk score is expressed as a number ranging from a minimum value to a maximum value. For example, a risk score equal to a minimum value may communicate that the process 150 has evaluated the organization to be at maximal risk of encountering some form of hazard, while a risk score equal to the maximum value communicates that the organization being at minimal risk of encountering the hazard. A risk score may be associated with each category of a domain, with each domain, and with the organization or systems or assets under evaluation as a whole.

According to some embodiments, the process 150 may pose a set of questions that pertain to a diversity of domains and categories that is of such breadth that no single person within an organization is capable of providing accurate answers to the questions. In such instances, the process 150 may present the same questionnaire to multiple users associated with the same organization. For example, a first user who represents an organization in some given capacity may log into the platform 100 of FIG. 1, review the questionnaire, and answer the particular questions pertaining to matters of which he has knowledge. Thereafter, a second user 27 who represents the organization in another capacity logs into the platform 100 and is also presented with the aforementioned questionnaire. According to some embodiments, the process 150 presents the questionnaire to the second user in the state the questionnaire was left in, in the wake of the first user having answered the questions he felt able to address. In other words, the second user is presented the questionnaire with the answers from the first user "filled in." The second user may therefore direct his attention to the unanswered questions. If a third user representing the organization in a still different capacity subsequently logs in, the process 150 may present the questionnaire to the third user in a state combining the input from both the first and second users. Therefore, each user associated with an organization is presented with the questionnaire in a state that combines the input from every previous access and interaction of every previous user in the organization.

According to some embodiments, the process 150 also returns one or more reports that detail the exposure of an individual or organization to the particular hazard to be assessed. In the wake of a user or set of users having completed the questionnaire, the ultimate user may submit the questionnaire for processing.

According to some embodiments, the process 150 presents a subject matter expert (e.g., in the context of platform 100 that assesses cyber security, the subject matter expert is a cyber security expert) with a list of questionnaires that have been submitted. The subject matter expert may select a questionnaire for review. The process 150, in turn, may present the subject matter expert with a user interface displaying the questionnaire bearing the input collected from the user or set of users that cooperated in answering its various questions. The process 150 may provide the subject matter expert with an interface by which to supply written commentary on any domain, category thereof, or specific answer to any particular question that was posed. The process 150 may further provide the subject matter expert with an option to flag his input for inclusion into the various reports generated by the process 150 and/or other elements of the platform 100 of FIG. 1A. Therefore, the reports may include information algorithmically generated on the basis of the answers provided by the users, sometimes in combination with other data, such as data obtained from data stores that may be internal or external to the platform 100 (such has insurance claims data 126, industry hazard data such as cyber security exploit and penetration data, and other data of the like). The reports may also include information entered by the subject matter expert that has been flagged for inclusion in the reports, such as information entered in prose form and which may be highly relevant to and customized for an organization, so that the readers of the report can understand with particularity and clarity certain matters bearing relevance on the organization's risk exposure, and steps that could be taken to mitigate or suppress such risks.

According to some embodiments, the process 150 generates a file containing the completed assessment or questionnaire. The file, for example, may use a file format such that it represents the questionnaire and answers as a document including text and images, independent of application software, hardware and operating system. For example, according to some embodiments, the file is a portable document format (PDF) file.

According to some embodiments, the process 150 supports different entry "vectors." If a user enters the platform 100 of FIG. 1 via one particular vector, it indicates that the user is to be presented one particular questionnaire. On the other hand, if the user enters the platform via a different vector, the user is to be presented a second questionnaire. The need for different questionnaires may arise from a situation in which the platform 100 is used to assess risk exposure to different forms of hazards. Hence, a different questionnaire may be required for each hazard. The need for different questionnaires may also arise out of a situation in which the platform 100 assesses risk exposure and suppression possibilities on behalf of third parties that may provide services or tools useful in suppressing particular risks or threats. For example, returning to the example in which the process 150 is used in connection with assessing cyber security threat exposure, the platform 100 may operate on behalf of a provider (e.g., capability partner 114 of FIG. 1) of "smart" networking devices that detect malicious activity and suppress it. In such a situation, the questionnaire would ask more detailed questions about the sort of network infrastructural hardware being deployed by the organization, in order to understand whether there is an opportunity to suppress risk by use of the provider's "smart" hardware. Therefore, the questionnaire may include both a general set of questions pertaining to cyber security and may additionally include a set of questions directed to exploring the possibility of use of the provider's "smart" networking hardware. According to some embodiments, each vector into the system is supported as a different domain (example: https://www.provider1.assessmentsystem.com corresponds to questionnaire for a first provider of risk suppression services and products, while https://www.provider2.assessmentsystem.com corresponds to questionnaire for a second provider of risk suppression services and products). A domain name service (DNS) 113 of FIG. 1A, for example, may support association of the platform 100 with various universal resource locators (URLs) for access by users via multiple domains.

Turning to FIG. 1B, the process 150, in some implementations, accesses a data store 152 that contains documents 154. According to some embodiments, the data store 152 is a document database, such as PostgreSQL. The documents 154, for example, may be stored in a document datastore 103 of the platform 100 of FIG. 1A. Each document 154 may contains data that describes the contents and structure of the questionnaire to be presented by the process 150. According to some embodiments, at least a portion of the documents 150 contain data that includes the wording of the questions, the variety of responses permitted for each question, the domain to which the question belongs and the category to which the question belongs, among other contents that are described below.

Figure 2:
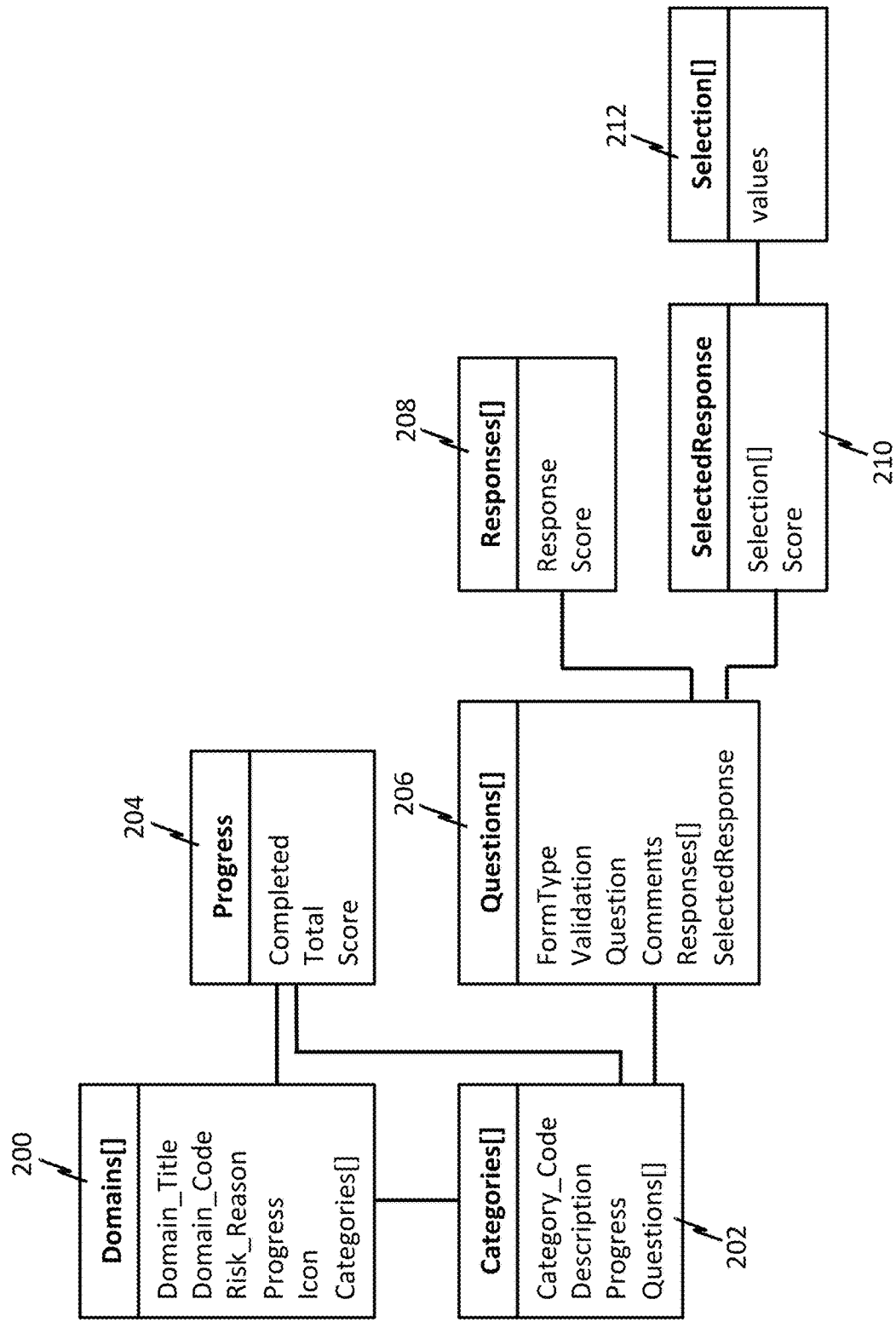
FIG. 2 depicts a block diagram of an example structure of data elements within various documents.

FIG. 2 depicts an example structure of data elements within the various documents 154 of FIG. 1B. As can be seen from FIG. 2, a document in some implementations includes a data element that is an array of domains 200. Each domain in the array 200 may be described by a set of key-value pairs. A domain, in some examples, may include key-value pairs for a domain title, a domain code, a risk reason, user progress in completing questions within the domain, one or more categories, and/or an icon. The domain title key, for example, may mate to a string value that provides a name for a domain (e.g., "Critical Systems and Data"). The domain code key may mate to a string value that is an abbreviated title suitable for presentation in situation in which screen space is restricted (e.g., in the context of the Critical Systems and Data domain: "CSD"). The risk reason key may mate to a string value that is a statement of the nature of risk being assessed within the domain (e.g., in the context of the Critical Systems and Data domain: "Mission critical data used to support strategic business processes for which loss or compromise of data would damage business operations, damage brand reputation and/or reduce shareholder value."). The user progress data element 204 may include three keys: a completed key, a total questions key and a score key. The completed key, for example, may mate to a value that indicates the number of questions within the domain that have been answered. The total questions key may mate to a value that indicates the total number of questions within the domain. The score key may mate to a value that indicates the total risk score earned within the domain, in view of the answers provided by the user. Finally, the icon key may mate to a value that identifies the location at which a graphics file containing the image of an icon representing the domain can be found.

The domain array 200, in some implementations, also contains a categories array 202. Each category in the array 202 may be described by a set of key-value pairs. As can be seen from FIG. 2, the category code key may mate to a string value that is an abbreviated title of the category suitable for presentation in situation in which screen space is restricted (e.g., in the context of the Architecture category within the Critical Systems and Data domain: "CSD-ACH"). A description key may mate to a string value that articulates the general mission of the questions that will be posed within the category (e.g., in the context of the Architecture category within the Critical Systems and Data domain: "Describe the infrastructure and application systems."). The categories array may also include a user progress data element that includes the key-value pairs described previously, except that the progress key may mate to a value indicating the number of questions answered within the particular category (as opposed to the domain), the total questions key may mate to a value indicating the total number of questions within the category, and the score key may mate to a value that indicates the total risk score earned within the category, in view of the answers provided by the user. Finally, the categories array 202 may include a questions data element, which is a questions array 206.

The questions array 206, in some implementations, includes data elements that, together, define a question to be posed to a user together with the response structure for the question. Because it is an array, each element within the array defines one question and its response structure. The questions array 206 may include a form type key that mates to a value indicating the type of question being posed, e.g., multiple-choice, select all that apply, free form narrative response, a question calling for a reply that is a number, true-or-false, etc. In the event that the form type key mates to a value that indicates a variety of question that allows for the possibility that the user could enter an invalid response, the questions array 206 may include a validation key. The validation key may mate to an indication of the type of response required by the question. For example, in the context of a question where the form type key mates to a value of "TEXTBOX" (meaning the user will be presented with a text box for entry of his response) and where the prompt is "Number of external data centers (e.g., off premise, cloud, co-location)," the validation key would mate to "number" indicating that the user input must be a number. The questions array 206 may also include a question key which mates to a string value that states the wording of the question to be posed. In the context of the example just given, the question key would mate to the string "Number of external data centers (i.e., off premise, cloud, co-location)." The questions array 206 may also include a comments key that mates to a string that stores free-form user response entered via a text box. In the context of the previous example, if the user entered "3" as the response for the number of external data centers, the comments key would mate to the value "3."

The questions array 206, in some implementations, also includes a responses data element, which is an array 208. For varieties of questions that call upon the user to select from a list of potential answers (e.g., form type key mates to "MULTI-SELECT," meaning the question is of a variety commonly known as check-all-that-apply or the form type mates to "SINGLE-SELECT," meaning the question is of a variety commonly known as select-the-best-answer) the response array may articulate the wording of each potential answer the user is asked to select from amongst, and also specifies a risk score associated with each such answer. The responses array 208 may include a response key that mates to a string value that specifies one potential answer to be posed to the user, and a score key that specifies a risk score to be associated with the user having selected the particular answer. Thus, given that the responses data element of the questions array 206 is the array 208, if the user were to be asked a question that prompted the user to select from among four potential answers, the responses array 208 would contain four elements within it: a first element containing a response key-value pair and score key-value pair (specifying the first potential answer and the score associated with the user selecting it), a second element containing a response key-value pair and score key value pair (specifying the second potential answer and the score associated with the user selecting it), and so on.

The questions array 206, in some implementations, also includes a selected response data element which corresponds to an array 210. The selected response array 210 may contain data that stores user response to questions in which the user was asked to select from among a set of potential answers and may also store a risk score associated with the user having selected the particular answer.

Figure 3:
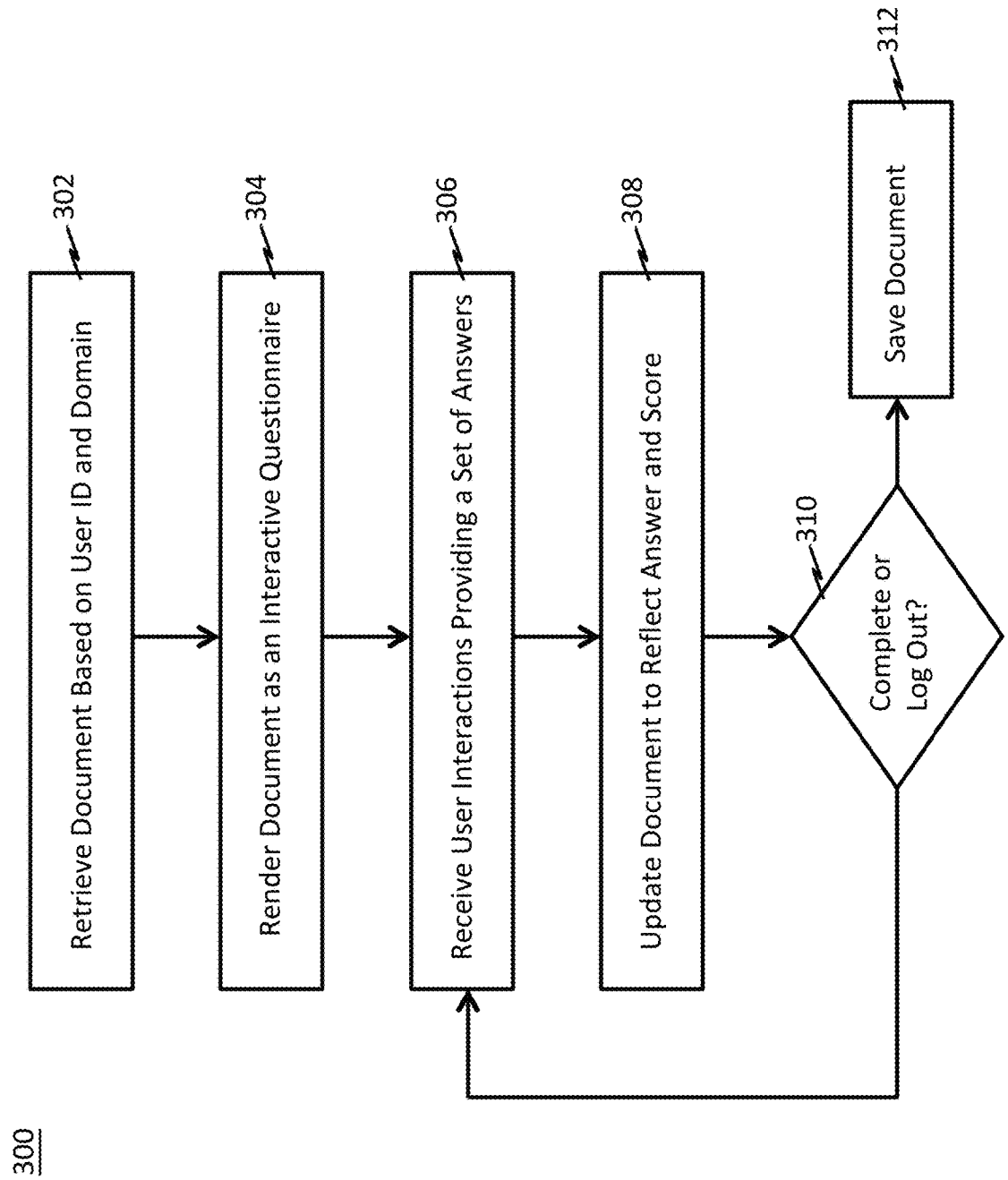
FIG. 3 depicts a flow chart of an example method for using a document structured as depicted in FIG. 2 to present an assessment or questionnaire to a user and to store the user's answers.

Turning to FIG. 3, a flow chart illustrates an example method 300 for presenting and updating information associated with a document structured as described in FIG. 2. FIG. 1B and FIG. 3 may be referred to simultaneously to depict the operation of the process 150 with regard to using the document 156 in order to present an assessment or questionnaire to a user and to store the user's answers. This initial discussion assumes that the process 150 is being accessed by a new user. Portions of the method 300 may be performed by the vulnerability assessment engine 108. For example, a graphical user interface engine of the vulnerability assessment engine 108 may perform operations of the method 300.

In some implementations, a document is retrieved based on user identification and access domain (302). For example, the data store 152 may be accessed to retrieve the particular document 156 from within the set of documents 154. In this example the user is new, meaning the user has just created an account and, as such, has not been previously presented with a questionnaire. In some embodiments, the platform 100 of FIG. 1A includes an identity management engine 101 for establishing and controlling authentication rules that prescribe how users are authenticated within the platform. For example, the identity management engine 101 may validate users accessing the platform 100 and limit the users' access based upon an associated customer to the user, as defined, for example, in customer attributes data store 106.

In some implementations, the user accesses the platform 100 via a network, for example by identifying the platform with a universal resource locator. The platform 100 may be providing its services on behalf of many different third parties, as well as on behalf of the party that operates the platform 100. According to one embodiment, a subdomain is assigned to each third party on behalf of which the platform is functioning. Thus, in the context of a new user, the data may be accessed to retrieve a document that is associated with the particular subdomain the user accessed in the course of accessing the system. In other words, if the user had accessed the platform 100 using a first subdomain, then a first particular document 154 would be retrieved, while if the user had accessed the platform 100 using a second subdomain, then a second particular document 154 would be retrieved. Thus, the set of documents 154 includes one particular document 154 for each subdomain. The platform 100 of FIG. 1A, for example, may be hosted in a third-party managed server environment such as the server environment 128. The platform 100, in some embodiments, includes at least one portal managed by a portal management engine 107, which manages web presentation of the documents stored in a document data store 103, as well as the orchestration and navigation of the user's flow through the web presentation. In some implementations, a set of application interfaces (API's) 109 may include the business logic and routing relating to how to retrieve and store the documents in the document data store 103.

The document 156, in some implementations, contains no stored information pertaining to prior user input (because in this example, the user is new and there has been no prior user input). Thus, the document 156 contains information pertaining to the questions to be posed and how they are to be structured in terms of domain and category association. The document datastore 103 of FIG. 1A (such as a Postgres relational database that supports NoSQL for document handling) may be used to store the documents 154 such as document 156. According to some embodiments, the documents 154 contain no personally identifiable information, and the identity of the user or enterprise to whom the information therein pertains may be determined through other data maintained in the datastore 103. Therefore, if the documents 154 were to obtained by a third party, the third party would not be able to ascertain to whom the information pertained.

Returning to FIG. 3, in some implementations, the document is rendered as an interactive questionnaire (304). For example, the document 156 may be rendered as a user interface 158 to present the questionnaire to the user. The document datastore 103, for example, may store graphics assets and other generic assets needed for presentation of the web presentation of the document 156.

FIG. 4B depicts a portion of an example user interface 440 for submitting information into an interactive questionnaire. The user interface 440, for example, illustrate a screen shot of the user interface 158 of FIG. 1B that has been created from the document 156 pursuant to operation 302 of the method 300. The user interface 440, for example, may be generated based upon selection of the critical data in systems category 404 from the user interface 400 of FIG. 4A.

As can be seen from FIG. 4B, the user interface 440 includes various sections 420-428. Sections 420 and 422 may be static sections, meaning that their contents do not depend upon the contents of the particular document 156 of FIG. 1B. Sections 424-428, conversely, may contain content that is determined by the aforementioned document 156.

Section 424, in some implementations, contains navigation elements 430. In some implementations, there is one navigation element 430 for each element of the domains array 200 of FIG. 2. The string value mated to each domain title key within the array 200, for example, may be used as the title of each navigation element. Thus, the string value mated to the domain title key of the first element in the array, "Critical Systems and Data" is used as the title for the first navigation element 430*a*, while the string value mated to the domain title key of the second element in the array, "Data Security" is used as the title for the second navigation element 430*b*, and so on.

Selection of a given navigation element 430, in some implementations, results in section 428 of the user interface 440 presenting questions that are associated with the domain identified in the element 430. For example, because the element 430*a* identifying the "Critical Systems and Data" domain is selected, section 428 is presenting questions pertaining to that domain. Selection of the navigation element 430*b* entitled "Data Security" would cause section 428 of the user interface 440 to present questions pertaining to the Data Security domain, and so on.

Within the presentation of each navigation element 430 is an indication of a number of questions associated with the domain represented by the navigation element 430. For example, the navigation element 430*a* indicates that nine questions are associated with that domain, while the navigation element 430*b* indicates that twenty-two questions are associated with it. The value mated to each total questions key within the array 200 of FIG. 2, for example, may be used in the question count indication. In illustration, the value mated to the total question key of the progress element within the first element in the array 200, e.g., 9, is used in the first navigation element 430*a*, while the value mated to the total question key of the progress element within the second element in the array 200, e.g., 22, is used in the second navigation element 430*b*, and so on.

Also within each navigation element 430 is an indication of the progress (e.g., percent complete). In the context of this example where the user is a new user, all of the progress indicators of all navigation elements 430 show 0%. This value may also be drawn from the particular document 156 obtained in operation 302 of the method 300 of FIG. 3. Specifically, in the context of the first navigation element 430*a*, the value mated to the completed key of the progress element within the first element in the array 200 of FIG. 2 may be divided by the value mated to the total questions key of the progress element within the first element of the array 200, and in the context of the second navigation element 430*b*, the value mated to the completed key of the progress element within the second element in the array 200 may be divided by the value mated to the total questions key of the progress element within the second element of the array 200, and so on.

As such, document 156 of FIG. 1B, in some implementations, contains all of the data needed for populating section 424, and is structured so that the number of domains can be determined (it is equal to the number of elements in the domains array 200 of FIG. 2). Thus, the number of navigation elements 430 to be displayed is discernable—it is equal to the number of domains. The title of each domain may also be discernable from the data and its structure within the document 156—for the nth navigation element, for example, it is the string value mated to the domain title key of the nth element in the domains array 200. The total questions to be displayed in each navigation element 430 may be discernable from the data and its structure in the document 156. For the nth navigation element, for example, it is the value mated to the total questions key of the progress element within the nth element in the domains array 200. Finally, the percent complete data may be discernable from the data and its structure within the document 156. For the nth navigation element, for example, it is equal to the value mated to the complete key of the progress element within the nth element in the domains array 200 divided by the value mated to the total questions key of the progress element within the nth element in the domains array 200.

More generally, the user interface 158 of FIG. 1B, in some implementations, is divided into sections. Each section contains either a fixed number of visual elements or a dynamic number of such elements. Where the number is fixed (e.g., section 426 of FIG. 4B has one visual element, the title of the selected domain), the information necessary for display of the element is discernable from the structure and content of the data in the document 156. Where the number is dynamic (e.g., the number of navigation elements 430 is dynamic), both the number of such elements and the information necessary for display of such elements is discernable from the structure and content of the data in the document 156.

Within FIG. 4B, only a portion of section 428 is depicted, since section 428 extends below the bottom of the visible region, and maybe accessed by scrolling down. Section 428 contains four visible question elements 432-438. Along the top of section 428 is a list 440 of the categories within the domain selected in section 424 and displayed in section 426. As can be seen from the list 440, the first category, Architecture, is selected. Therefore, each of the questions 432-438 are associated with the Architecture category.

As can be seen from FIG. 4B, each question includes a prompt. For example, the prompt of the first question 432 is: "Number of in-house Data Centers," while the prompt of the second question 434 is: "Number of external Data Centers (i.e., Off Prem, Cloud, Co-Locations)." The quantity of questions, in some implementations, is determined by the size of the questions array 206. Specifically in the context of presenting questions for the mth category of the lth domain, the quantity is determined by the size of the questions array element of the categories array element of the lth element of the domains array 200. The text of the question may be determined by the string value mated to the question key in the questions matrix 206. Specifically, in the context of the nth question within the mth category of the lth domain, the question text is specified by the string value mated to the question key of the nth element of the questions array element of the mth element of the categories array element of the lth element of the domains array 200.

The presentation of each question 432-438, in some implementations, includes either a textbox in which to answer the question (e.g., questions 432 and 434) or a list of answers from which to choose, in addition to a textbox in which to enter any commentary not adequately captured by simply selecting an answer from a list of proposed answers (e.g., questions 436 and 438). The presentation format of a question 432-438 may be determined by the string value mated with form type key element of the questions array 206 of FIG. 2. Specifically, in the context of the nth question within the mth category of the lth domain, the presentation format may be determined by the string value mated to the form type key of the nth element of the questions array element 206 of the mth element of the categories array element 202 of the lth element of the domains array 200. In the event that the presentation format calls for the presentation of a list of proposed answers to be selected amongst (e.g., the string value mated to the relevant format type key is "MULTI-SELECT" or "SINGLE-SELECT"), then the quantity of proposed answers to be presented may be determined by the size of the responses array 208. Specifically, with respect to the nth question within the mth category of the lth domain, the quantity of proposed answers is determined by the size of the responses array element 208 (if any) of the nth element of the questions array element 206 of the mth element of the categories array element 202 of the lth element of the domains array 200.

The data and its structure within the document 156 of FIG. 1B, in some implementations, also determine the behavior of the various elements in the user interface 158. For example, turning to FIG. 4B, the textboxes associated with each question 432-438 may impose restrictions on the type of data that may be entered by the user. Any such restriction may be determined by the string value mated to the validation key. For example, if the string value mated to a validation key was "number" then the user interface 158 of FIG. 1B would confine the user to entering a number in the associated textbox. Specifically, in the context of the textbox associated with the nth question within the mth category of the lth domain, any such restriction may be determined by the string value mated to the validation key (if any) of the nth element of the questions array element 206 of the mth element of the categories array element 202 of the lth element of the domains array 200 of FIG. 2. As another example, the list of proposed answers (if any) may permit but a single answer to be selected or may permit multiple answers to be selected. The behavior of the selection elements within the proposed list of answers of a question may be determined by the string value mated to the form type key. If such a string type value is "MULTI-SELECT" then multiple selection elements may be selected by the user. On the other hand, if such a string value is "SINGLE-SELECT" then only a single selection element will retain a selection. If the user attempts to select more than one such element, the previous selected element is unselected and the newly selected element is selected. Specifically, in the context of the selection elements associated with the proposed answers (if any) associated with the nth question within the mth category of the lth domain, any such behavior may be determined by the string value mated to the form type key (if any) of the nth element of the questions array element 206 of the mth element of the categories array element 202 of the lth element of the domains array 200 of FIG. 2.

The preceding discussion may be summarized as follows: the rendering process of operation 302 of the method 300 may be performed on a section-by-section basis by accessing the document 156 of FIG. 1B to determine quantities of visual elements that should be displayed in each section, to determine the information necessary for their display, and to determine behavior pertinent to user interaction with them. According to some embodiments, the set of documents 154 from which any particular document is selected may be a JavaScript Object Notation (JSON) document or other document of similar variety.

Turning to FIG. 3, after the document has been rendered as a user interface, in some implementations user interactions are received as the user interacts with the user interface by navigating through the questionnaire and answering a portion of the questions (306). The questionnaire may be presented by the user interface 158 of FIG. 1B. For example, the user may interact with questions 432-438 of FIG. 4B. In response, the process 150 of FIG. 1B may receive information 160 corresponding to the user's answers.

In some implementations, with each answer entered by the user, the document is altered to store the answer within the document (308). Returning to FIG. 4B, for example, assume the user entered "1" in response to question 432. This answer maybe provided to the process 150 as the information 160 of FIG. 1B and stored as a string value mated with a comments key. Specifically, in the context of an answer being provided in a textbox associated with the nth question within the mth category of the lth domain, the entered answer is stored within the document 156 of FIG. 1B as a string value mated with the comments key of the nth element of the questions array element 206 of the mth element of the categories array element 202 of the lth element of the domains array 200 of FIG. 2. Alternatively assume that, with respect to question 436, the user selected the selection element associated with the label "Human Resources (HR)." This selection would be stored within the document 156 as an element in the selection matrix 212. Specifically, in the context of an answer being selected from among a set of proposed answers associated with the nth question within the mth category of the lth domain, the selected answer may be stored within the document 156 as a value in the selection array element 212 of the selected response element of the nth element of the questions array element 206 of the mth element of the categories array element 202 of the lth element of the domains array 200.

In some implementations, a score, such as a risk score, is calculated for at least a portion of the times when the document is updated (308). For example, as discussed above, in the context of questions having form types that call for the user to select one or more answers from a list of potential answers, each potential answer may be associated with a summand value that is mated with the score key. For example, when the user makes a selection to answer a particular question, a value equal to the sum of the summands associated with all of the selected answers (which may be restricted to a single answer or may not be so restricted, as has been discussed previously) may be stored as a value associated with the score key in the selected response array 210 of FIG. 2. Thus, in some embodiments, each such answered question is both stored and given a score (which is also stored in the document) such as a risk score.

In some implementations, if the user has neither completed the questionnaire nor logged out (310), the user may continue answering questions within the questionnaire while the method 300 continues to receive the user interactions providing further sets of answers (306). Otherwise, if the user has completed or logged out, in some implementations, the document is saved (312). For example, the document 156 may be stored in the data store 152. According to some embodiments, the document is stored in association with a user identification. Thus, if the user was to have time to only partially complete the questionnaire, when the user logged out (310), the document would be stored in association with his user identification. When the user subsequently logged in to continue his work on the questionnaire, the particular document associated with his user identification would be retrieved. The data and its structure within the particular document associated with his user identification would represent all of the answers (and scores resulting therefrom) that the user had previously given. Thus, when the document was rendered again pursuant to operation 302, the user interface would be displaying the questionnaire in the state the user had previously left it in, e.g., the user interface would present the answers previously entered or selected by the user.

According to some embodiments, the document is stored in association with more than one user identifications. Thus, if a first user were to only partially complete the questionnaire, when that first user logged out, the document would be stored in association with his user identification and a second user's identification. The second user may be another employee or representative of the same enterprise the first user represents or works for. When the second user subsequently logged in to work on the questionnaire, the particular document associated with his user identification would be retrieved, e.g., the same document that was used in connection with the first user. The data and its structure within the particular document associated with the second (and first) user identification would represent all of the answers (and scores resulting therefrom) that the first user had previously given. Thus, when the document is rendered pursuant to operation 304, the user interface would be displaying the questionnaire in the state the first user had previously left it in, presenting the answers previously entered or selected by the first user. The second user may then attend to questions that the first user did not answer.

The method 300, in some embodiments, may include more or fewer operations than illustrated in FIG. 3. For example, according to some embodiments, the domain by which the user accessed the platform is used to retrieve a cascading style sheet that is tailored to a third-party organization on behalf of which the platform is operating and posing questions. Thus, the document may be rendered in operation 304 in conformity to a cascading style sheet so that the visual appearance of the user interface conforms to the style and brand image of the third-party entity.

It is notable that a single call to the data store 152 of FIG. 1B, in some implementations, returns a document that can be used to render and store the entire user interface 158 including a great many visual elements and data elements such as answers previously entered via the interface of the vulnerability assessment engine 108. This is a notable improvement relative to a scheme in which each of such elements (for example, each previous answer entered by a user) is retrieved individually, and this improvement results in a suppression of the call load on the data store 152.

According to some embodiments, the user interface 158, upon first rendering, initially presents a summary navigation screen such as the user interface 400 shown in FIG. 4A.

The user interface 400 includes a single selectable control 402-416 for each domain defined by the domains array 200. With the first control 402, the contents may specified by the information in the first entry in the domains array 200 of FIG. 2. For example, the icon may be retrieved from the URL that is mated to the icon key of the first entry of the array 200, the title may specified by the string mated to the domain title key of the first entry of the array 200, and so on), and with respect to the second control 404, its contents are specified by the information in the second entry of the domains array 200, and so on. Selection of control 404, in some embodiments, causes the user interface 158 of FIG. 1B to respond by bringing the user to the screen depicted in FIG. 4B. Selection of any other control 402, 406-416 may cause the user interface 158 to present the user with a screen identical in structure to the screen of FIG. 4B, with the exception being that the content therein is focused on the particular domain named on the corresponding control 402, 406-416.

According to some embodiments, the user interface 400 includes a button 405, the selection of which, in some implementations, causes the user interface 158 to present the user with an overview of the score earned by virtue of the answers presented by the user. An example of such is presented in FIG. 5A.

Figure 5A:
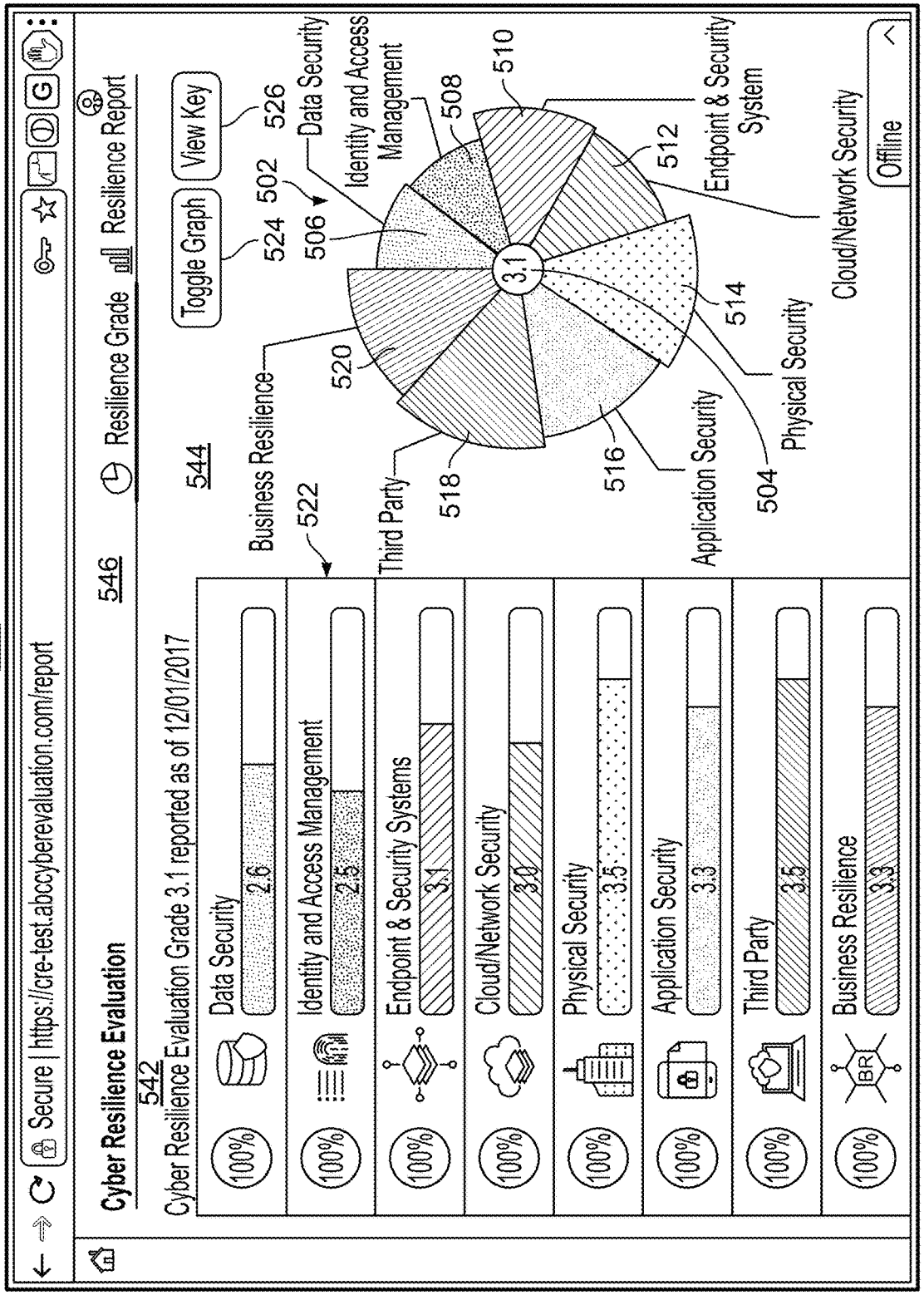
FIGS. 5A-5D depict example screen shots associated with a user interface for assessment of cyber security vulnerability.

FIG. 5A depicts a screen shot of an example user interface 500 presenting cyber security vulnerability assessment information including vulnerability scores. In some embodiments, the vulnerability scores are generated functionally (as a function of at least the answers to some of the questions posed by the vulnerability assessment discussed in relation to FIGS. 4A and 4B). The vulnerability scores, for example, may be calculated by the vulnerability assessment module 108 of FIG. 1A. The scores, for example, may be calculated using a logic structure such as the logic structure shown in FIG. 6, discussed below.

The user interface 500 contains three sections 542, 544 and 546. Section 542 may contain selectable elements 522 for each entry in the domains array 200 of FIG. 2 (e.g., one selectable element for each domain). Each selectable element 522, in some embodiments, contains the title of the domain, and indication of its progress towards completion (e.g., an indication of the percentage of questions that have been completed), and the score earned in the domain. The process of determining the name of each domain and progress made with respect to answering questions within the domain, as derived from the array structure represented in FIG. 2, has been covered above. With respect to generating the score earned within each domain for presentation on the selectable domain elements in section 542, recall that a score may be associated with each question where the answer was selected from a list of potential answers or responses (this score is saved as a value mated to the score key in the selected response element within each question's entry in the questions array 206 of FIG. 2). According to some embodiments, for each question within each category of each domain of the domain array 200, the values mated to the score key of the selected response element 210 are summed. Thus, a raw total score is developed for each category of each domain. According to some embodiments, the raw total score of each category within a domain may be summed to produce a raw total score for each domain. Moreover, according to some embodiments, the raw total scores for each domain may be summed to produce a raw composite score.

According to some embodiments, the aforementioned raw scores for each domain are presented directly in the selectable elements 522 of section 542 to indicate the risk score associated with each domain.

According to other embodiments, for each question within each category of each domain, the values mated to the score key of the responses array element 208 of FIG. 2 are summed. In the event where the form type of a particular question permits selection of a plurality of answers ("MULTI-SELECT" is mated to the form type key), each of the values associated with each such score key may be included in the sum. In the event where the form type of a particular question permits selection of only one answer ("SINGLE-SELECT" is mated to the form type key), only the largest of the values associated with each such score key may be included in the sum. Thus, a raw total possible score is developed for each category each domain. According to some embodiments, the raw total possible score of each category within a domain is summed to produce a raw total possible score for each domain. Moreover, according to some embodiments, the raw total possible scores for each domain are summed to produce a raw composite total possible score. According to some embodiments, the ratio between the total raw score earned within a domain and the total possible score associated with such domain is used to present the risk scores in the selectable elements 522 of section 542. For example, any given such ratio may be multiplied by a chosen maximum risk score, e.g., 4, so that the risk score of each domain presented within section 542 takes on values ranging from 0 to 4.

In general, the rendering of operation 304 of the process 300 of FIG. 3, in some implementations, is performed on a section-by-section basis by accessing the document 156 of FIG. 1B to determine quantities of visual elements that should be displayed in each section of each screen within the user interface 158. The user interface 158 thus conforms to any number of domains and categories and permits a user to navigate among them. The user interface also conforms to any number of questions (focused on any topic of inquiry) within each such category or domain. Questions need not be organized into categories; they may be directly associated with domains by inclusion of a categories element array 202 directly within a domains array 200, as illustrated in FIG. 2. Additionally, the document 156, in some embodiments, contains information and such information is structured so as to permit a score such as a risk score to be developed from user input received via the user interface 158, and the scoring system is adaptable to any number of questions (focused on any tropic of inquiry). The user interface 158 thus permits the user to navigate throughout a questionnaire from domain to domain or from category to category, or to view score information on a domain-by-domain basis or a category-by-category basis, based on the information within the document 156 and the structure of such information.

As can be seen, the user interface 500 of FIG. 5A presents a circular chart 502 with composite vulnerability score 504 at its center in a main section 544 of the user interface 500. The composite vulnerability score 504, in some embodiments, is a summary of vulnerability scores assigned to each security domain. The vulnerability scores assigned to each security domain, as illustrated, are presented graphically as wedged shapes 506-520 that extend from the center composite vulnerability score 504 of the circular chart 502. The security domains include a data security domain 506, an identity and access management security domain 508, an endpoint & security systems domain 510, a cloud/network security domain 512, a physical security domain 514, an application security domain 516, a third-party domain 518, and a business resilience domain 520. In other embodiments, more or fewer domains may be included in the chart 502. The domains, for example, may differ based upon the compositions of the systems and networks of a particular entity. Although a pie radar chart is chosen to illustrate the risk scores of each domain, it is understood that other graphical forms or charts could be used in section 544.

In some implementations, the wedged shapes 506-520 representing the security domains extend from the central composite vulnerability score 504 in proportion to the magnitude of the score assigned to the particular security domain represented by the particular wedge shape 506-520. For example, the "Physical Security" domain 514 is presented as having a higher vulnerability score than the "Data Security" domain 506 by virtue of its greater extension from the center of the circular chart 502.

A menu 522, in some embodiments, depicts the exact score assigned to each security domain 506-520. As can be seen, the "Physical Security" security domain 514 was assigned a score of 3.5, while the "Data Security" security domain 506 was assigned a score of 2.6.

Figure 5B:
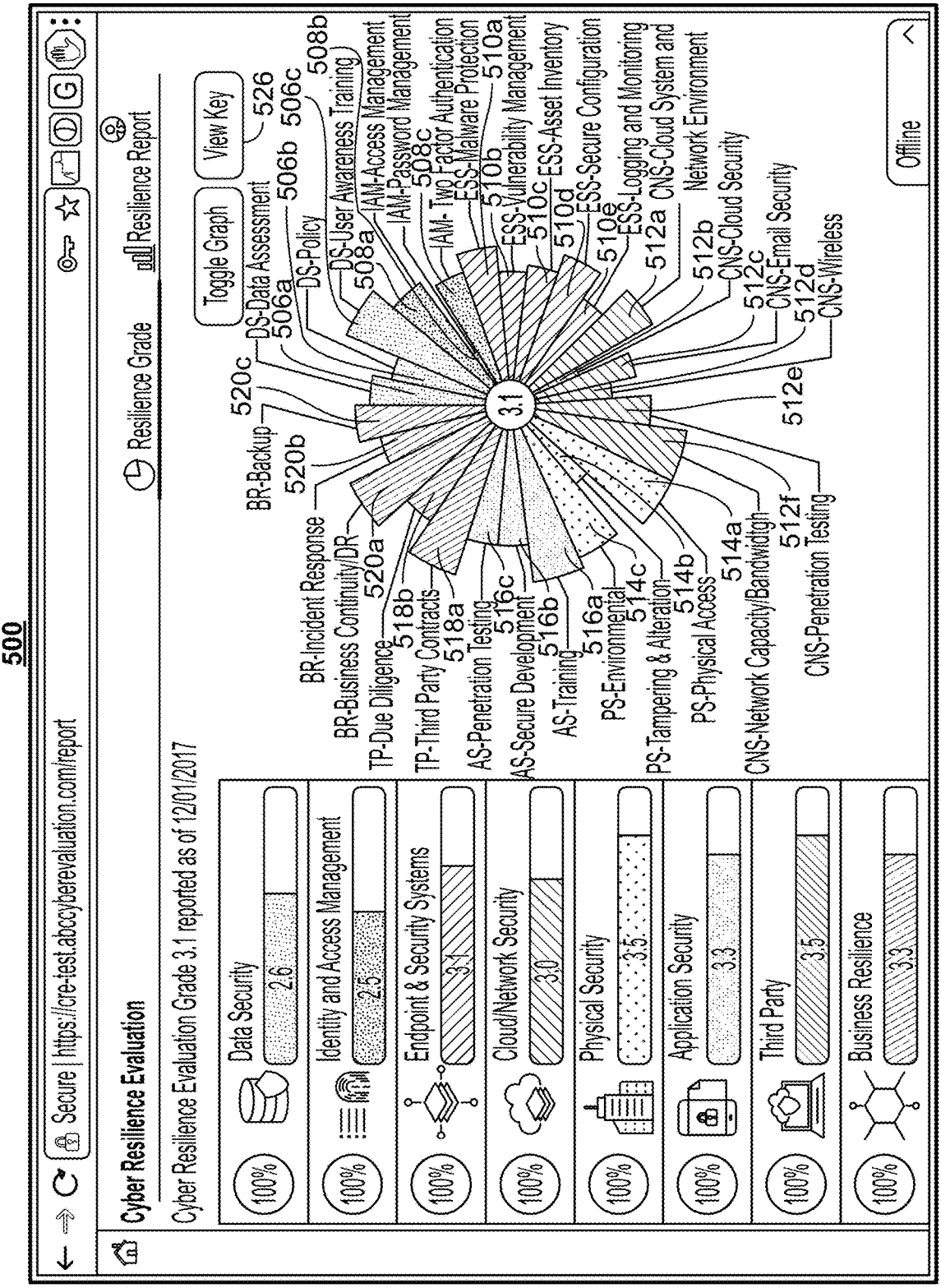
Figure 5C:
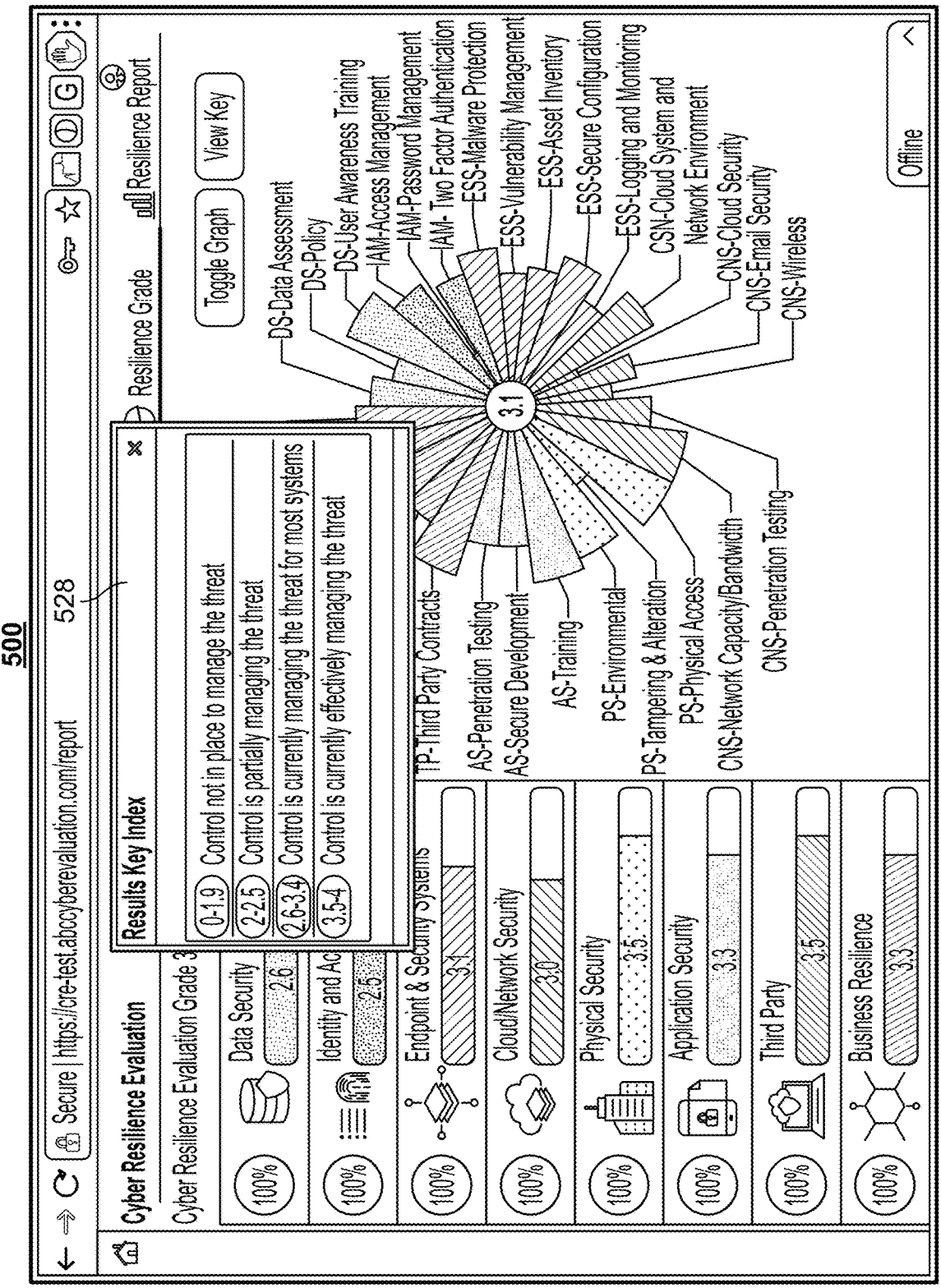

The user interface 500 of FIG. 5A, in some implementations, includes a "Toggle Graph" control 524. In response to selection of the control 524, as illustrated in FIG. 5B, each wedge 506-520 in the circular chart 502 may be visually fractured into smaller wedges or sub-wedges, each of which represents the vulnerability score assigned to a subdomain of the respective wedge 506-520 that the sub-wedge represents. For example, the wedge 520 representing the business resilience security domain is visually fractured into three sub-wedges-one for each subdomain within the business resilience security domain: a "business resilience—disaster recovery" sub-wedge 520a; a "business recovery—incident response" sub-wedge 520b; and a "business resilience—backup" sub-wedge 520c.

The user interface 500 of FIG. 5A also includes a "View Key" button 526, which when selected, in some implementations, presents a key 528 (illustrated in FIG. 5C) explaining the meaning of the scores (or range of scores) used by the vulnerability assessment module 108. The scores, in some implementations, are color-coded by range, the color-codings corresponding to levels of severity of vulnerability.

Figure 5D:
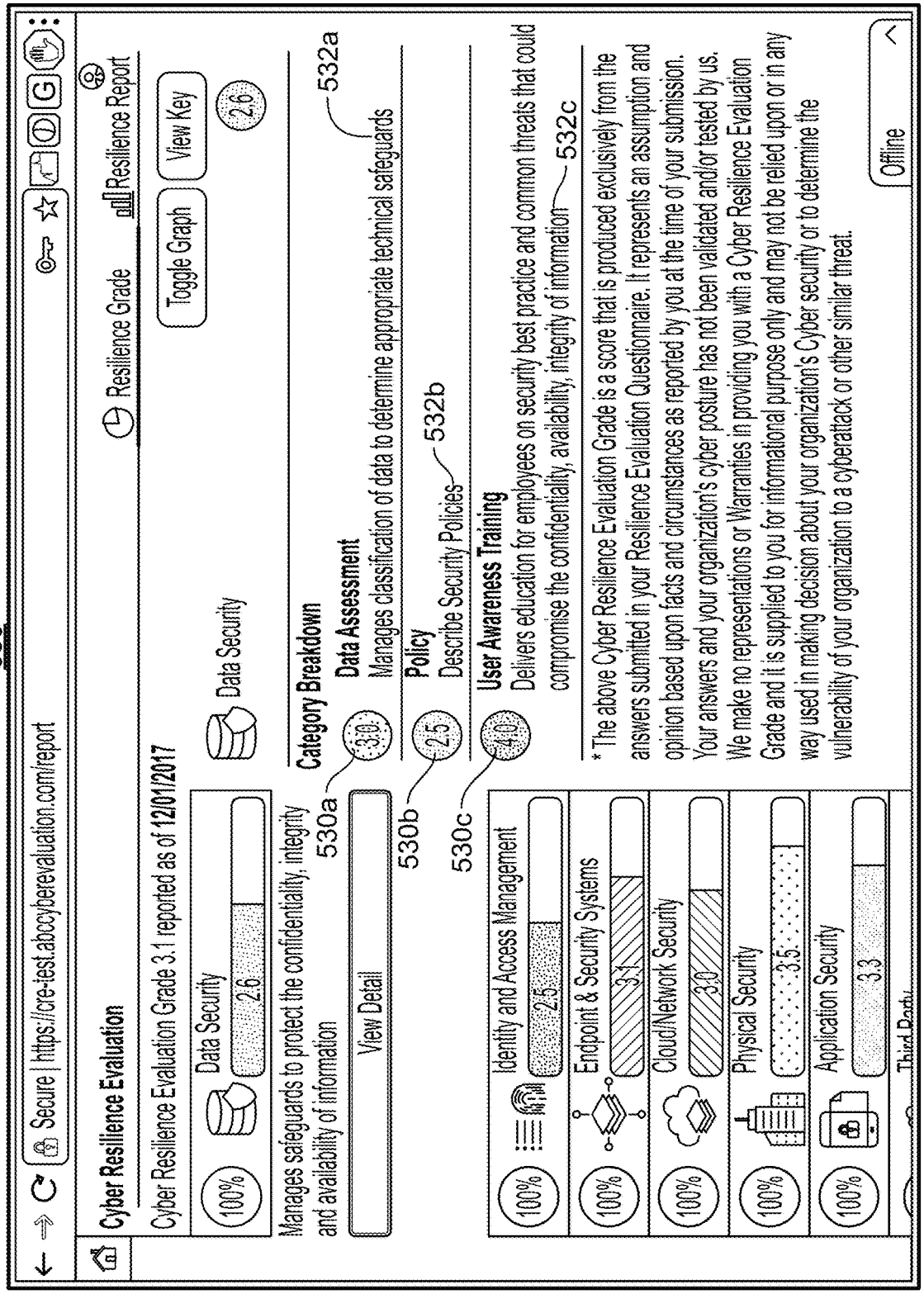

Returning to FIG. 5A, in some implementations, selection of a particular security domain in the menu 522 results in a presentation of the scores 530 assigned to each subdomain within the chosen security domain 506-520, as shown in FIG. 5D. A brief description 532 of each security subdomain may also be presented.

Figure 6:
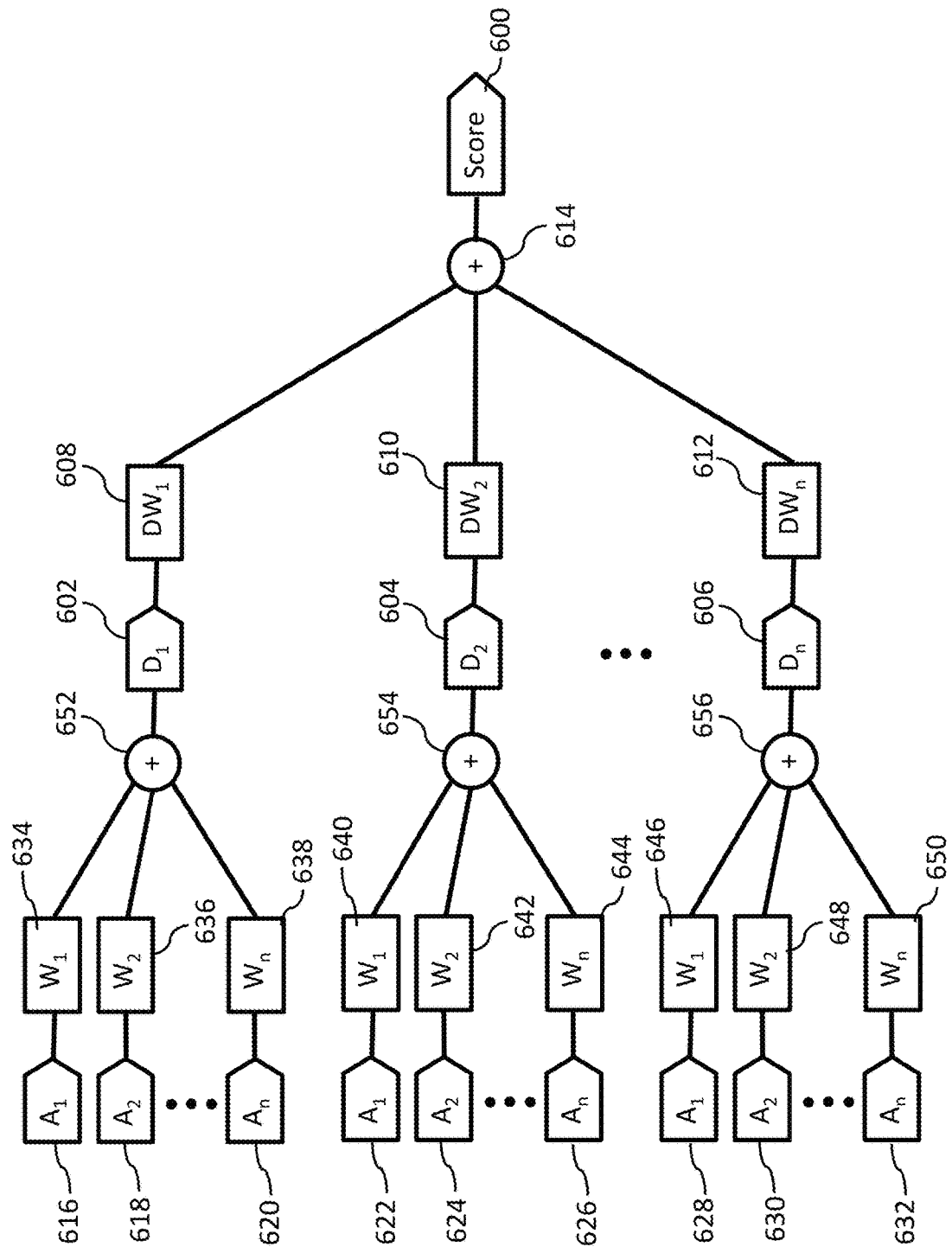
FIG. 6 depicts a logic chart of an example scheme to generate a vulnerability assessment score.

FIG. 6 depicts an operational flow diagram of an example logic flow scheme 600 by which a vulnerability score 600 may be generated functionally. The logic flow scheme, for example, may be executed by the vulnerability assessment module 108 of FIG. 1A to determine one or more vulnerability scores. The vulnerability score 600, in some embodiments, is a composite score that presents a numeric value that reveals the overall vulnerability of a system to cyber compromise based upon assessment across a number of security domains. According to some embodiments, the higher the composite vulnerability score 600, the less likely the assessed system is to be compromised. According to other embodiments, the higher the composite vulnerability score 600, the more likely the assessed system is to be compromised. As discussed in the context of this document, example outputs assume that the former relationship holds, e.g., the higher the composite vulnerability score, the less likely the assessed system is to be compromised.

In some embodiments, the composite vulnerability score 600 is a function of a composite domain-level scores 602, 604, 606 that reveal the risk level found to exist in each security domain. In one example, the data security of a given system may be relatively poor, and the score assigned to that domain may be 125 (out of 600), while the physical security around the devices constituting the system may be relatively robust, so the score assigned to the physical security domain may be 550—much higher than the score assigned to the data security domain, to reflect its relative strength. Although FIG. 6 depicts three composite domain-level scores 602, 604, 606, it is to be understood that the scheme presented herein will include as many composite domain-level scores as there are security domains—one composite domain-level score for each security domain. Each composite domain-level score, in some implementations, is adjusted by a domain-level weight 608, 610, 612, designed to reflect the overall importance of a given security domain to the assessed enterprise's systems. For example, each domain-level score 602, 604, 606 may be multiplied by the associated domain-level weight 608, 610, 612. Domain-level weights may take on fractional or integer values, and may, in some cases, be negative. As can be seen from FIG. 6, in some implementations, the resulting products are added together by a summing module 614 to produce the overall composite vulnerability score 600.

Each domain-level score, in some embodiments, is a function of the answers the user 102 provided to the questions posed by the user interface (such as the user interfaces of FIGS. 4A and 4B) with respect to the particular security domain. In other embodiments, each domain-level score is a function of assessments performed by representatives of the platform 100. For example, the domain-level scores may be functions of findings a field service team records, typically while on-site at an enterprise, via mobile devices 113, and stored in the service data store 111 as discussed in relation to FIG. 1A. Findings, and an example user interface for presenting and managing them, are discussed with reference to FIGS. 7A-7H. In certain embodiments, at least a portion of the information used in developing each domain-level score is automatically obtained. For example, a network assessment software package may assess tools positioned by an information technology (IT) department of an entity.

Returning to the embodiment in which each domain-level score is a function of answers the user 102 provided to the questions categorized as "belonging" to a given security domain, each answer that forms a basis for the composite vulnerability score 600 may be given a numerical score. In some instances, the question, itself, may have called for a numerical answer, in which case the answer, itself, is a number and may be directly used as a score, or may be mathematically transformed into a score via a scaling operation, or the like. In some instances, the question may have prompted the user to select an answer from a radio button array or other control or control group, in which case a score may be assigned to each radio button control. In still other instances, the question may have prompted the user to select as many entries in a checkbox array as apply to their enterprise's systems, in which case, each entry in the checkbox array may be assigned a score (e.g., each entry in the checkbox array may be assigned a score of "1"), and the ultimate score assigned to the answer may be the sum of each score generated by the user having "checked" an entry in the checkbox array.

By whatever means a score was assigned to an answer, one or more of the answer scores for each security domain (e.g., answer scores 616, 618, 620, 622, 624, 626, 628, 630, 632, as depicted), in some embodiments, are multiplied by a corresponding answer weight (e.g., answer weights 634, 636, 638, 640, 642, 644, 646, 648, 650, as depicted).

The weights 634, 636, 638, 640, 642, 644, 646, 648, 650, in some implementations, are assigned a value by an expert. According to some embodiments, the weights 634, 636, 638, 640, 642, 644, 646, 648, 650 are initially assigned values by an expert and then adjusted from time to time by a learning process, such as the example learning process discussed with reference to FIGS. 8 and 9. The weights 634, 636, 638, 640, 642, 644, 646, 648, 650 may vary, in some implementations, based on a number of factors. The factors may include, in some examples, industry of the assessed enterprise, size of the assessed enterprise, or location of the enterprises facilities, assets, employees or customers.

In some implementations, and the resulting products of the answers multiplied by the weights are summed to assign the domain level score (e.g., 604) to the corresponding security domain. For example, answers 616, 618, 620 may be multiplied by weights 634, 636, 638 and summed by a summing module 652 to generate the domain-level score 602, answers 622, 624, 626 may be multiplied by weights 640, 642, 644 and summed by a summing module 654 to generate the domain-level score, and answers 628, 630, 632 may be multiplied by weights 646, 648, 650 and summed by a summing module 656 to generate the domain-level score 604n.

Figure 17:
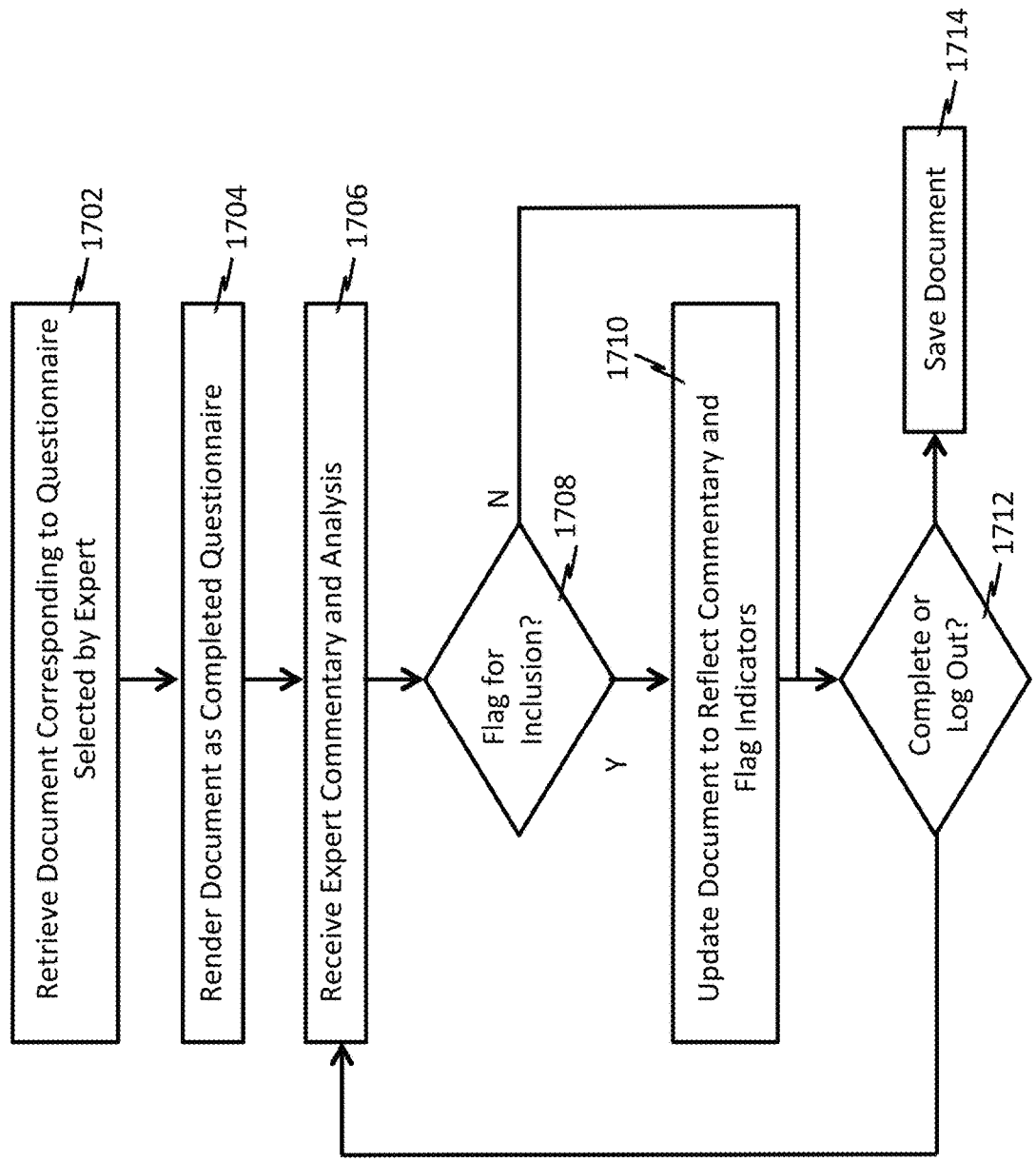
FIG. 17 depicts flow chart of an example method for presenting a user interface for obtaining expert analysis and commentary.

Turning to FIG. 1B and FIG. 17 simultaneously, another aspect of the process 150 is illustrated. As discussed earlier, in some embodiments, an expert may access a questionnaire filled out by a user to include commentary and analysis regarding the responses supplied by the user. FIG. 17 is a flow chart of an example method 1700 for obtaining such commentary and analysis.

Turning to FIG. 17, in some implementations, a document is retrieved corresponding to a questionnaire selected by an expert (1702). For example, a subject matter expert may access the platform 100 of FIG. 1A and be presented with a user interface 162 of FIG. 1B to permit the expert to select a completed questionnaire that he wishes to review. In response, as illustrated in FIG. 1B, a particular document 164 corresponding to the selected questionnaire may be retrieved from the data store 152. In the context of a questionnaire pertaining to cyber threat vulnerability, for example, a subject matter expert may be a cyber security expert who has expertise in such matters as operating systems, encryption techniques, security practices, attack vectors and other matters of the like. In the context of a questionnaire directed to probing risk arising out of another matter, the subject matter expert would be one who understands the aforementioned other matter and the risks arising out of it.

Figure 18A:
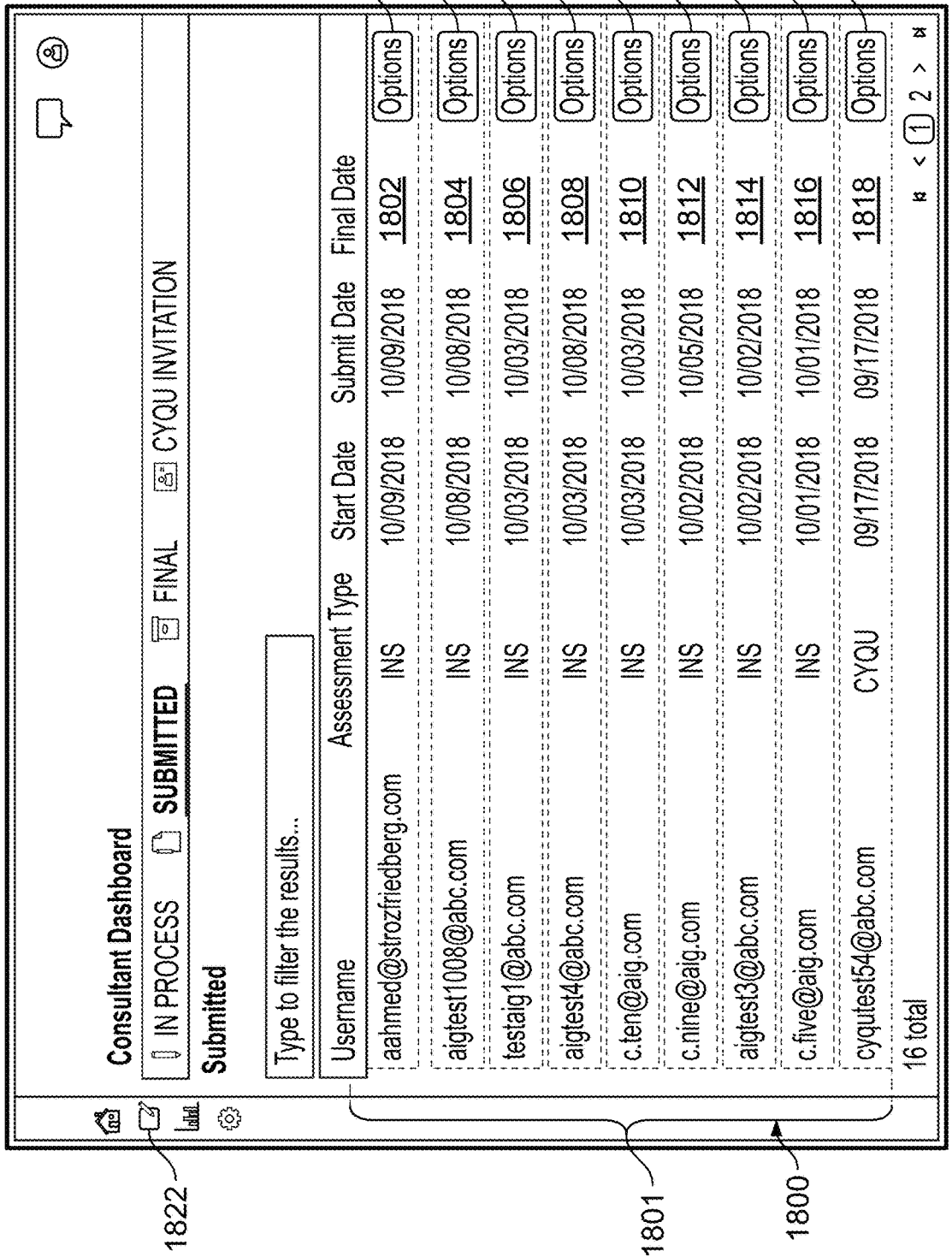

FIG. 18A depicts a screen shot of an example user interface 1800 for providing expert access to a questionnaire. The user interface 1800, for example, may be presented by the user interface 162 of FIG. 1B responsive to operation 1702 of the method 1700 of FIG. 17. According to some embodiments, a subject matter expert accesses the user interface 1800 through selection of navigation element 1822. The user interface 1800 may include a list 1801 identifying completed questionnaires. The list 1801, for example, includes entries 1802-1818 that state information pertaining to each completed questionnaire accessible by the accessing user (e.g., expert consultant). According to some embodiments, the entries 1802-1818 include the identity of a submitting user (or primary user) associated with each particular questionnaire, an identification of the type of the questionnaire (i.e., an identification of the sort of risk the questionnaire pertains to or the identification of a third party on behalf of which the platform 100 of FIG. 1A is operating), a date on which the submitting user began answering the questionnaire, the date upon which the questionnaire was completed, and a date upon which a final report pertaining to the risk vulnerability of the user or enterprise the user represents was produced.

Each entry 1802-1818, in some implementations, includes a selectable element 1820 permitting, upon selection, the subject matter expert to access the associated questionnaire. In response to selection of one of the selectable elements 1820, the user interface 1800, in some embodiments, presents a list 1830 of actions, as depicted in FIG. 18B. The action list 1830, for example, includes an option for the expert to provide feedback (e.g., entitled "Consultant Feedback"). Turning to FIG. 17, in response to selection of the feedback option, the process 1700 may retrieve the document corresponding to the selectable element. Further, the user interface 162 of FIG. 1B may render the associated questionnaire in its completed state (e.g., the questionnaire revealing the answers provided by one or more users on behalf of the enterprise).

Figure 18C:
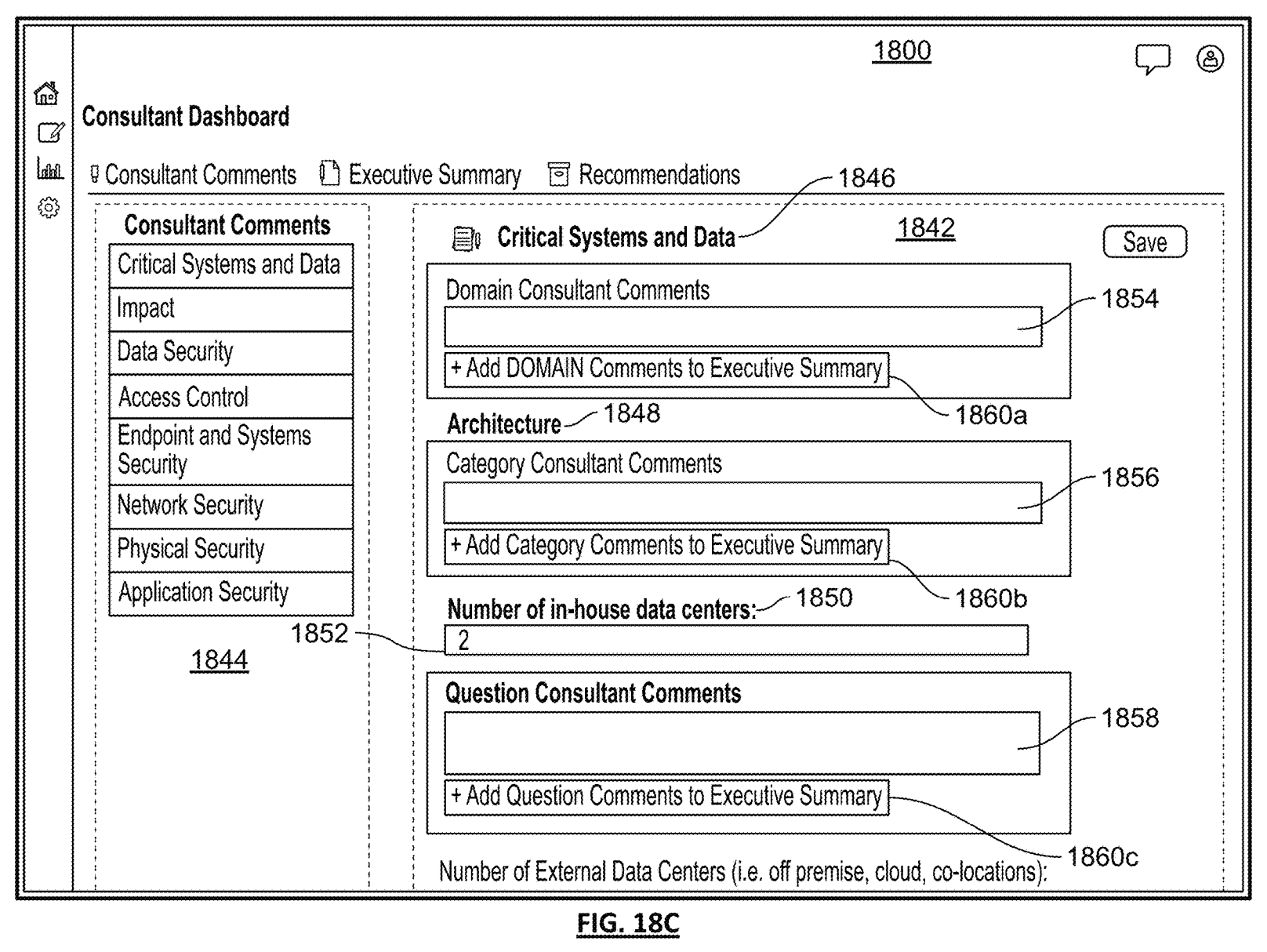

Turning to FIG. 17, in some implementations, the selected document is rendered as a completed questionnaire (1704). Turning to FIG. 18C, the user interface 1800 now includes sections 1842 and 1844 corresponding to the selected questionnaire. Section 1842, in some embodiments, presents questions that had been presented to a user pursuant to the probing of a particular domain, presents the answers that the user had provided, and organizes the questions and corresponding answers according to the categories within the particular domain that is the focus of section 1842. At the top of the section 1842 is the title 1846 of the particular domain that is the focus of the section 1842. A discussion of how to access the document 164 of FIG. 1B to obtain a domain title in accordance to the array structure of FIG. 2 has been presented previously and will not be repeated.

The section 1842 also includes a heading 1848 for each category within the domain that is the focus of the section 1842. A discussion of how to access the document 164 of FIG. 1B to obtain category titles associated with a domain in accordance to the array structure of FIG. 2 has been previously presented and will not be repeated. Each question associated with each category is also presented in section 1842. As can be seen, a prompt 1850 of the first question within the first category of the particular domain that is the focus of the section is presented. The user input 1852 provided in response to the prompt is also presented. A discussion of how to access the document 164 to obtain each question within a category, the user's response thereto, and each category within a domain in accordance to the array structure of FIG. 2 has already been presented and will not be repeated.

FIG. 18C is a partial depiction of the screen presented therein. Section 1842 extends beyond the bottom of the view. Upon scrolling down, for example, the user would see every category within the domain that is the focus of section 1842, would see every question posed to the user in association with every such category, and would see the user's responses to each of such questions. Again, all of the data needed for presentation of section 1842, in some implementations, is derivable from the data and the organization of the data within the document 164 of FIG. 1B in accordance to the array structure of FIG. 2.

The user interface 1800 presentation depicted in FIG. 18C, in some implementations, allows a subject matter expert to review all of the answers provided by the user to the questionnaire, and to form conclusions, recommendations, commentary, strategy, tactics, observations and/or suggestions in response thereto. Section 1844 contains selectable elements that permit the expert to navigate between domains, and therefore change the focus of section 1842. Discussions pertaining to identifying the number of domains and titles for each such domain, in accordance to the array structure of FIG. 2 have already been presented and will not be repeated.

Notably, section 1842 includes text input fields 1854, 1856, and 1858. The subject matter expert may enter text (e.g., conclusions, recommendations, commentary, strategy, tactics, observations, suggestions and the like) into the text input fields 1854, 1856, and 1858. Text input field 1854, for example, pertains as a whole to the particular domain that is the focus of section 1842. In text in put field 1854, the expert can enter information 166 (see FIG. 1B) that is relevant to the entire domain. Similarly, for each category, there is a text input field (e.g., text information field 1856) that permits the expert to enter information 166 that is relevant to the category. Finally, for each question, there is the text input field 1858 that permits the expert to enter information 166 that is relevant to the particular question.

Turning to FIG. 17, in some implementations, expert commentary and analysis is received through interaction with the rendered document (1706). Any information 166 of FIG. 1B entered into any of the text input fields 1854, 1856, and 1858 of FIG. 18C, in some embodiments, is received by the process 150 of FIG. 1B for potential inclusion in the document. For example, expert uses the user interface 162 of FIG. 1B to enter information 166 that is associated either with a domain, a category of a domain, or with a question.

According to some embodiments, each text input field 1854, 1856, and 1858 within the section 1842 has a selectable element 1860 associated with it. Selection of one of the elements 1860, for example, causes the information in the associated textbox 1854, 1856, and 1858 to be entered into a report that is generated by the platform 150 of FIG. 1B. Correspondingly, turning to FIG. 17, in some implementations it is determined whether particular information entered into a questionnaire by an expert is flagged for inclusion in a corresponding one or more reports related to the questionnaire (1708). For example, the process 150 of FIG. 1B may determine whether one of the element 1860 was selected in the user interface 1800 as illustrated in FIG. 18C.

If there is information flagged for inclusion (1708), in some implementations, the document is updated to reflect the content of the information entry (1710). For example, the document 164 of FIG. 1B may be updated to include a flag indicating that the information previously entered into the document should be included in one or more of the aforementioned reports.

In some implementations, whether or not the information is flagged for inclusion (1708), upon completion or logging out of the expert (1712), the document is saved (1714). For example, the document 164 of FIG. 1B may be stored in the data store 152.

If, instead, the expert has not logged out or otherwise completed interaction with the document (1712), in some implementations, the method 1700 continues with receiving additional expert commentary and analysis (1706).

Thus, in some implementations, the single document 156 of FIG. 1B initially contains data that, between its content and organization, permits a user interface to present a questionnaire to a user, for the questions to be organized into domains and categories, and for the questionnaire to be navigable between domains and categories. Moreover, as a user answers the questions, the questions are stored in the document 156. That same document designated in the drawing as document 164 (e.g., the same version or a separate copy of document 156) can be used to present a user interface for an expert, wherein the user interface permits the user to view the questions posed to the user and the corresponding user response on a category-by-category and domain-by-domain basis, and to enter free form information relevant to either a particular question, to a category as a whole, or to a domain as a whole. That same document 164 may be used to store the expert information and can store an indicator that any particular unit of information be included in a report that the process 150 outputs.

Moreover, as can be seen from FIG. 1B, in some implementations, the same document now designated as document 168 (e.g., the same version as document 164 or a copy thereof) may be drawn from the data store 152 in the wake of questionnaire completion, and delivered to a converter engine 170 for converting the contents of the document 168 into a shareable file format. For example, the converter engine 170 may convert the contents of the document 168, organized as the questionnaire and corresponding user responses in the array structure illustrated in FIG. 2, to a traditional document format 172, such as a portable document format (PDF) file, text file such as a Microsoft Word formatted file, or slide presentation such as Microsoft PowerPoint. In another example, the converter engine 170 may convert the document 168 into a report structure 174 including one or more stylized reports. The reports, for example, may present graphs, tables, and other illustrative organizations of the contents of the completed questionnaire. According to some embodiments, the report structure 174 includes portions that present risk scoring information. According to some embodiments, the report structure 174 further includes expert information, such as that which is entered via text input fields 1854, 1856, and 1858 of FIG. 18C. According to some embodiments, the report structure 174 further includes user responses to certain questions, such as is found in the questions array 206 and selected response array 210 of FIG. 2. In some embodiments, the report structure 174 is designed for rendering as a graphical user interface, such as the user interface 700 illustrated in FIGS. 7A-7H. For example, the document datastore 103 of FIG. 1A may include graphic assets and other general assets for rendering the report structure 174 as an interactive web interface.

Figure 19:
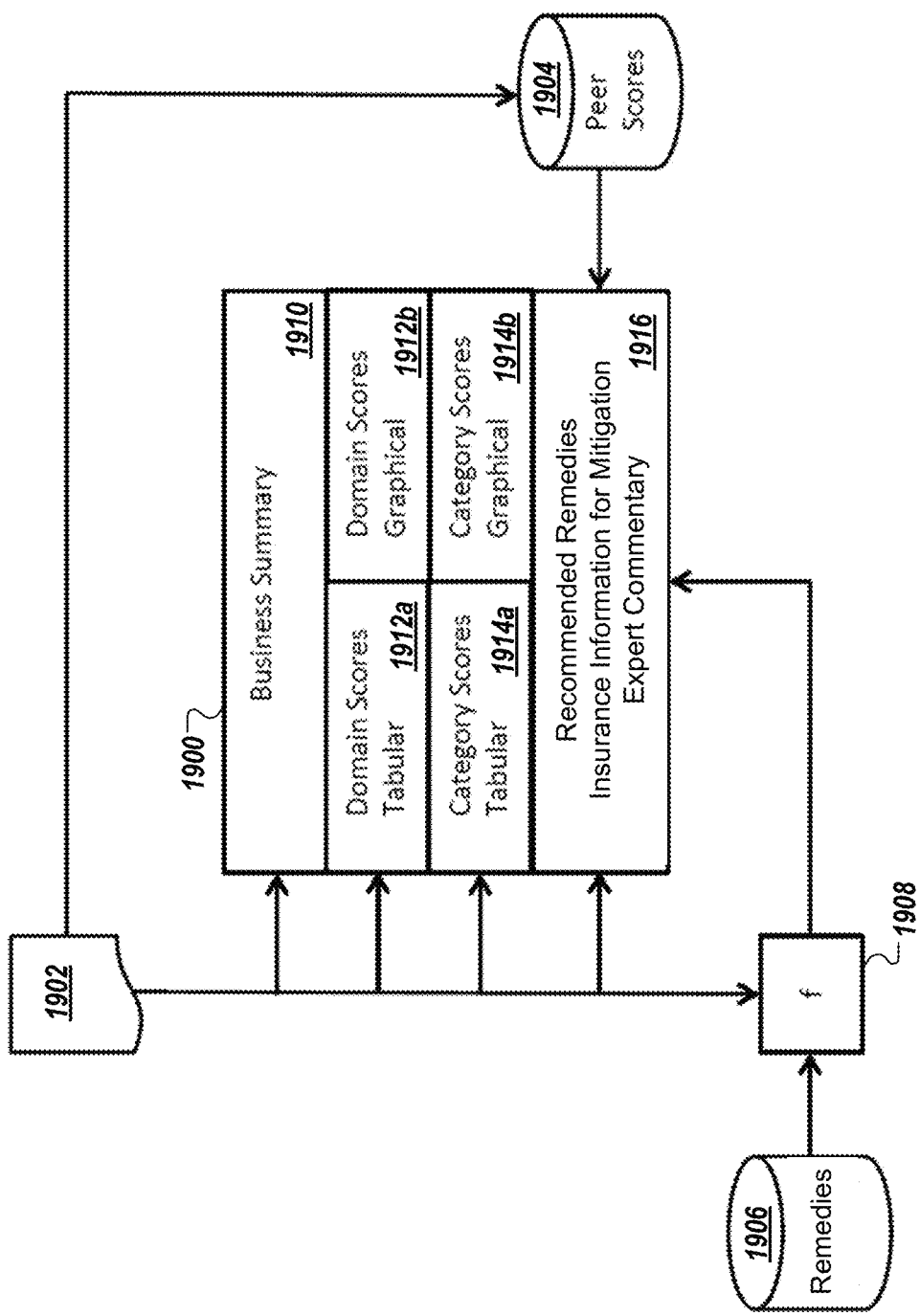
FIG. 19 depicts a block diagram of an example report structure.

FIG. 19 depicts a block diagram of an example report structure 1900 that is created using a document 1902. In some implementations, the report structure 1900 is developed based upon the array-based structure of the document 1902, such as the array-based structure described in relation to FIG. 2. The document 1902, for example, may be one of the documents 154 of FIG. 1B, such as one of the documents 156, 164, or 168.

In some implementations, the report structure 1900 includes a business summary section 1910. The information in the business summary section 1910, for example, may be drawn from document 1902 according to the schemes described previously in relation to the array structure depicted in FIG. 2. The business summary section 1910 may include information that provides a general overview of the industry that a particular enterprise is situated and its position therein, as well as overview information of the sorts of sensitivities the enterprise has and the network architecture the enterprise employs. According to some embodiments, the business summary section 1910 may state the industry, annual revenue of the enterprise, Information Technology (IT) budget of the company, budget allotment for IT or information security, number of full-time employees in IT functions, and number of full-time employees dedicated to IT security functions. According to some embodiments, the business summary section 1910 may also provide a list of the critical applications and data maintained by the company. According to some embodiments, the business summary section 1910 may include a statement of the number of internal and external data centers employed by the company. At least a portion of the information included in the business summary section 1910, for example, may be derived from answers provided by a user through interaction with the control 402 of the user interface 400 of FIG. 4A.

The report structure 1900, in some implementations, also includes one or more domain scores sections 1912 for presenting scores earned in each domain responsive to answers provided in the questionnaire. The information required for populating the domain scores sections, in some embodiments, is also drawn from the document 1902, for example in the manner described previously in relation to documents formatted with the array structure illustrated in FIG. 2. According to some embodiments, the domain scores are presented in a table format 1912*a* (e.g., see FIG. 7C) and in a graphical format 1912*b* (e.g., see FIG. 7A), such as via a pie radar chart or chart of another variety.

Figure 7A:
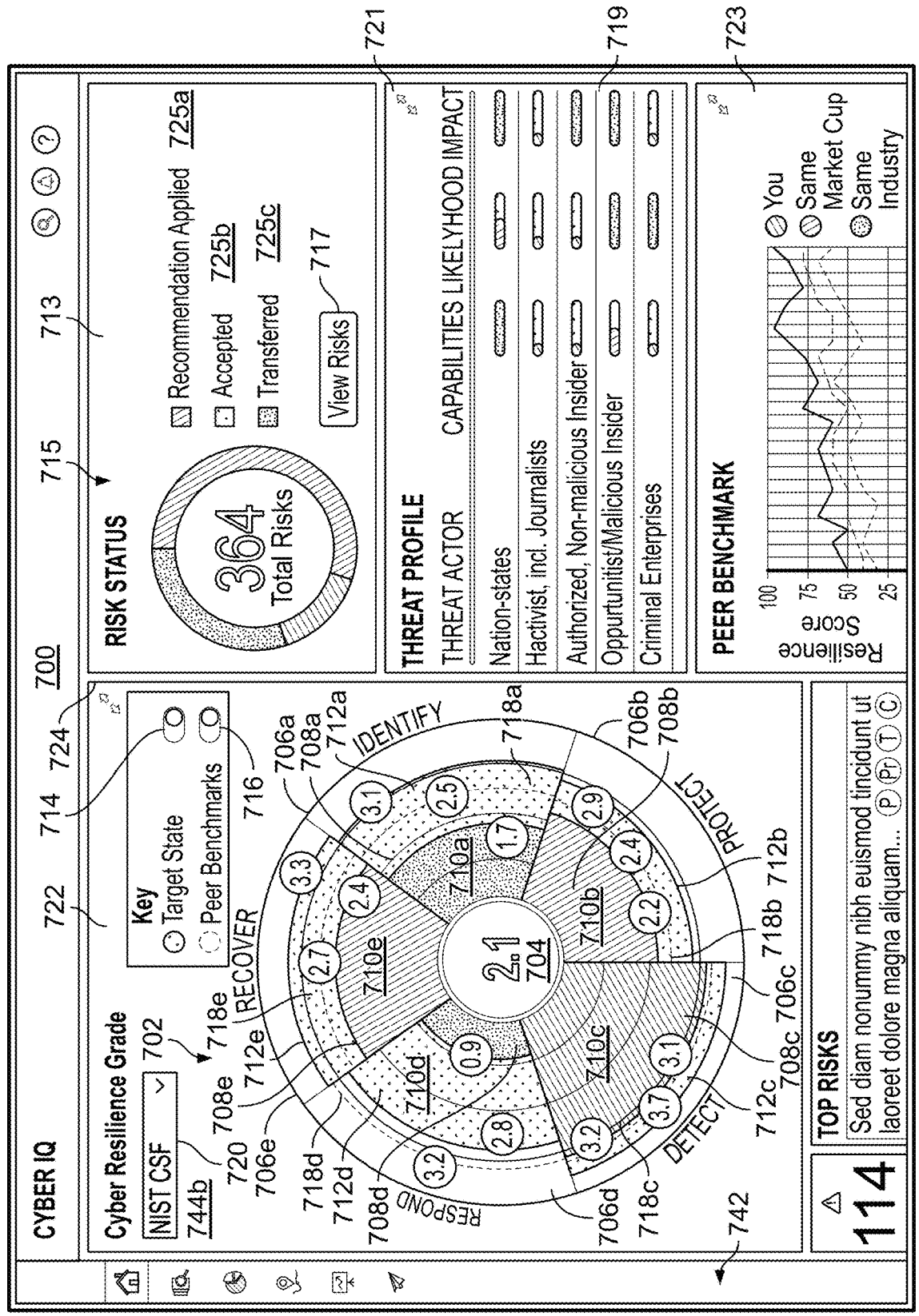

According to some embodiments, the information in the document 1902 (such as industry information) is used to formulate a query against a data store 1904 of peer scores in order to obtain the scores earned by peers of the business under evaluation. The peer scores, for example, may be obtained on a domain-by-domain basis. Thus, the result is that for each domain, the report presents the score earned by the business under evaluation and the average score earned by its peers. The peer scores are presented in tabular form 1204 and graphical form 1206, according to some embodiments. The peer scores, for example, may be presented in one or more of the domain scores sections 1912, as illustrated in FIG. 7A and described below.

The report structure 1900, in some implementations, also includes one or more sections 1912 that present the scores earned in each category of each domain. This information may also be drawn from the document 1902, in the manner described previously. According to some embodiments, the category scores are presented in a table format 1914*a* (e.g., one table for each domain) and in a graphical format 1914*b*, such as via an exploded pie radar chart (e.g., as shown in FIG. 5B) or chart of another variety. According to some embodiments, the information in the document 1902 (such as industry information) is used to formulate a query against the data store 1904 of peer scores in order to obtain the scores earned by peers of the enterprise under evaluation on a category-by-category basis. Thus, the result is that for each category of each domain, the report may present the score earned by the enterprise under evaluation and the average score earned by the enterprise's peers. The peer scores, similarly, may be presented in tabular form 1914*a* and graphical form 1914*b*.

The report structure 1900, in some implementations, contains a conclusions section 1916 that includes, in some examples, recommendations pertaining to remedial actions the enterprise under evaluation could take to suppress the particular risk under assessment, expert commentary, and/or information regarding insurance coverage to mitigate risk. According to some embodiments, the section 1916 presents the scores earned in each category of each domain as just described. In association with each domain, a set of recommended remedial actions that have been determined algorithmically may be presented, along with actions (or observations or other information or metadata) that have been entered by a subject matter expert for inclusion in the report with regard to a particular domain. In one example, the remedies portion of the report may be similar to the presentation of remedies illustrated in FIG. 7D.

According to some embodiments, the answers provided by the user in association with a given domain are drawn from the document 1902 and used as input to a function 1908 (example: linear function, random forest, logistic regression) to determine which of a set of remedies 1906 are applicable to help raise the user's score in the given domain.

One aspect to be appreciated is that the report structure 1900 of FIG. 19 permits for automatic creation based on the data within the document 1902, when combined with other data sets 1904 and 1906. An initial draft of the report, in some implementations, can be created algorithmically from the structure of the document 1902 and the report structure 1900, as well as the contents of the data sets 1904, 1906 shown in FIG. 19.

FIGS. 7A-7H depict example screen shots of a user interface 700 for presenting a composite vulnerability score 704, and other related information. According to some embodiments, the data presented on the example screen shots of FIGS. 7A-7H results from a field team having operated on-site at an enterprise. In some examples, a field team may interview personnel, examine policies and procedures, observe operations and behaviors, and/or perform cyber exploration, penetration, and vulnerability examinations. The field team may record information related to the operations as findings pertaining to the enterprise via a field agent user interface that is presented on a portable computing device, such as computing devices 113 of FIG. 1A. The data entered via the field agent user interface may be stored in a non-transitory computer readable medium such as the service data store 111 of FIG. 1A. The data may be accessed, for example by the vulnerability management tool 112 of FIG. 1A which then provides the example screen shots of FIGS. 7A-7H. According to other embodiments, the data presented on the example screen shots of FIGS. 7A-7H results from a user 102 having answered questions posed via user interfaces as described in relation to FIGS. 4A and 4B, which may be presented, for example, by the vulnerability assessment module 108 of FIG. 1A. The answers and data generated from the vulnerability assessment module 108, for example, may be stored in the service data store 111 and accessed by the vulnerability management tool 112 to provide the example screen shots of FIGS. 7A-7H.

As can be seen in the user interface 700 of FIG. 7A, in some implementations, a composite vulnerability score 704 is presented at the center of a circular chart 702. The circular chart 702, as illustrated, is divided into five sections 706, one for each security domain (e.g., an identify domain 706a, a protect domain 706b, a detect domain 706c, a respond domain 706d, and a recover domain 706e). The presented security domains, for example, may be populated as defined pursuant a security domain scheme chosen via a drop-down menu 720. In the context of FIG. 7A, the chosen security domain scheme is National Institute of Standards—Cyber Security Framework (NIST CSF), and the security domains defined by it are: "Recover," "Identify," "Protect," Detect," and "Respond." In another example, the security domains may correspond to the security domains 506-520 of FIG. 5A. Each section 706a-e may have a colored region 708a-e that extends outward from the center of the circular chart 702, with the extent of its extension being in proportion to a domain-level vulnerability score earned by the assessed enterprise in the respective security domain 706a-e. Thus, a region 708c within a security domain section 706c labeled "Detect" extends outwardly considerably more than a region 708d in a security domain section 706d labeled "Respond," because the assessed enterprise had a domain-level vulnerability score 710c of "3.1" in the "Detect" security domain, while it only had a domain-level vulnerability score 710d of "0.9" in the "Respond" security domain.

Each section 706 of the chart 702, in some embodiments, also includes a gray region 712, which indicates a score that the enterprise should aspire to achieve in the particular security domain in which the region 712 is situated. The aspirational scores are also known as target scores. The gray regions 712 extend outwardly, with the extent of their extension being in proportion to the particular target score a particular region 712 represents. The presence or absence of the gray regions 712, in some embodiments, is controlled by a toggle control 714. In the context of FIG. 7A, the toggle control 714 is activated ("ON"), meaning that the regions 712 are presented on the user interface.

Each section 706 of the chart 702, in some embodiments, also includes an arc 718 that is presented as a dotted line, and which indicates a score that industry peers have achieved in the particular security domain 706 in which the region 708 is situated. The arcs 718a-e may be situated at radial distances from the center of the circular graph 702 that are representative of the scores that industry peers have achieved in the particular security domain 706 in which the region 708 is situated, e.g., the longer the radial distance at which an arc 718 is situated, the higher the score it represents. The presence or absence of the arcs 718 may be controlled by a toggle control 716. In the context of FIG. 7A, the toggle control 716 is activated ("ON"), meaning that the arcs 718 are presented on the user interface.

A data region 722 on which the circular chart 702 is situated, in some embodiments, contains an expansion control 724. In response to the user selecting the expansion control 724, in some embodiments, the data region 722 is expanded to a full screen depiction, such as the example screen shot illustrated in a graphical user interface 730 of FIG. 7B. The example screen shot of FIG. 7B contains the circular chart 702, drop down menu 720, and toggle controls 714 and 716 contained in FIG. 7A. The example screen shot also contains a menu 732 with one entry in it for every security domain 706a-e presented by the circular chart 702. As can be seen, each entry on the menu 732 contains the name of the security domain that corresponds to the entry, and the domain-level vulnerability score 710 corresponding to the security domain 706.

As illustrated, the entry relating the "Identify" security domain 706a is selected in the menu 732. The selected entry is expanded to include a broad, high-level description 728 of the security domain 706a related to the selected entry, and to include an "Open Findings" control 726. Also, the sectors of the circular chart 702 are grayed, with the exception of the particular sector corresponding to the selected entry 706a in the menu 732.

Figure 7B:
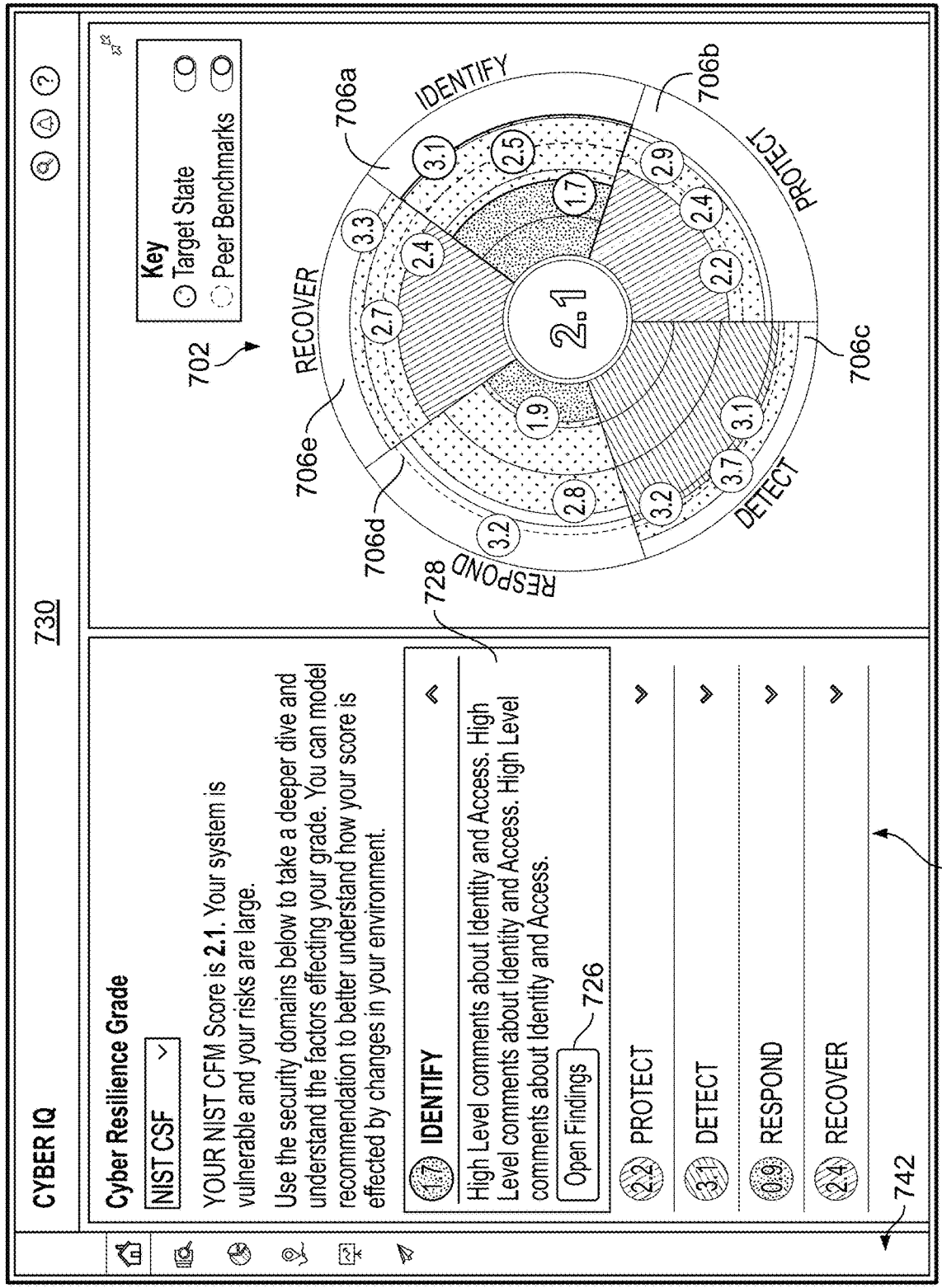
Figure 7C:
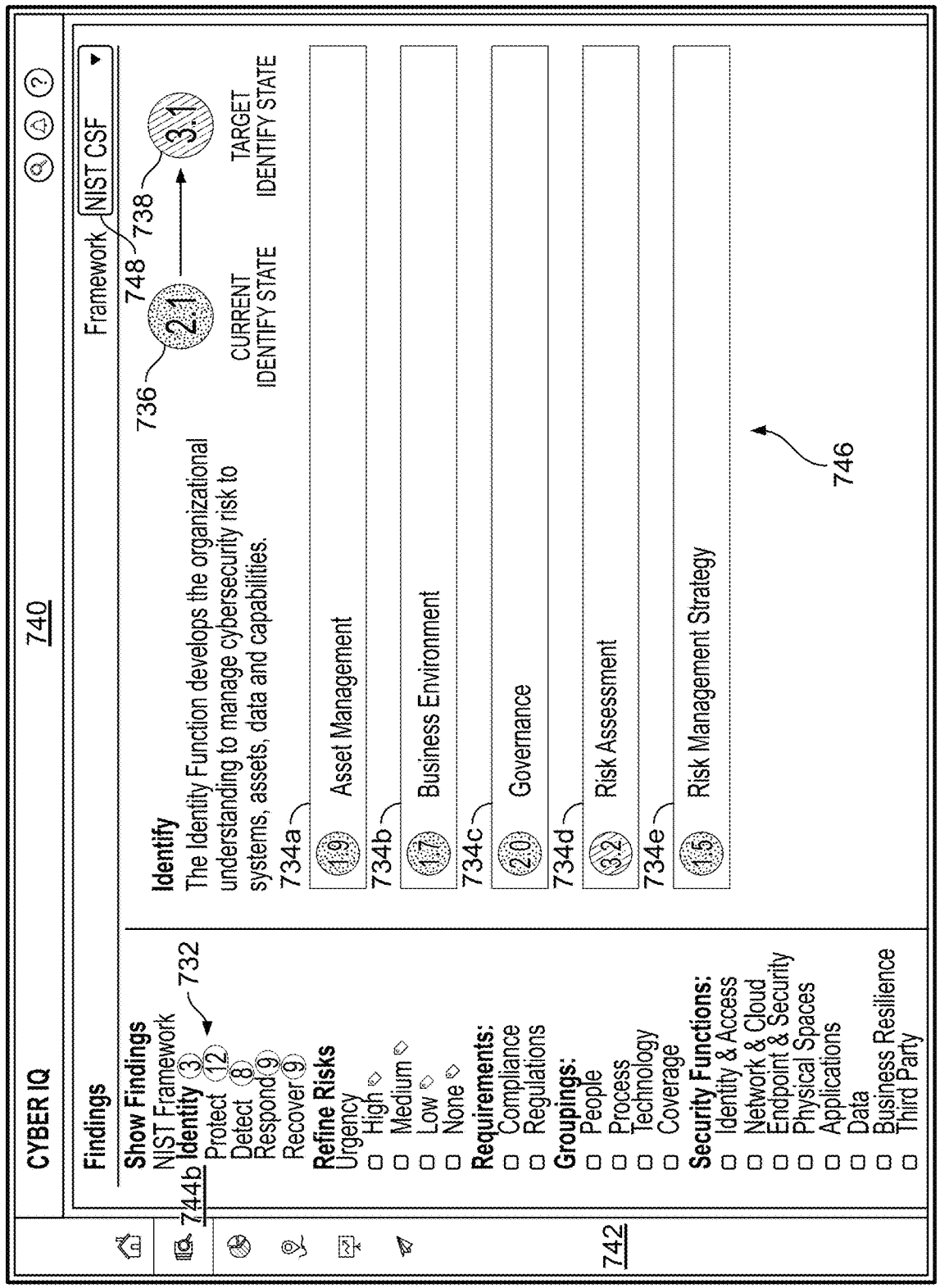

In some implementations, selection of the "Open Findings" control 726 of FIG. 7B results in presentation of a user interface 740, as illustrated in an example screen shot of FIG. 7C. Alternatively, selection of an icon 744b of navigational bar 742 may navigate the user to the user interface 740. The user interface 740 of FIG. 7C includes a menu 746 having entries corresponding to security subdomains of the particular security domain that is both highlighted in a domain menu 732 along the left-hand side of the screen and specified at the top of the screen. In the case of FIG. 7C, the screen is oriented toward the "Identify" security domain, meaning subdomains within the "Identify" security domain are presented within menu 746. A subdomain-level vulnerability score 734a-e is presented on each entry of the menu 746, with each such score 734 corresponding to the particular subdomain identified on the entry on which the score is situated.

Toward the upper right-hand corner of the screen, a domain-level vulnerability score 736 assigned to the particular domain selected from the domain menu 732 (e.g., domain-level vulnerability score 710a of FIG. 7A) is presented, along with an indication of the target score 738 (e.g., target 718a of FIG. 7A).

Returning to the subdomain menu 732, the entries therein, in some embodiments, are selectable, and the user may select another domain.

Toward the upper right-hand corner of the screen, there is a menu 748 by which the user may select the security domain scheme. This corresponds, for example, to the drop-down menu 720 of FIG. 7A. For example, if the security domain scheme is altered via the menu 748, the score and findings may be categorized under security domains and security subdomains belonging to the chosen security domain scheme.

Upon selection of a particular security subdomain, in some embodiments, the entry may expand to reveal security findings organized under the particular subdomain that was selected within the menu 746. According to some embodiments, the findings presented are findings that were entered by a field agent. According to other embodiments, the findings presented were generated as a result of the answers provided by the user to the vulnerability questionnaire discussed with reference to FIGS. 4A and 4B.

According to some embodiments, a finding contains three varieties of data components. A finding may include an observation, which is a description of a state of affairs of the assessed system. According to some embodiments, observations are stated in verbiage that specifically identifies a particular state of affairs in a way that it could be repeated with respect to a system other than the particular assessed system and still make sense. A finding may also include a risk, which is an articulation of a liability associated with the particular observation to which it is associated. According to some embodiments, a risk is stated in verbiage that specifically identifies a liability in a way that it could be repeated with respect to a system other than the particular assessed system and still make sense. Finally, a finding may also include a recommendation, which is an articulation of a remedial action that the operators of the assessed system could take to address the observation and mitigate the risk. According to some embodiments, a recommendation is stated in verbiage that specifically identifies a remedial action in a way that it could be repeated with respect to a system other than the particular assessed system and still make sense.

According to some embodiments, a recommendation may have a one-to-many relationship with risks, meaning that a particular recommendation may remediate more than one risk. The relationship between recommendations and risks may be maintained, for example, by a data store used by the vulnerability management tool 112 of FIG. 1A. According to some embodiments, a risk may have a many-to-one relationship with observations, meaning that a particular observation may be associated with more than one risk. The relationship between risks and observations, for example, may be maintained by a data store used by the vulnerability management tool 112 of FIG. 1A. Moreover, the relationships between security domain schemes, security domain, security subdomains, findings, observations, risks, recommendations, composite vulnerability scores, domain-level vulnerability scores, subdomain-level vulnerability scores, dependent recommendations, and the other data required to produce the user interface of FIGS. 7A-7H may be maintained in a data store accessible by the vulnerability management tool 112 of FIG. 1A.

According to some embodiments, findings and their constituent observations, risks and recommendations are functions of answers provided via the vulnerability questionnaire discussed with reference to FIGS. 4A and 4B. As a result, a particular observation, risk or recommendation that is presented for a given system under evaluation in which a particular question was answered in a particular way or a particular subdomain was assigned a particular vulnerability score may not be presented for another system under evaluation, although that system also had the same answer entered on its behalf for the aforementioned question or was assigned the same subdomain vulnerability score.

As can be seen from FIG. 7D, three recommendations 752*a-c* are presented, each recommendation 752 including an indication 754 of a number of risks mitigated by the particular presented recommendation. is presented. For example, recommendation 752*a* is labeled as mitigating fifteen identified risks, and is therefore an example of a recommendation with a one-to-many relationship with risks. The user interface 750 of FIG. 7D also includes an indication of a respective number of recommendations 756 upon which implementation of the particular recommendation 752 is dependent upon. For example, according to a number of dependent recommendations 756*a*, the particular recommendation 754*a* requires that three other recommendations 754 be implemented prior to implementation of the particular recommendation 754*a*.

According to some embodiments, the presentation of each recommendation 752 is presented responsive to selection of the third-to-top entry 744*c* in the navigation tool bar 742.

The presentation of each recommendation 752, in some implementations, includes an "Ignore" control 758 and an "Apply" control 760. Selection of the "Ignore" control 758 may indicate that the user intends not to implement the recommended course of action. Selection of the "Ignore" control 758, for example, may remove the recommendation 752 from the list presented on the example screen shot of FIG. 7D. Further, ignoring the recommendation may result in the introduction of a list of ignored recommendations. In some embodiments, the user may be provided the opportunity to restore any recommendation from the list of ignored recommendations to the list presented in the user interface 750 of FIG. 7D at a later time for reconsideration.

Selection of the "Apply" control 760, in some embodiments, adds the corresponding recommendation 752 to a list of recommendations to be implemented 762 in a graphical user interface region 764 along the right hand of the user interface 750, and presents an impact of implementation of the score upon the domain-level vulnerability score as a modeled score 768. The modeled score 768, for example, may be equal to a base score 766 plus an impact of each of the recommendations in the applied recommendation list 762 selected by the user for application to the entity's infrastructure.

For example, it can be seen in the region 764 that while the actual domain-level score is "68" (as presented via the domain-level score indicator 766), the domain-level score would improve to "72" upon implementation of the recommendation list 762, as shown by the hypothetical domain-level score indicator 768.

Upon selection of further recommendations via the apply controls 760, in some implementations, the list 762 is updated to include a running list of all "applied" recommendations. Additionally, the hypothetical domain-level score indicator 768 may be updated from "72" to an improved score (for example, "78") to reflect the cumulative effect of implementing all of the recommendations contained in the list 762.

Figure 7E:
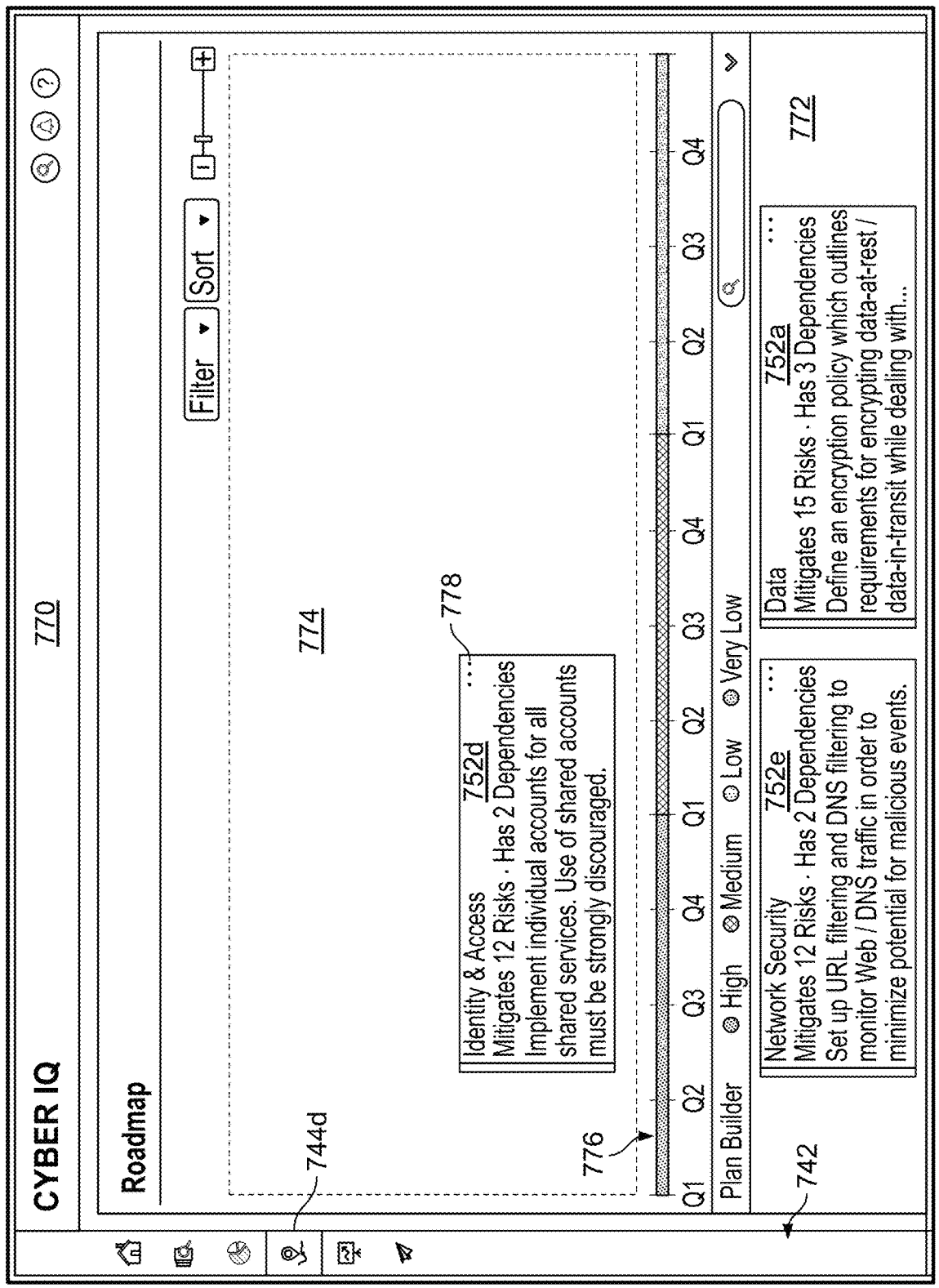

FIG. 7E depicts an example screen shot of a user interface 770 providing a "roadmap" service, to permit a user to model or approximate the various initiation and completion dates associated with implementation of one or more recommendations (including recommendation dependencies upon which particular recommendations rely). The user interface 770, for example, may allow the user an opportunity to further understand the associated costs and timing of those costs in implementing recommended mitigations to identified risks. The user interface 770 is presented, in some embodiments, in response to a user selecting the third-to-bottom icon/entry 744*d* in the navigation bar 742 of FIG. 7E.

The user interface 770, in some embodiments, includes a region 772 that presents the recommendations 752 that were "applied" (e.g., added to the list 762 of FIG. 7D) by the user. Each recommendation 752 in the region 772 may be selectable, and a user may "drag" a recommendation 752 into a timeline region 774, which provides a "key" 776, along its bottommost edge. For example, as illustrated, a user may have dragged a recommendation 752*d* into the region 774. The key 776 may indicate fiscal year and quarter, illustrated for example by the horizontal positioning of a particular recommendation 752, such as the illustrated recommendation 752*d*, within the timeline region 774. As can be seen, the user chose to align a leftmost edge of the recommendation 752*d* to align with a time period in between the second and third quarter of Year 1, indicating an initiation date for implementation of that recommendation 752*d* in that particular time period. The rightmost edge of the recommendation 752*d* aligns with a time period in between the second quarter of Year 2 and the third quarter of Year 2, indicating a completion date in that particular time period. The region 772 continues to contain the recommendations 752*a* and 752*e* which have not yet been "dragged" into the timeline region 774.

Figure 7F:
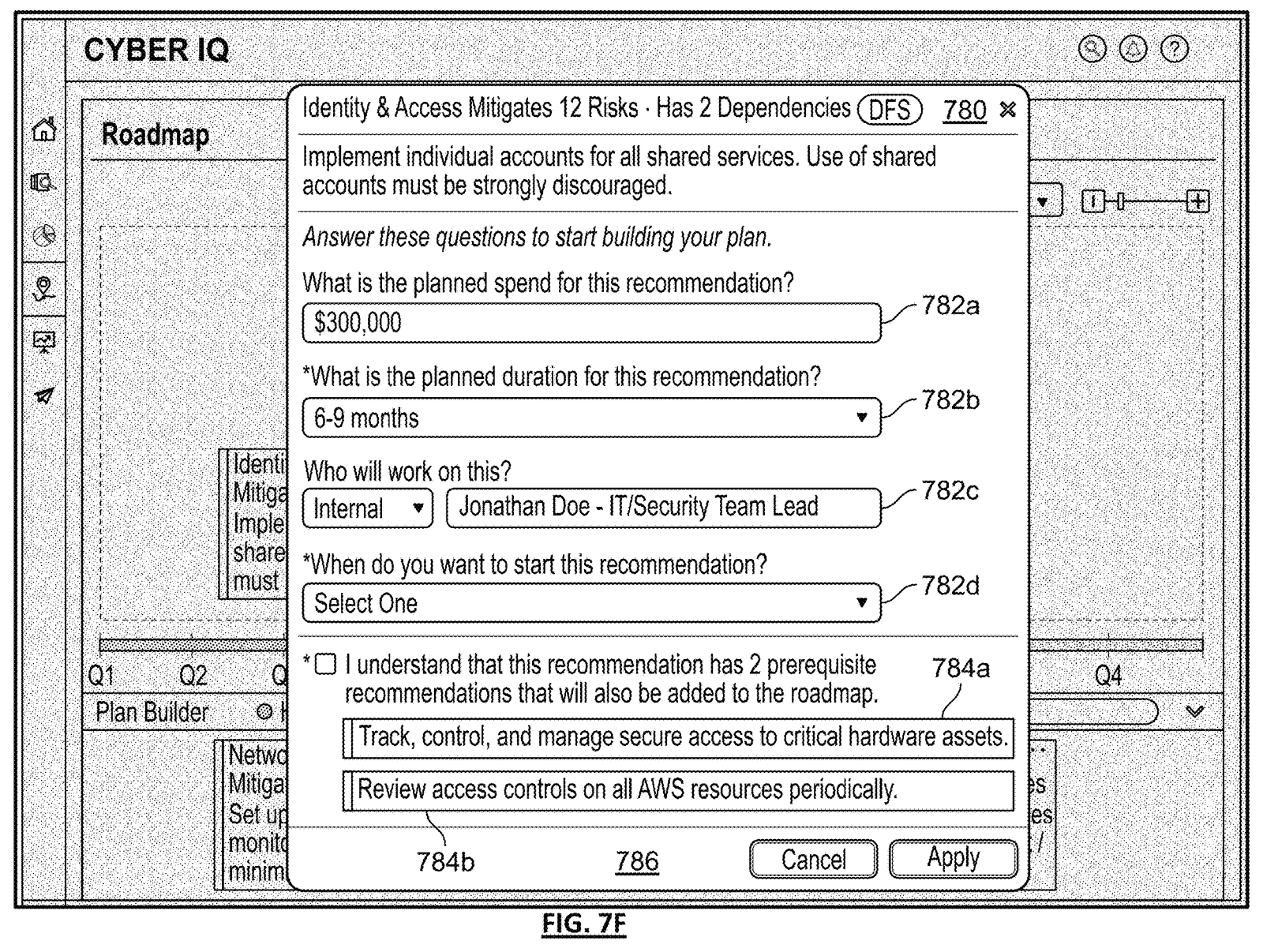

Selection of a menu icon 778 in the recommendation 752*d*, in some embodiments, presents an information entry user interface 780 depicted in an example screen shot of FIG. 7F. The user interface 780 may permit the user to enter an estimated cost 782*a* associated with implementation of the recommendation 752*d*, an estimated duration 782*b* for implementation, an identification of a responsible party 782*c* for implementation, an intended date of initiation 782*d*, and further identifies other recommendations (e.g., recommendation descriptors 784*a* and 784*b*) that must be implemented as antecedents to implementation of the recommendation 752*d*.

Figure 7G:
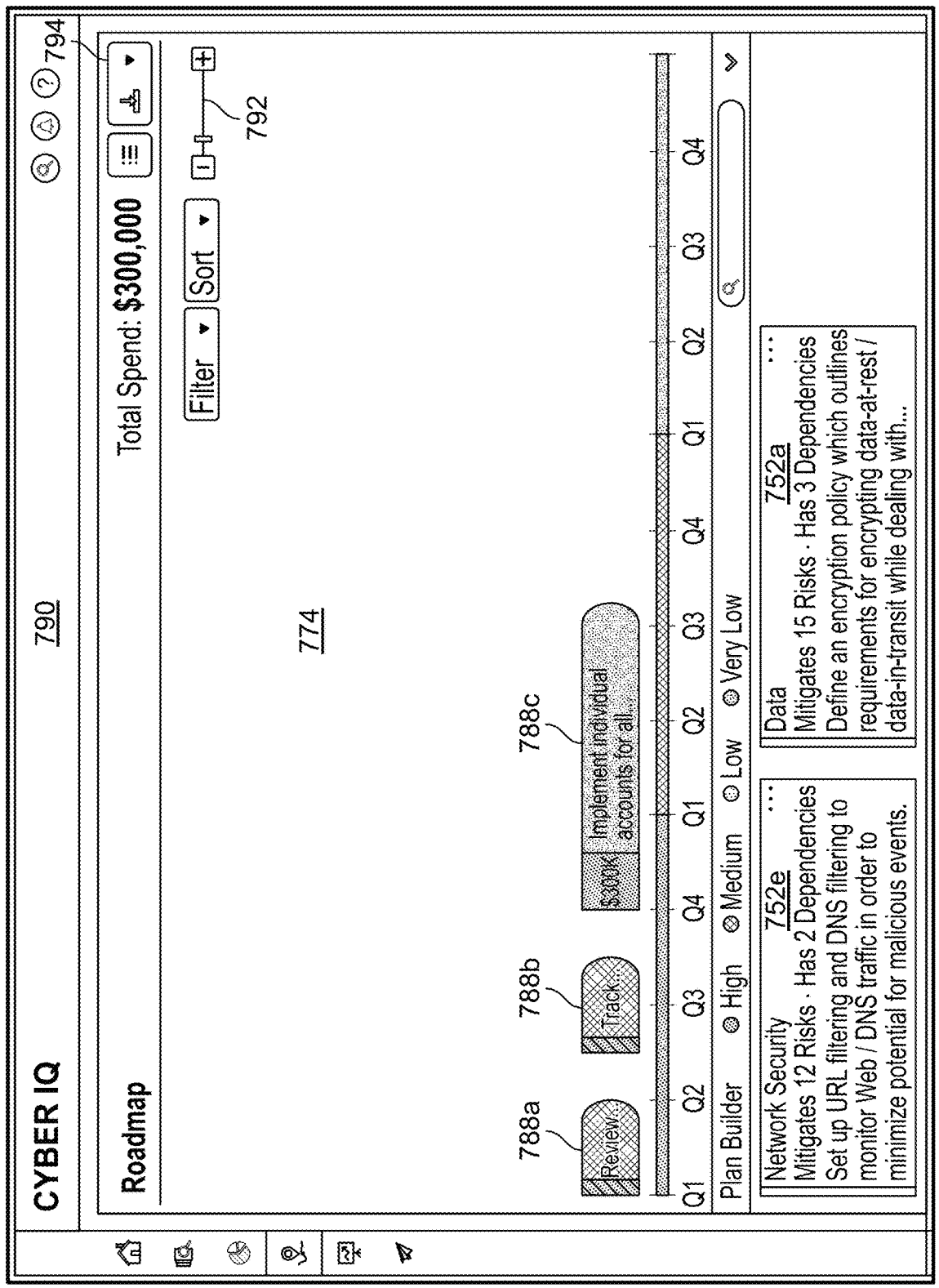
Figure 7H:
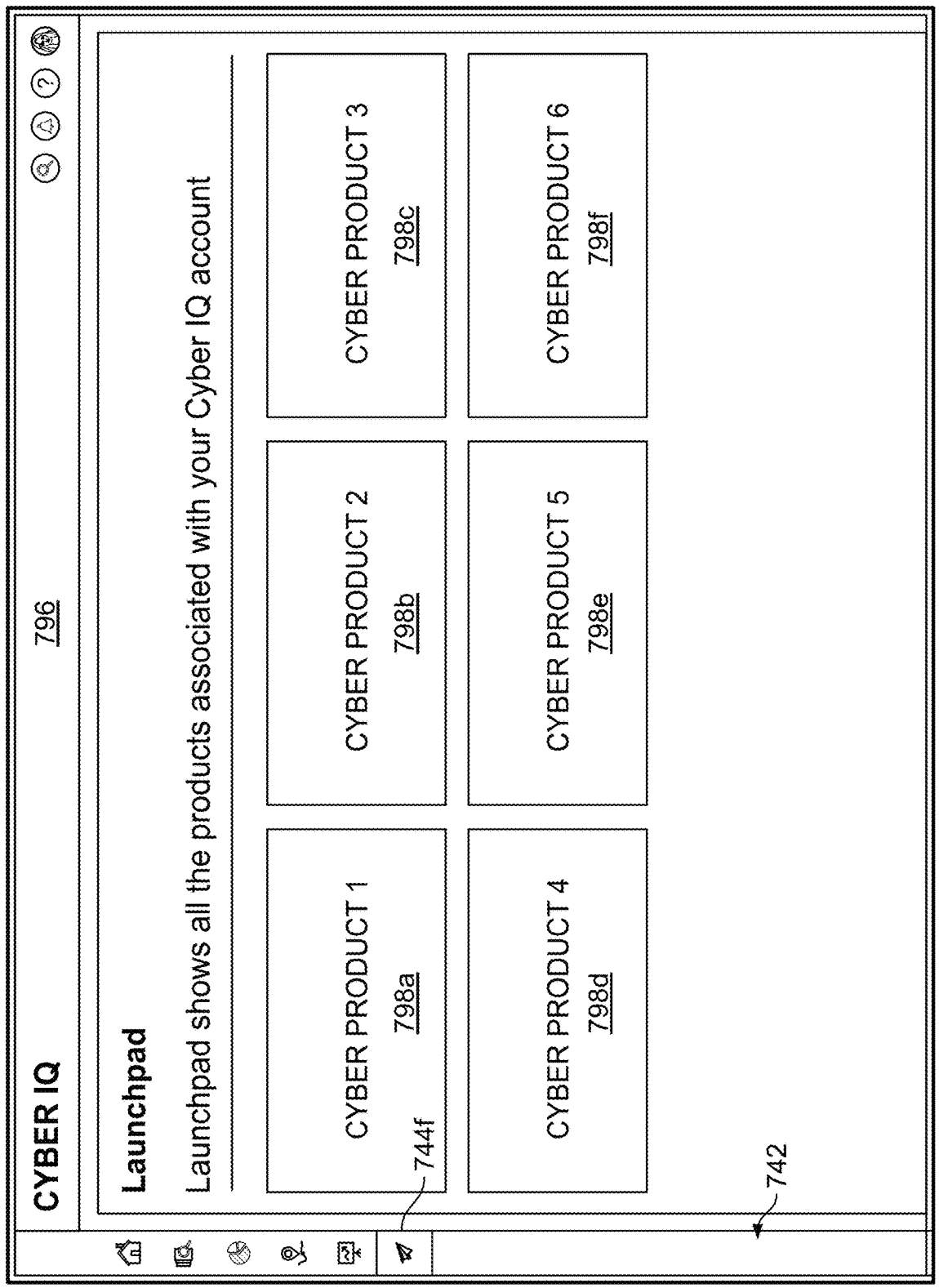

Upon selecting an "Apply" control 786, in some embodiments, the user is navigated to an updated version 790 as illustrated in FIG. 7Gof the user interface 770 of FIG. 7E, including detailed timeline information as captured by the information entry user interface 780 of FIG. 7F.

Turning to FIG. 7G, in some implementations, the recommendation 752*d* has been converted to stages 788 of implementation, including a first dependent recommendation stage 788*a* aligned within the timeline region 774 so that its edges correspond with the chosen initiation date 782*d*, a second dependent recommendation stage 788*b* aligned for application after the first dependent recommendation stage 788*a*, and a third recommendation stage 788*c* representing elected recommendation 752*d* and aligned to be completed within the estimated duration 782*b* entered through the user interface 780 of FIG. 7F. The third recommendation stage 788*c* may include an indication of its estimated cost 782*a*, as entered through the user interface 780 in FIG. 7F. The first stage 788*a* and second stage 788*b*, in some embodiments, are oriented within the timeline region 774 with default positions that are in advance of the timeframe indicated by the positioning of the third stage 788*c*.

The user interface 790, in some implementations, also contains a "zoom" selector 792 that permits a user to zoom in or out. A user may elect, for example, to zoom in on the third stage 788*c*. Selection of the third stage 788*c*, in some embodiments, results in presentation of a user interface (e.g., a pop-up window) presenting the information entered via the user interface 780 of FIG. 7F.

In some implementations, recommendations that have been "dragged" into the timeline region 774 may be sorted to distinguish which of the recommendations have been associated with a planned expenditure, and which have not.

In some implementations, selection of a download icon 794 may provide the user with the option of downloading the information presented in the user interface 790 in a file format. Upon selection of the icon 794, for example, the user may be provided the opportunity to export the data contained in the timeline region 774 of the user interface 790 into the Excel or PDF format.

In some implementations, upon selection of the bottommost entry or icon 744*f* in the navigation bar 742, a user interface 796, illustrated in an example screen shot of FIG. 7, presents an icon 798 for each of a number of products for implementing recommendations. The products 798*a-f*, for example, may correspond to various external services 110 as described in relation to FIG. 1A, and, upon selecting a particular icon 798, the corresponding external service 110 may be initiated on behalf of the enterprise represented by the user 102. For example, using the federated identification system 115, discussed previously in relation to FIG. 1A, the user 102 may be logged directly into the system of a third-party service partner 114, thereby eliminating or reducing the effort required for the user 102 to log into the particular external system that provides the sought-after service 110 corresponding to the selected recommendation 798.

Returning to FIG. 7A, a risk status region 713 is presented in an upper right-hand section of the user interface 700. The risk status region 713, as illustrated, contains a circular chart 715 that indicates the total number of risks that exist for the assessed enterprise, in view of the various observations associated with the enterprise. The chart 715 also contains indications that communicate a number of risks that have been mitigated 725*a* via implementation of a recommendation, the number that have been accepted 725*b* by ignoring a risk, and the number that have been "transferred" 725*c* by obtaining an insurance policy that indemnifies the enterprise against the risk. According to some embodiments, the risk status region 713 contains a "View Risks" control 717. Selection of the control 717, for example, may perform the same function as selecting the second topmost entry/icon 744*b* in the navigation bar 742 (e.g., migration to the user interface 740 of FIG. 7C).

The user interface 700 depicted in FIG. 7A also includes a threat profile region 719. The threat profile region 719, for example, may contain a list of malefactors that are threats to potentially attack the enterprise. Visual indications of the capability level, likelihood of attack, and potential impact of any such attack are presented on the threat profile region 719. The data for driving these visual indications, in some implementations, are retrieved from external sources 132, such as external news sources, as discussed in relation to FIG. 1A. According to some embodiments, the individual news stories from the external sources 132 are tagged to indicate characteristics of the malefactors. The characteristics may include, in some examples, threat actors, sophistication or capability level, likelihood of repetition, and impact to the enterprise reported in the story, along with the specific technology attacked, region or nation of malefactors, region or nation of attacked systems, and/or industry of attacked systems. The tags may be applied against the information collected via the self-assessment or field agent investigations to develop numerical data to drive the indicators. Upon selection of an expansion arrow 721, in some implementations, the various news stories possessing tags that match information collected via the self-assessment or field agent investigations (and were therefore used to drive the visual indicators in the region 719) are presented. In other implementations, the threat profile region 719 contains example likely malefactors based upon characteristics of the enterprise and/or the data assets and cyber protection the enterprise has in place. For example, based upon historical trends of cyber attacks, general descriptions of malefactors and threats may be compiled.

Finally, in the lower right-hand corner of FIG. 7A, a peer benchmark region 723 is presented. The peer benchmark region 723, in some implementations, presents a graph of the composite vulnerability score 704 of the assessed enterprise over time, as compared to peers. The peers of a given organization, for example, may be identified based on similarity of characteristics such as industry, region, market cap size, gross operating profit, and/or number of employees. Industry peers, for example, may have similar data assets, infrastructure, and protection needs as the enterprise, while market cap size peers may have same budgetary constraints, number of hardware assets, and/or network size. To anonymize results, peer information may be combined as a composite peer score. For example, a peer domain score may represent the average, median, or weighted average of the domain scores of at least 5 organizations similar to the given organization.

Figure 8:
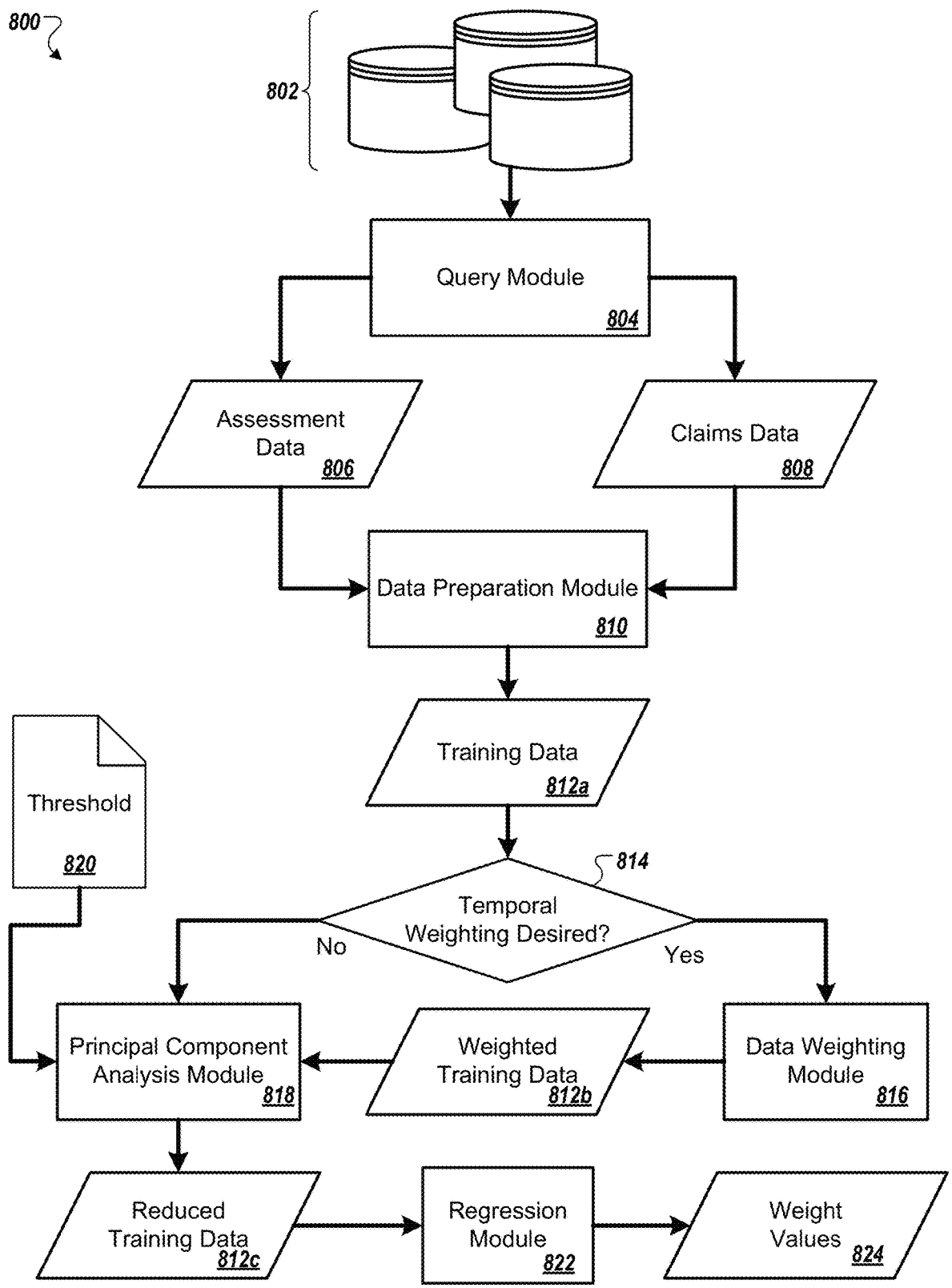
FIG. 8 depicts a logic flow of an example method for automatically learning how to assess vulnerability, based upon insurance claims data and corresponding vulnerability assessment data pertaining to entities that have filed cyber insurance claims in the past.

FIG. 8 depicts an operational flow diagram of an example process flow 800 for establishing values for the weights applied across security domains and/or subdomains. For example, the process flow 800 of FIG. 8 may be performed by the learning module 130 of the platform 100 of FIG. 1A. The weights determined via the process flow 800, for example, may feed into the logic scheme of FIG. 6 as weights 616, 618, or 620 and/or weights 606.

According to some embodiments, assessment data 806 related to multiple enterprises (e.g., either the scores assigned to each question in the self-attestation questionnaire of FIGS. 4A and 4B or scores assigned to findings entered by the field team) is obtained from one or more data stores 802 by a query module 804 for use as explanatory variables or independent variables. The assessment data 806 may be drawn from the service data 111 of FIG. 1A, for example, by the querying module 804.

Additionally, in some embodiments, insurance claims data 808 is obtained by the query module 804 from one more additional or same data stores 802. For example, the insurance claims data 808 may be obtained from an insurance exchange platform or from a number of insurance carrier systems. The insurance claims data 808, for example, may relate to a number of claims submitted by the enterprises due to cyber attacks on the infrastructures captured within the assessment data 806. The assessment data 806 may have been collected during an evaluation before or after the attack but should represent the state of the infrastructure at the time of the cyber attack. The insurance claims data 808, in some implementations, is accessed from the claims data 126 of FIG. 1A by the querying module 804.

In some implementations, a data preparation module 810 converts the assessment data 806 and claims data 808 into a set of training data 812a. In some embodiments, the assessment data 806 and claims data 808 are used to determine what the vulnerability score should have been for each of the enterprises represented in the assessment data 806 for the enterprise to have effectively countered the attack leading to the claims data 808. A data preparation module 810, for example, may obtain the independent variables of the assessment data 806 (e.g., survey answers and/or information gathered through field assessment) and arrange them in a vector. In another example, the data preparation module 810 may obtain the vulnerability scores (e.g., dependent variables) that should have been assigned to each given enterprise in view of the claims data 808 regarding claims that were submitted for insurance coverage of cyber losses. In some implementations, the vulnerability scores are arranged in a vector so that each row in the first vector (variables) matches a same enterprise as the corresponding row in the second vector (vulnerability scores). Together, the first vector and the second vector may constitute the training data 812a.

According to some embodiments, if temporal weighting is desired (814), the training data 812a is weighted to promote recently filed insurance claims in light of historic insurance claims by a data weighting module 816. For example, rows in the aforementioned first and second vectors may be duplicated in order to provide more "weight" to recently filed insurance claims and the independent variables corresponding to them. Certain independent variables may reveal risk in the present-tense for a short period of time and should therefore be weighted for a period of time. By way of example, a particular CPU fabricated by a particular company may be discovered to contain a fault by which its kernel memory may be leaked. Knowledge that a particular system uses CPUs produced by the aforementioned fabricator may reveal cyber risk for the company for a short period of time (e.g., for a period of time, such as six to eighteen months, until a patch is released to address the fault). Therefore, the fact that a system uses CPUs fabricated by the aforementioned company (an example of an independent variable) should be given weight for the next six to eighteen months. According to some embodiments, a duplication scheme is established to pair duplication levels with timeframes. In an illustrative example, all rows in the aforementioned vectors pertaining to claims filed in the last year may be duplicated three times, while rows pertaining to claims filed more than one year ago, but more recently than two years ago, are duplicated twice, and rows pertaining to claims filed more than two years ago are not duplicated at all. One of skill in the art will understand that any duplication level may be matched with any timeframe according to relevant variables surrounding recent exploits and faults. The data weighting module 816 may produce weighted training data 812b.

According to some embodiments, principal component analysis (PCA) is performed on the training data 812a or the weighted training data 812b (if generated by the data weighting module 816) by a principal component analysis module 818 to produce a reduced training data set 812c. Performing a principal component analysis may present the advantages of reducing the dimensionality of the training data 812a or 812b and may also reduce any redundancy in the data 812a or 812b. According to some embodiments, the principal component analysis module 818 is used to find a certain number of principal components (orthogonal vectors) determined by a threshold 820. For example, if the threshold 820 is "4," then the principal component analysis is used to find the four largest principal components. According to other embodiments, the threshold 820 is an eigenvalue, and the principal component analysis module 818 yields as many principle components as there are eigenvectors having eigenvalues exceeding the threshold. According to other embodiments, the threshold 820 is a percentage, and the principal component analysis module 818 yields as many principle components as are required to explain a percentage of variance in the training data 812a or 812b meeting or exceeding the threshold 820.

Finally, in some implementations, a regression is performed on the reduced training data 812c by a regression module 822 to find a set of weight values 824 that the claims data 808 suggests should be used to generate a vulnerability score. For example, greater weights may be applied to the principle components leading to insurance claims related to cyber attacks.

Figure 9:
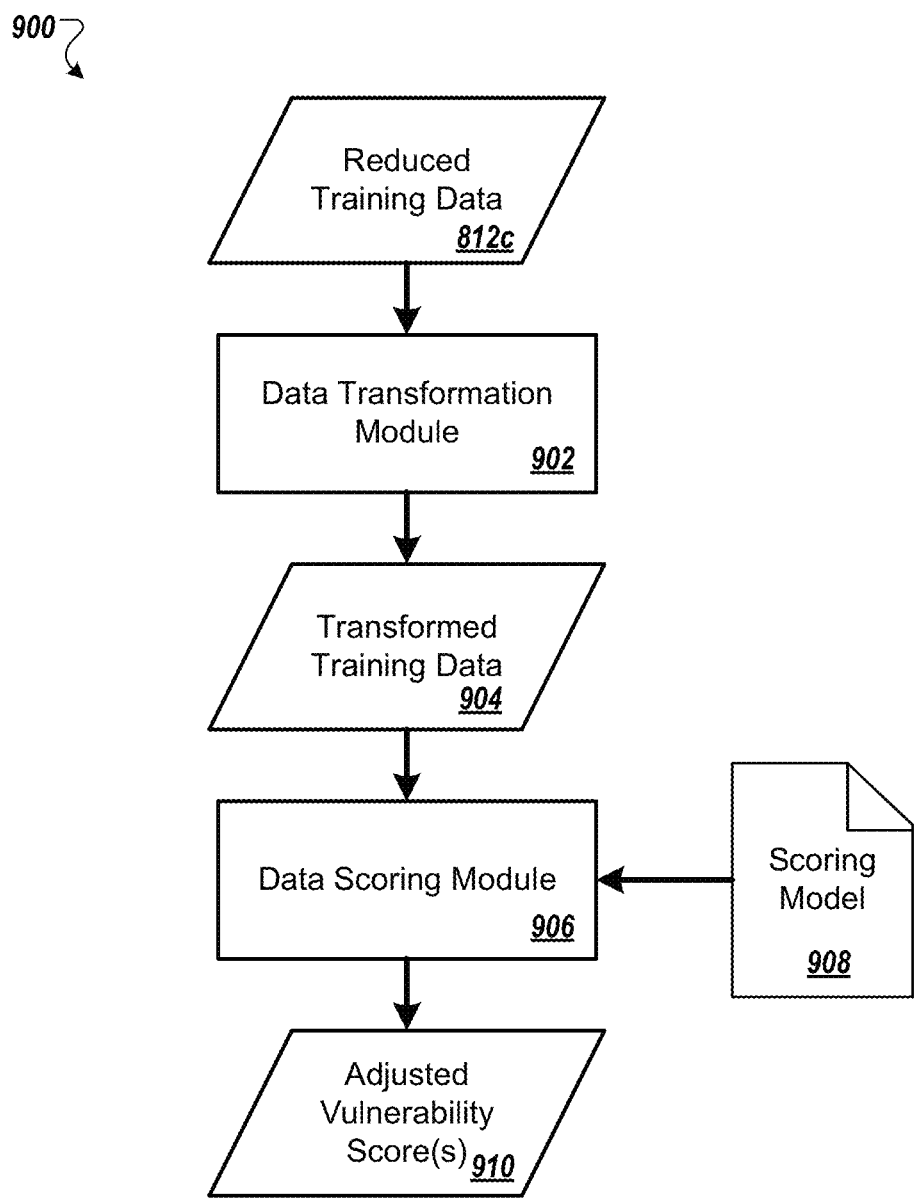
FIG. 9 depicts a logic flow of an example method for generating a vulnerability assessment score.

Turning to FIG. 9, an operational flow diagram illustrates an example process 900 for obtaining a vulnerability score using the outcome of the principal component analysis 818 of FIG. 8. In the event that the principal component analysis module 818 was applied to the training data 812a or 812b in the process 800 of FIG. 8, then the process 900 of FIG. 9 may be used by the platform 100 of FIG. 1A to re-evaluate one or more enterprises. Byway of explanation, assessment data may be thought of as being oriented along a set of axes defined by the findings of the field team or questions asked in the context of the self-attested evaluation. In an illustrative example, an enterprise that presented answers to questions about physical security and data encryption leading scores of "3" and "4," in response to those questions respectively, could be thought of as existing at a coordinate of "3" along the physical security axis and a coordinate of "4" along the encryption axis, and so on. Further to the example, a questionnaire of 150 questions would result in an evaluated enterprise being oriented at a point measured in 150 dimensions, along 150 axes. Upon performing a principle component analysis, in some implementations, a new set of axes is generated, typically with fewer dimensions than the original axes, and oftentimes with significantly fewer dimensions. An evaluated enterprise can then be positioned along the new set of axes. These new set of axes are typically a result of rotating and shifting the original axes.

Therefore, according to some embodiments, the regression module 822 of FIG. 8 yields a linear model that considers the assessment data 806 as oriented against a new set of axes derived from the reduced training data 812c generated by the principal component analysis module 818. Accordingly, to arrive at a vulnerability score for an enterprise, the coordinates resulting from its findings or answers can be transformed to be measured vis-à-vis the new set of axes resulting from the principal component analysis of FIG. 8.

In some embodiments, the process 900 begins with obtaining the reduced training data 812c. For example, the reduced training data 812c may be obtained from the service data store 111 of FIG. 1A.

The reduced training data 812c, in some implementations, transformed by a data transformation module 902, so as to be projected on to the axes that were yielded by the principal component analysis module of 818 of FIG. 8. The data transformation module 902 produces transformed training data 904.

In some implementations, a data scoring module 906, applies a scoring model 908 to the transformed training data 904, to yield adjusted vulnerability score(s) 910. The scoring model 908, for example, may be the scoring model 600 of FIG. 6. The vulnerability scores 910, for example, may include both a composite vulnerability score plus vulnerability scores for each security domain. Further, the process 900 may be used to reevaluate a single enterprise or a group of enterprises. As such, the vulnerability scores 910 may relate to a number of enterprises.

Figure 10:
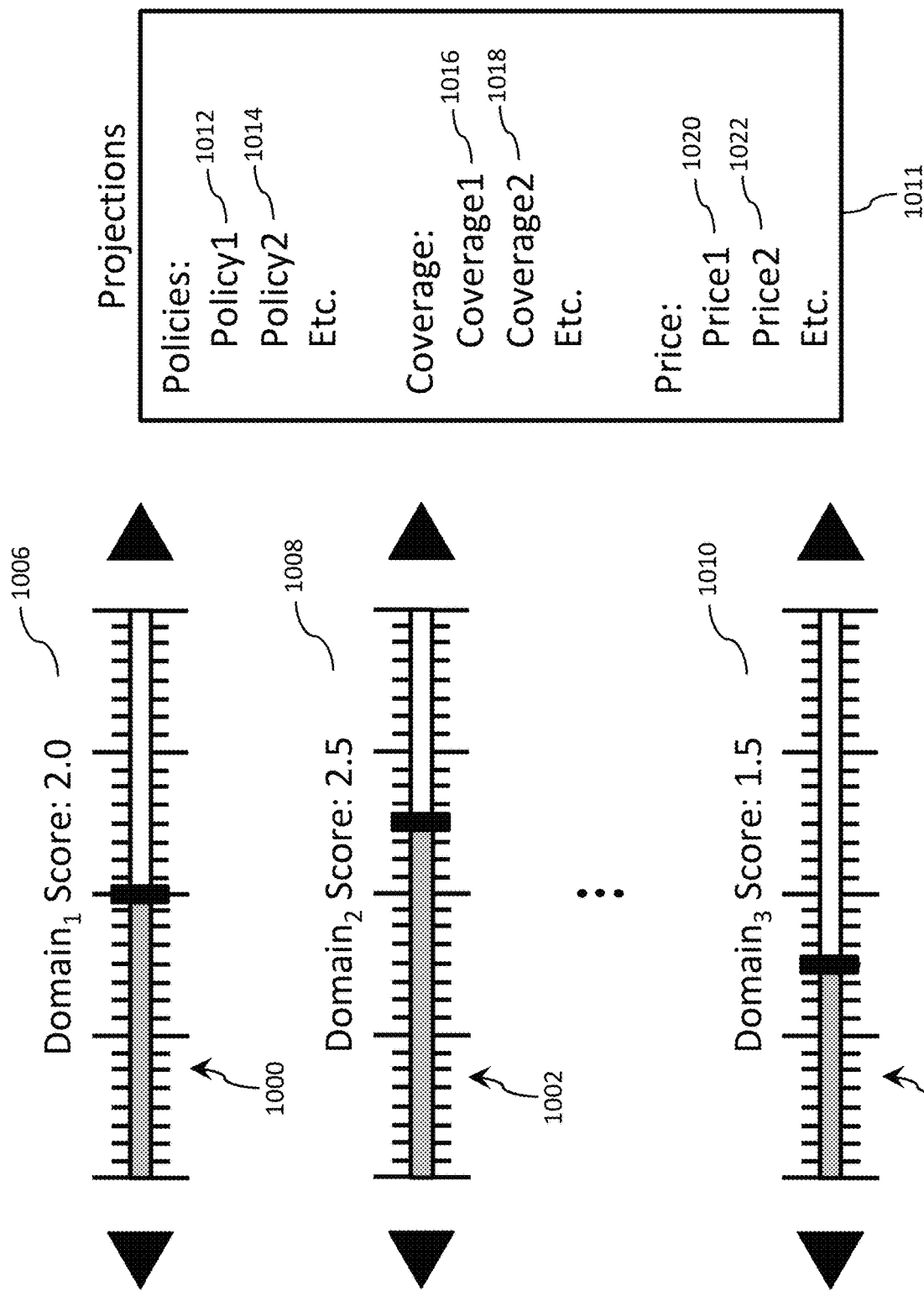
FIG. 10 depicts an example screen shot by which a user may enter hypothetical vulnerability scores, and review projections of policies, coverages and process resulting from the hypothetical scores.

Turning to FIG. 10, an example screen shot illustrates a user interface for projecting cyber insurance costs based upon vulnerability scores across a number of security domains. According to some embodiments, an initial set of domain-based vulnerability scores is established through presenting a user with a condensed version of the self-attestation questionnaire of FIGS. 4A and 4B designed to present a subset of the most impactful questions to estimate scores without performing a full cyber security assessment of the enterprise. The most impactful questions, for example, may be identified pursuant to the weights applied within a scoring scheme, such as the scoring scheme presented in FIG. 6. In some implementations, the condensed version is designed using a small enough number of questions so that a user may complete the questionnaire in under ten minutes, and preferably under five minutes. The answers from the condensed version may be driven through a scoring model, such as the scoring model of FIG. 6. In other embodiments, the initial domain scores presented within the example user interface of FIG. 10 are based upon full assessment data obtained through a full survey and/or field assessment of the enterprise. The user interface, for example, may be presented on behalf of the platform 100 of FIG. 1A. The data within the example screen shot, for example, may be initially driven by the domain-level security score data developed by the vulnerability assessment module 108 or vulnerability management module 112 of FIG. 1A.

The example screen shot provides user controls for adjusting each domain score to review differences in projected insurance costs. In some implementations, the example screen shot contains slider elements 1000, 1002, 1004 allocated to each security domain of a chosen security domain framework. Although the particular depiction in FIG. 10 contains three such elements 1000, 1002, 1004, it is to be understood that the screen contains one element for each vulnerability domain of the chosen framework, such as the framework chosen via menu 720 of FIG. 7A, for example.

Each slider of the slider elements 1000, 1002, 1004, in some embodiments, is initially aligned in a default position representing a domain-level vulnerability score that the element 1000, 1002, 1004, as a whole, represents. For example, the slider element 1000 could represent the "Data" security domain, while the slider 1002 represents the "Physical Spaces" security domain, and so on. Each slider element 1000, 1002, 1004 is accompanied by a score 1006, 1008, 1010 that presents the domain-level vulnerability score assigned to the particular domain represented by a given slider element 1000, 1002, 1004, based upon a position of a slide control upon the respective slider element 100, 1002, 1004.

The example screen shot also contains a Projections region 1011. The data within the Projections region 1011, in some implementations, is driven by the automatic bid rules contained within the rules engine 122 of FIG. 1A, as applied to the vulnerability scores represented by the slider elements 1000, 1002, 1004. For example, a query module may query for bid prices based upon the selected vulnerability scores of each domain. In some embodiments, multiple carriers are queried to obtain a number of bid prices which may be combined into a cost estimate. In other implementations, as illustrated in FIG. 10, the Projections region 1011 contains projections of policies 1012, 1014, coverage limits 1016, 1018, and prices 1020, 1022 for each policy/limit combination of a number of policies (e.g., for each carrier queried, and/or multiple bids from a single carrier, each bid representing different coverage options).

A user 102 of the example screen shot, in some embodiments, may adjust the slider elements 1000, 1002, 1004 to hypothetically assume that a particular domain-level vulnerability score of the evaluated enterprise was assigned a particular value. In an illustrative example, the user may adjust an element 1000, 1002, or 1004 to assume that the enterprise scored 0.5 points higher than it actually did, e.g., pursuant to the field evaluation or questionnaire-driven evaluation. The new scores (as driven by adjustment of the slider elements 1000, 1002, 1004), in some implementations, are then provided to aforementioned models in the rules engine 122, and the resulting policies 1012, 1014, coverage limits 1016, 1018, and prices 1020, 1022 for each policy/limit combination are presented within projections box 1011. In one example, a number of policies represented may change based upon adjustment of scores. For example, rules applying thresholds to scores may remove one or more policies when the scores are driven below the threshold and, conversely, upward score adjustment may add one or more policies not otherwise available to the enterprise.

As discussed with reference to FIGS. 7A-7H, the user interfaces depicted therein present data pertaining to how the peers of a given customer have scored on a security-domain-by-security-domain basis. For example, the arcs 818 in FIG. 7A depict peer scores according to some embodiments. FIG.

11 depicts an example operational flow of a process 1100 by which peer scores may be determined for a given customer, such as one of the customers 102 described in relation to FIG. 1A.

Figure 11:
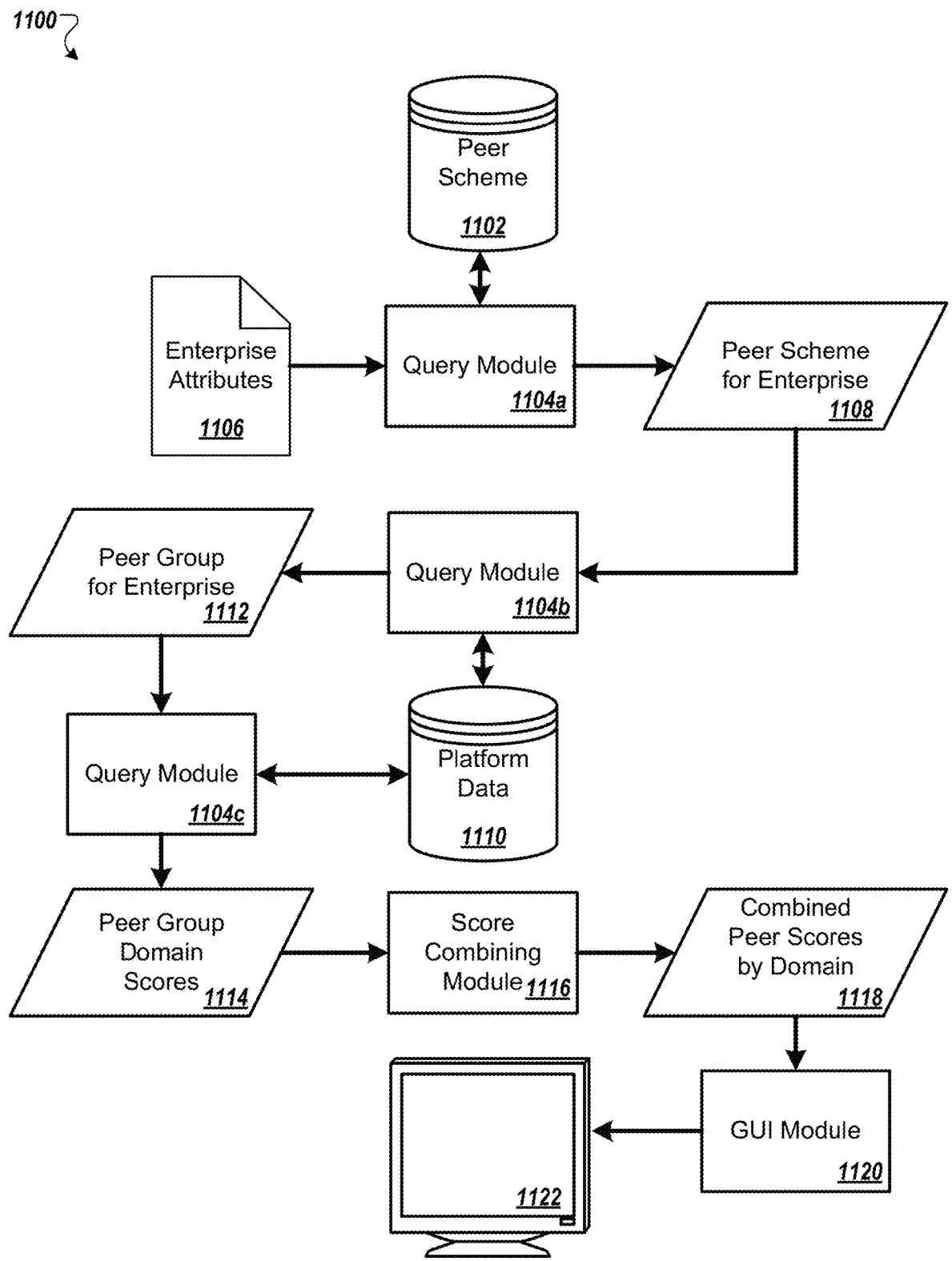
FIG. 11 depicts an operational flow of an example process by which to determine peer vulnerability scores.

In some implementations, the process 1110 begins with determining a peer scheme for an enterprise. According to some embodiments, a peer scheme database 1102 is queried by a query module 1104 with attributes and/or characteristics 1106 of the enterprise, such as one of the customers 102 of FIG. 1A. The query module 1104 obtains a peer scheme 1108 for the enterprise. According to some embodiments, a peer scheme is a set of attribute and/or characteristic data another enterprise must have to qualify as a peer of the particular enterprise being served by the process 1100 of FIG. 11. For example, in the context of an enterprise that is a manufacturer of automobiles in the United States with annual revenues less than ten billion dollars, the peer scheme 1108 may be as simple as the industry of the enterprise. In such a case, all other enterprises (e.g., customers 102) that were engaged in the same industry (manufacturing of automobiles) would qualify as a peer. According to some embodiments, a peer scheme may include more than a single attribute. Carrying on with the example, the peer scheme 1108 may include industry and location, in which case all other enterprises that manufacture automobiles and are located in the United States would qualify as a peer. Similarly, the peer scheme 1108 may include industry, location and size. Again carrying on with the example, a peer scheme for the automotive manufacturing hypothetical enterprise may include an industry attribute indicating automotive manufacturing, a location attribute indicating the United States, and a size attribute indicating annual revenues less than a certain threshold (e.g., less than ten billion dollars or less than 50 billion dollars). Jointly, the one or more attributes and/or characteristics defining a peer scheme define a category of other enterprises that are similarly situated as the particular enterprise that is being served by the process 1100 of FIG. 11.

According to some embodiments, the enterprise may be an individual. According to some embodiments, a peer scheme for an individual includes any combination of location of citizenship, location of residence, income level, number of financial accounts (e.g., credit accounts, such as credit card accounts, home loans, revolving loans, deposit account, savings accounts, equity accounts, and the like). Further to the example, the peer scheme may include one or more attribute data qualifiers that identify other individuals that are similarly likely to be the subject of a cyber attack and similarly vulnerable.

In some implementations, platform data 1110 is queried by a query module 1104b (e.g., a same module as the query module 1104a or a different query module) using the peer scheme 1108 to determine a peer group 1112 of a set of other enterprises that meet the peer scheme 1108 attribute data requirements, and thus qualify as a peer of the enterprise. According to some embodiments, the peer scheme attribute data may be expressed in terms of data that exhibits a hierarchy. For example, the peer scheme 1108 may include an industry attribute of "manufacturing." The data scheme may define "manufacturing" as a set that includes different variety of manufacturing such as "vehicle manufacturing" and "appliance manufacturing." Similarly, "vehicle manufacturing" may be defined as a set that includes "automotive manufacturing" and "nautical manufacturing." According to these embodiments, the peer group 1112 includes those enterprises having attribute data that is an element of a set that was used to define the peer scheme 1108, or is an element of any set within the set that was used to define the peer scheme 1108. For example, in a hypothetical scenario in which the peer scheme 1108 was defined by an industry attribute of "manufacturing," all other enterprises that had attribute data indicating that they were in an industry that was a subset of manufacturing would qualify as a peer.

In some implementations, the platform data 1110 is queried by a query module 1104c (e.g., the same query module as query module 1104a and/or 1104b, or a different query module) with peer group 1112, in order to obtain a set of domain level vulnerability scores 1114 for each such enterprise in the peer group. Thus, for a peer list of n (e.g., 100) other enterprises or individuals, a set of n (carrying on with the example, 100) scores in the "physical security" domain may be acquired, and a set of n scores in the "network security" domain may be acquired, and so on—one score for each security domain, for each identified peer of the peer group 1112, to populate the peer group domain scores 1114.

In some implementations, a combining operation is performed by a score combining module 1116 on the peer group domain scores 1114 on a domain-by-domain basis to obtain combined peer scores by domain 1118. The scores, in some embodiments, are averaged for each domain to obtain average scores. In other embodiments, a median score per domain may be derived by the score combining module 1116. In further embodiments, the score combining module 1116 may apply a weighted average to obtain a representative peer score in each domain. For example, scores that have been derived more recently in time may be promoted as representative of the current state of the industry in lieu of more historic scores. According to still further embodiments, the standard deviations of the peer scores within each domain are found. For example, on a domain-by-domain basis, scores that are more than a threshold number of standard deviations from the mean may be disregarded (e.g., on a domain-by-domain basis, all scores more than three standard deviations from the mean may be removed), thereby removing outlying data. Other combining activities are possible. As a result, combined peer scores 1118 for each domain are arrived at by the score combining module 1116.

In some implementations, the combined peer scores by domain 1118 are accessed by a graphical user interface (GUI) module 1120 for preparation of a GUI presentation of the data via a user interface 1122, such as the user interface 700 depicted in FIG. 7A.

Although query module 1104c is described as querying the platform data 1110 to receive domain-level vulnerability scores of peers, according to some embodiments, query module 1104c is used to retrieve vulnerability scores of peers in security subdomains (such as subdomain scores depicted in FIG. 5B) and/or the composite vulnerability (such as composite vulnerability score 704 depicted in FIG. 7A) scores of peers. According to these embodiments, the user interface, such as that shown in FIG. 7A, presents peer scores on a subdomain-by-subdomain basis and for the overall composite vulnerability score.

Figure 12:
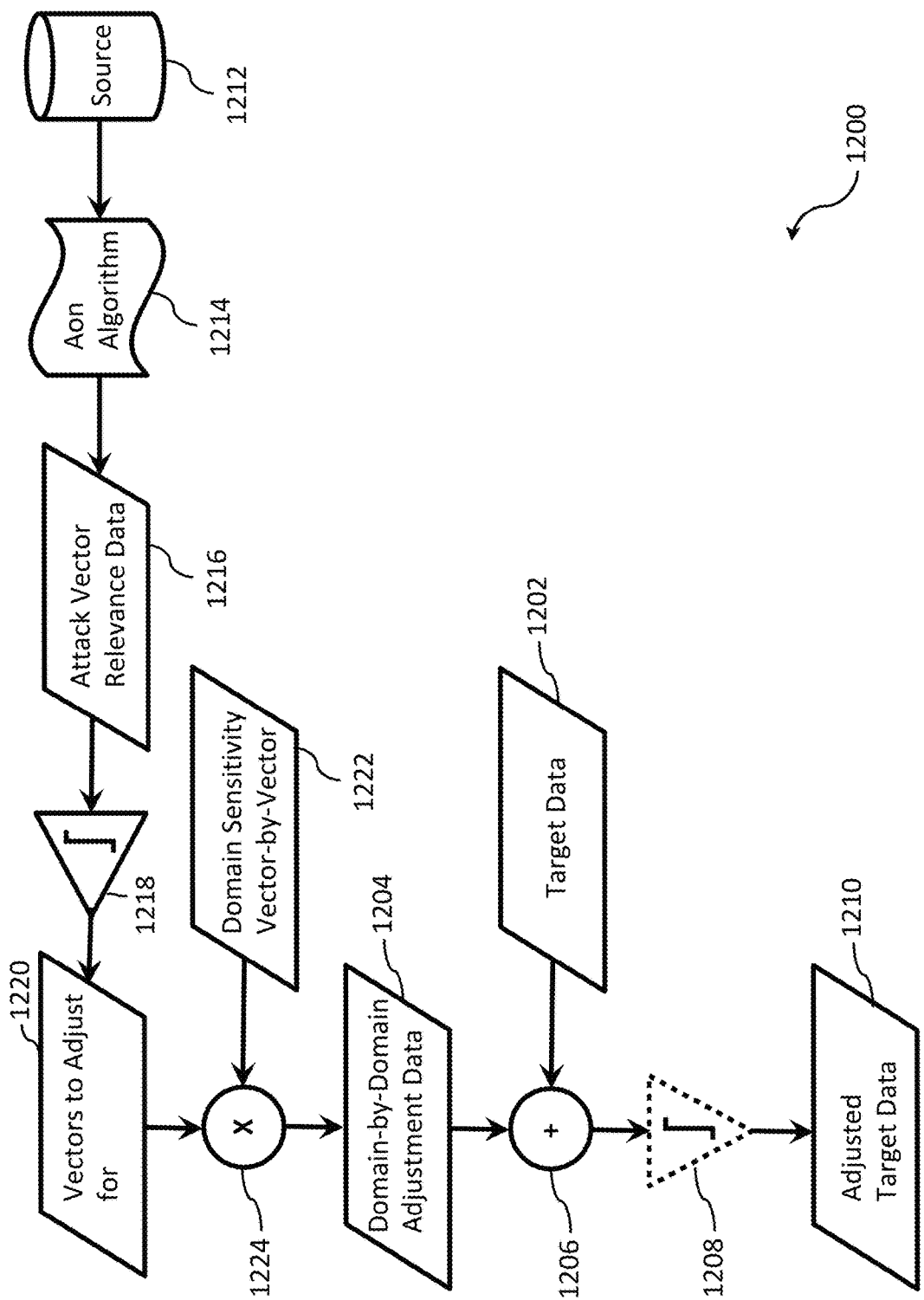
FIG. 12 depicts an operational flow of an example process by which to adjust target data in view of attack vector activity.

Turning to FIG. 12, an operational flow diagram illustrates an example process 1200 for determining a target score on domain-by-domain basis for a particular enterprise or individual that is associated with a particular peer group. For the sake of convenience, the peer group will be referred to as synonymous with industry, with respect to the discussion of FIG. 12. Based on the preceding discussion regarding FIG. 11, it is to be understood that a peer group could be defined by other attributes, including a set of attributes or hierarchy of attributes. In some embodiments, the process 1200 may be executed by the platform 100 of FIG. 1A on behalf of a given user 102. The vulnerability assessment engine 108, for example, may perform at least a portion of the process 1200. The process 1200, in some embodiments, may rely upon data stored in one of the data stores of the platform 100 such as the customer attributes 106, the service data 111, and/or the capability data 116. Further, the process 1200 may access external data from data resources 132 of FIG. 1A.

A target score may pertain to a domain or subdomain or an overall vulnerability composite score. For the sake of convenience, the discussion with respect to FIG. 12 will refer to a target score for a security domain. A target score informs a particular user that he or she should attempt to take steps to cause his or her enterprise to attain a domain-level vulnerability score at least equal to the target score associated with the particular domain. For example, if a target score of 3.2 is associated with the "application security" domain, then the user should take steps to cause his or her enterprise to achieve a score of at least 3.2 in the "application security" domain. Target scores may be presented via a user interface. For example, target scores 712 are presented in the example user interface 700 depicted in FIG. 7A.

The process 1200 of FIG. 12, in some implementations, makes use of a baseline set of target data 1202. The baseline target data 1202 may be a target that has been established either algorithmically or via expert analysis (e.g., via a security expert) for each domain for a given industry. Target data may vary from industry to industry for a variety of reasons, including the harm that a failure in a particular domain might cause to an enterprise in one industry versus another. For example, a manufacturer that suffers a failure in business resilience may literally cease creation of its products and jeopardize timely delivery of produce to its customer, whereas for an enterprise in the factoring business, a failure in business resilience will simply create a backlog of collections work to be carried out when the enterprise's systems return to operability.

In principle, a target score could take on any range of values that corresponds with the range of values utilized by the vulnerability assessment scoring system. For the purposes of this discussion, it will be assumed that a target score should take on a value ranging from 1.0 to 4.0, where the higher the target score, the more significant the security domain is to the safe and effective operation of the enterprise's business and its systems.

For the sake of convenient discussion, the baseline target scores 1202 will be discussed as being arranged in a 1×n matrix, where n is equal to the number of security domains. For example, in the context of a platform, such as the platform 100 of FIG. 1A, that organizes security domains as "data security," "identity and access management," "endpoint & security systems," "network security," "physical security," "application security," "third party," and "business resilience," n would be equal to 8. FIG. 13E, for example, presents a matrix 1308 as described, where T1-Tn each has a value between 1.0 and 4.0. T1 is the target score for the first domain (carrying on with the example, it is the target score for the "data security" domain), T2 is the target score for the second domain, and so on.

The process 1200, in some implementations, also makes use of domain-by-domain adjustment data 1204 that may be created according to a process described below. For the sake of convenience, domain-by-domain adjustment data 1204 will be discussed as being arranged in a 1×n matrix, where (again) n is equal to the number of security domains. FIG. 13D, for example, presents example domain-by-domain adjustment data 1204 arranged in such a matrix 1306, where A1-An represent quantities that can be added to the baseline target data 1202 in order to adjust the baseline target data 1202 in view of threat activity observed in the particular industry the enterprise is situated in. According to some embodiments, adjustment values A1-An may be negative. According to some embodiments, A1-An are restricted to positive values. Adjustment value A1 of matrix 1306 of FIG. 13D, for example, may be added to baseline target score T1 of matrix 1308 of FIG. 13E, and adjustment value A2 of matrix 1306 may be added to baseline target score T2 of matrix 1308, and so on. This piecewise addition, for example, is represented by a matrix addition operation 1206.

In the wake of having added the adjustment data 1204 to the baseline target data 1202, the output may in some embodiments be subjected to a clipping operation 1208, which causes any resulting sum in excess of the maximum vulnerability domain score (example: 4.0) to be set to the maximum value. In an illustrative example, if adjustment value A1 were added to target score T1 to arrive at a sum of 4.3, it would be "clipped" and reset to 4.0. Further, in some embodiments, the clipping operation 1208 causes any resulting sum that is less than the minimum vulnerability domain score (example: 1.0) to be set to the minimum value. For example, if adjustment value A1 took on a negative value and when added to target score T1 resulted in a sum of 0.3, it would be "clipped" and reset to the minimum domain score, e.g., 1.0. According to some embodiments, clipping operation 1208 may be arranged to suppress an adjustment so that a baseline target score T1-Tn could not be adjusted by more than a certain amount. For example, the clipping operation 1208 may ensure that the baseline target score T1-Tn cannot not be increased or decreased by more than 1.0.

The result of the combination of matrix addition operation 1206 and optional clipping operation 1208 is the production of a set of adjusted target data 1210, an example of which is depicted in a matrix 1310 of FIG. 13F. Turning to FIG. 13F, AT1 represents the adjusted target score for the first security domain, and AT2 represents the adjusted target score for the second security domain, and so on. These adjusted target scores reflect targets that account for not only the inherent nature of the particular industry in which a given user 102 is situated, but also accounts for cyber risks arising through attack vector activity. Returning to FIG. 12, the adjusted target scores 1210 may be presented via the user interface, such as the user interface 700 of FIG. 7A, as target scores (such as target score 718) for the various security domains.

According to some embodiments, the domain-by-domain adjustment data is arrived at as follows. A data source 1212 contains information concerning security exploits. Data source 1212 may be a publicly available "open" source, a proprietary source, or a combination of sources. Although the source 1212 is depicted in FIG. 12 as a single source, according to some embodiments, the source 1212 may include multiple data sources. According to some embodiments, the source 1212 includes at least one proprietary data source containing data pertaining to cyber insurance claims and digital forensics data, such as, in some examples, indicators of attack data, indicators of compromise data, etc. According to some embodiments, the source 1212 includes at least one open source data source containing data pertaining to cyber vulnerabilities and attacks such as, in some examples, published court proceedings and related information, opens source common vulnerability and exposures data, and other open source intelligence. Further, the source 1212, in some embodiments, includes one or more third party proprietary data sources containing data pertaining to cyber attacks and vulnerabilities such as, in some examples, data sources from Advisen Ltd. of New York, N.Y., Symantec of Mountain View, Calif., Verizon Wireless of New York, N.Y., Significant Cyber Incidents collected by the Center for Strategic & International Studies of Washington, D.C., the Repository of Industrial Security Incidents (RISI) online database (e.g., the Supervisory Control and Data Acquisition (SCADA) systems data) by exida.com LLC, the Web Application Security Consortium/Web-Hacking-Incident-Database available at http://projects.webappsec.org, the Industrial Control Systems Cyber Emergency Response Team (ICS-CERT) database by the Department of Homeland Security, U.S., The SANS State of ICS Security Survey by the SANS Institute, the Kaspersky Security Bulletin by Kaspersky Lab, Mandiant M-Trends Annual Threat Report by FireEye, Inc. of Milpitas, Calif., Microsoft Security Intelligence Reports by Microsoft Corp. of Redmond, Wash., and the Cyber Operations Tracker by the Council on Foreign Relations (CFR) organization of New York, N.Y. The aforementioned data may be drawn from any or all of these various sources and aggregated into exploit data in data source 1212.

According to some embodiments, the data source 1212 is dynamic, in that information is added to the source 1212 by virtue of use of the platform 100 of FIG. 1A, or by digital forensic operations or incident response operations that result in accumulation of data in proprietary data sources. The security exploit information contained in the data source 1212, in some embodiments, is subjected to an algorithm 1214 described in connection with process 1400 of FIG. 14A, below, in order to create a set of attack vector relevance data 1216.

An attack vector is a broad categorization of a mechanism of cyber exploitation. Examples of attack vectors include: ransomware, spyware or key logger, SQL injection, denial of service, brute force, cross-site scripting, man-in-the-middle attack, forgery, scam, "phishing," privilege abuse, unapproved technology ("shadow IT"), disposal error or loss, misconfiguration or programming error, malfunction, sabotage or tampering, theft, surveillance or snooping, fire or flood or wind or earthquake, and temperature or humidity or water leak. The algorithm 1214, in some implementations, monitors the data source 1212 and categorizes the information pertaining to various exploits contained therein according to the attack vector utilized by a given exploit, identifies the peer group or industry that the exploit was utilized against, and, for every given peer group or industry, creates a relevance score for each attack vector. According to some embodiments, for a given attack vector, its relevance score is a percentage (or decimal between 0 and 1) that represents the portion of participants in a given industry or peer group who are expected to experience a cyber attack via the given attack vector, where the cyber attack is of a magnitude that it would be considered relevant.

In some embodiments, there is a unique attack vector relevance data set 1216 for each industry or peer group. Thus, for a given enterprise, the enterprise's peer group or peer scheme (e.g., attributes and/or characteristics) is determined and the algorithm 1214 generates an attack vector relevance data set 1216 unique to that peer group or peer scheme. For the sake of convenience, FIG. 13A depicts the attack vector relevance data 1216 arranged as a 1×m matrix 1300, where m is equal to the number of attack vectors, R1 is the relevance score associated with the first attack vector, and R2 is the relevance score associated with the second attack vector, and so on.

According to some embodiments, a threat vector relevance score Ri, may be represented by a percentage ranging from 0% to 100% (or a decimal ranging from 0 to 1), where a score of 1%-25% corresponds to a "possible" threat, meaning the threat vector has been described by a somewhat credible source, a score of 26%-50% corresponds to a "predicted" threat, meaning that the threat vector has been predicted by a trusted source, a score of 51%-75% corresponds to an "anticipated" threat, meaning that the threat vector has been reported by a trusted source, and a score of 76%-100% corresponds to an "expected" threat, meaning that the threat vector has been seen by an entities' peers.

Returning to FIG. 12, the attack vector data set 1216, in some embodiments, is subjected to a "thresholding" process 1218 to create a vector adjustment data set 1220. For the sake of convenience, the vector adjustment data set 1220 will be referred to as a vector adjustment matrix 1220, such as a matrix 1302 depicted in FIG. 13B. According to some embodiments, the vector adjustment matrix 1220 identifies which particular attack vectors are so relevant that they should cause an adjustment to the baseline target data 1202. According to some embodiments, the relevance values (R1, R2, . . . Rm) within the attack vector relevance data set 1216 (e.g., as illustrated by matrix 1300 of FIG. 13A) are compared on a one-by-one basis with a threshold such as, in an illustrative example, 75% or 0.75. If a particular attack vector relevance value is equal to or greater than the threshold, in some embodiments, its corresponding vector indicator value (V1, V2 . . . Vn as depicted in a matrix 1302 of FIG. 13B) is set to a value of 1; otherwise, it is set to a zero. In other words, if relevance value R1 within the attack vector relevance data set 1216 (which corresponds to the first attack vector) is greater than the threshold, then vector indicator value V1 is set to 1, and if attack vector relevance value R2 (which corresponds to the second attack vector) is greater than the threshold, then vector indicator value V2 is set to 1, and so on. Accordingly, in a scenario in which there are a quantity of m attack vectors tracked by the algorithm 1214, the vector adjustment matrix 1220 is a 1×m matrix containing a quantity of m separate entries that are "1" or "0." If the first entry in the matrix 1220 is a "1" it is an indication that, for the particular industry or peer group under consideration, the first attack vector had a relevance value that was great enough that it should cause an adjustment to the baseline target values; if, on the other hand, the first entry in the matrix 1220 is a "0" it is an indication that, for the particular industry or peer group under consideration, the first attack vector had a relevance value that was insufficiently great to justify an adjustment to the baseline target value; if the second entry in the matrix 1220 is a "1" it is an indication that, for the particular industry or peer group under consideration, the second attack vector had a relevance value that was great enough that it should cause an adjustment to the baseline target value; if, on the other hand, the second entry in the matrix 1220 is a "0" it is an indication that, for the particular industry or peer group under consideration, the second attack vector had a relevance value that was insufficiently great to justify an adjustment to the baseline target value; and so on.

The vector adjustment matrix 1220, in some embodiments, is used in conjunction with a sensitivity matrix 1222, such as a sensitivity matrix 1304 depicted in FIG. 13C. The sensitivity matrix 1222, in some implementations, is of dimension m×n, where m is equal to the number of attack vectors monitored by algorithm 1214 and n is equal to the number of security domains. The sensitivity matrix 1222 may thus contain a quantity of m*n sensitivity values. A sensitivity value is a quantity that reveals the extent to which the success of an attack that is conducted via a given attack vector is dependent upon a deficiency in a particular security domain. Therefore, for a given sensitivity value within the matrix 1304 of FIG. 13C, Sij, reveals the extent to which the success of an attack that is conducted via the ith attack vector is dependent upon a deficiency in the jth security domain.

According to some embodiments, the sensitivity values, Sij, take on a range of values where a smaller value indicates little or no dependency of a cyber attack conducted via a particular attack vector upon a deficiency in a security domain, and a greater value indicates a greater or more direct dependency of a cyber attack conducted via a particular attack vector upon a deficiency in a security domain. For example, according to some embodiments, Sij could take on values chosen from {0, 0.025, 0.05, 0.075, 0.1}. A value of 0 represents no dependency; a value of 0.025 represents slight dependency; a value of 0.05 represents moderate dependency; a value of 0.075 represents strong dependency; and a value of 0.1 represents direct dependency. Therefore, if Sij was equal to 0.05, this would indicate that the success of a cyber attack conducted via the ith attack vector was moderately dependent upon a deficiency in the jth security domain.

The domain-by-domain adjustment data 1204, in some embodiments, is arrived at via a matrix multiplication operation 1224 that multiplies the vector adjustment matrix (1×m) 1220 by the sensitivity matrix (m×n) 1222, yielding the domain-by-domain adjustment matrix (1×n) 1204.

Examining, for example, the first entry in the adjustment matrix 1204, A1 (e.g., matrix 1306 of FIG. 13D), one can see that A1=V1*S1,1+V2*S2,1+ . . . Vm*Sm,1. Continuing with the illustrative example in which (1) vector indicator values Vi took on a value of either 0 or 1, (2) there were 20 attack vectors (m=20), and (3) sensitivity values, Sij, were chosen from {0, 0.025, 0.05, 0.075, 0.1}, the result is that a given adjustment value could be as small as 0 or as great as 2 (e.g., if every vector indicator value was assigned a value of 1, and every sensitivity value was assigned a value of 0.1). This would mean, further to the illustrative example, that any given baseline target value Ti (in FIG. 13E) could be increased by as much as 2 points, but never decreased. For a given domain, any increase in its target score would be the result of threat vector activity that relied upon a deficiency in that domain for success.

According to the preceding embodiment, activity level within a particular attack vector, Vi, could result in an adjustment of one or more security domains by an amount determined by the sensitivity matrix 1222. The outcome in this circumstance is binary: the relevance level, Ri, of a particular attack vector either crosses a threshold or not. The extent of the adjustment resulting from the relevance level, Ri, having crossed the threshold does not vary, for instance, as a function of the extent by which it exceeded the threshold.

According to some embodiments, however, the extent of the adjustment does in fact vary as a function of the extent by which the relevance level, Ri, exceeds the threshold. For example, instead of an embodiment in which a vector indicator value, Vi, is assigned a value of 1 in instances in which Ri exceeded a threshold, while otherwise being assigned a value of 0, Vi may instead be assigned a value equal to K*(Ri−threshold) in instances in which Ri exceeds the threshold, with Vi being assigned a value of 0 in all other cases. In this embodiment, a given baseline target value, Ti, for a particular domain is adjusted pursuant to the aggregate individual adjustments implied by the various attack vector relevance data, R1-m, with each such individual attack vector relevance datum resulting potentially in a different extent of adjustment, as a function of the extent of the attack vector relevance data, itself (and, of course, as a result of the sensitivity of a particular domain to the attack vector, as expressed by the sensitivity matrix 1222). Pursuant to this embodiment, a given adjustment value, Ai, could be as small as 0 (e.g., no possibility of adjusting a baseline target, Ti, score by reducing it), but could be as large as m*K*(1−threshold)*Smax, where m represents the number of attack vectors, threshold represents the aforementioned chosen threshold, Smax represents the maximum sensitivity value possible for inclusion in the sensitivity matrix 1222 and K represents a constant.

The preceding embodiments have not permitted the possibility of a downward adjustment to a baseline target value, Ti. However, according to some embodiments, such a downward adjustment may be made as a result of the extent by which a particular attack vector falls short of a threshold. For example, pursuant to some embodiments, a vector indicator value, Vi, is assigned a value of −1 when its corresponding attack vector relevance value, Ri, is less than a first threshold, is assigned a value of 0 when Ri is between the first threshold and a second threshold, and is assigned a value of 1, when Ri is in excess of the second threshold. Such an embodiment results in a maximum reduction of a given baseline target value, Ti, of −m*Smax, where m represents the number of attack vectors and Smax represents the maximum sensitivity value possible for inclusion in the sensitivity matrix 1222 (the quantity is shown as negative to indicate that it is a value by which a baseline target value could be reduced); as is plain to see, the maximum upward adjustment would be given by m*Smax, where m and Smax have the same meaning.

According to another embodiment, a vector indicator value, Vi, could be assigned a value of K1*(Ri−threshold1), when Ri<=threshold1; 0, when threshold1<Ri<threshold2; and K2*(Ri−threshold2), when Ri>=threshold2. Such an embodiment, for example, permits not only reduction of a baseline target value (by virtue of relative irrelevance of threat vector activity), but also varies the extent by which a particular irrelevant threat vector can contribute to the reduction.

Figure 14A:
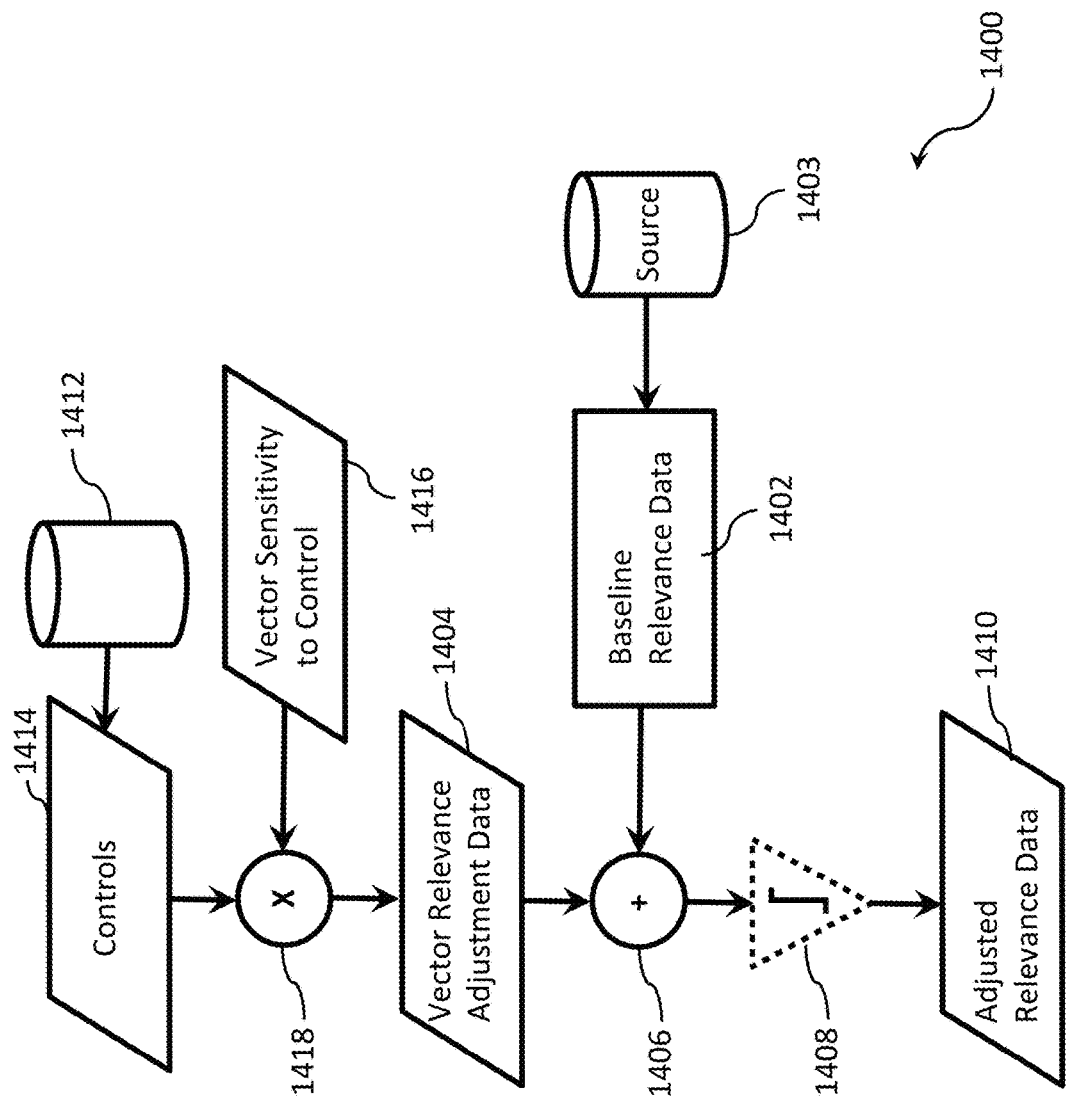
FIG. 14A depicts an operational flow of an example process by which to determine attack vector relevance data in view of control systems employed by a particular organization.

As stated previously, FIG. 14A depicts an operational flow diagram of an example process 1400 by which a source 1403 of exploit data is accessed and manipulated in order to produce attack vector relevance data 1410. In some embodiments, the process 1400 maybe executed by the platform 100 of FIG. 1A on behalf of a given user 102. The vulnerability assessment engine 108, for example, may perform at least a portion of the process 1400. The process 1400, in some embodiments, may rely upon data stored in one of the data stores of the platform 100 such as the customer attributes 106, the service data 111, and/or the capability data 116. Further, the process 1400 may access external data from data resources 132 of FIG. 1A.

According to some embodiments, attack vector relevance data 1410 is used as the attack vector relevance data 1216 (e.g., matrix 1300 of FIG. 13A) that is operated upon in the context of the process 1200 of FIG. 12. Although the source 1403 is depicted in FIG. 14A as a single source, according to some embodiments, the source 1403 represents multiple sources. For example, according to some embodiments, the source 1403 includes a proprietary data source containing data pertaining to cyber insurance claims and digital forensics data (e.g., indicators of attack data, indicators of compromise data, etc.), open source data sources containing data pertaining to cyber vulnerabilities and attacks (e.g., published court proceedings and related information, opens source common vulnerability and exposures data, and other open source intelligence), and/or third party proprietary data sources containing data pertaining to cyber attacks and vulnerabilities (e.g., data sources from Advisen Ltd. of New York, N.Y., Symantec of Mountain View, Calif., Verizon Wireless of New York, N.Y., Significant Cyber Incidents collected by the Center for Strategic & International Studies of Washington, D.C., the Repository of Industrial Security Incidents (RISI) online database (e.g., the Supervisory Control and Data Acquisition (SCADA) systems data) by exida.com LLC, the Web Application Security Consortium/Web-Hacking-Incident-Database available at http://projects.webappsec.org, the Industrial Control Systems Cyber Emergency Response Team (ICS-CERT) database by the Department of Homeland Security, U.S., The SANS State of ICS Security Survey by the SANS Institute, the Kaspersky Security Bulletin by Kaspersky Lab, Mandiant M-Trends Annual Threat Report by FireEye, Inc. of Milpitas, Calif., Microsoft Security Intelligence Reports by Microsoft Corp. of Redmond, Wash., and the Cyber Operations Tracker by the Council on Foreign Relations (CFR) organization of New York, N.Y.). The aforementioned data may be drawn from these various sources and aggregated into exploit data in data source 1403.

In some implementations, the source 1403 is queried by peer group (e.g., characteristics and/or attributes contributing to a peer scheme) to obtain baseline attack vector relevance data 1402, such as relevance matrix 1300 of FIG. 13A. According to some embodiments, the baseline attack vector relevance data scores, Ri, represent the proportion of attacks for a given peer group over a given period of time that were directed through a given vector. Thus, if for a given industry, 17% of attacks were directed through the "malware" attack vector over a given period of time, the threat vector relevance score for "malware" would be 17%.

The baseline threat vector relevance data (matrix 1300 of FIG. 13A), in some implementations, is added to vector relevance adjustment data 1404 in summing operation 1406. The vector relevance adjustment data 1404 is depicted in FIG. 14C as a 1×m matrix 1424 which is the same dimension as the baseline threat vector relevance data 1300 shown in FIG. 13A. The first score adjustment A1 in the vector relevance adjustment data matrix 1404 (e.g., 1424 of FIG. 14D) is an amount that is added to (or if negative, essentially subtracted from) the first attack vector relevance score R1 (1300 of FIG. 13A), the second score adjustment A2 in the vector relevance adjustment data matrix 1404 is an amount that is added to (or if negative, essentially subtracted from) the second attack vector relevance score R1, and so on. The score adjustments, Ai, in matrix 1404 may be calculated as described below.

In the wake of having added the vector relevance adjustment data 1404 to the baseline attack vector relevance data 1402, in some implementations, the output is subjected to a clipping operation 1408, which causes any resulting sum in excess of the maximum vulnerability domain score (e.g., 100%) to be set to the maximum value. For example, if score adjustment A1 were added to baseline attack vector relevance score R1 to arrive at a sum of 122%, it would be "clipped" and reset to 100%. The clipping operation 1408, further, causes any resulting sum that is less than the minimum attack vector relevance score (e.g., 0%) to be set to the minimum value. For example, if score adjustment A1 took on a negative value and when added to baseline attack vector relevance score R1, the sum resulted in a quantity of −17%, it would be "clipped" and reset to the minimum relevance score (e.g., 0%). According to some embodiments, the clipping operation 1408 may be arranged to suppress an adjustment so that a baseline attack vector relevance score R1-Rm could not be adjusted by more than a certain amount. For example, the clipping operation 1408 may be arranged such that the baseline attack vector relevance score may not be increased or decreased by more than 10%.

The result of the combination of matrix addition operation 1406 and clipping operation 1408, in some implementations, is the production of a set of adjusted attack vector relevance data 1410, which may be structured as depicted in matrix 1300 of FIG. 13A, where R1 represents the adjusted attack vector relevance score for the first attack vector (adjusted upwardly or downwardly in view of control systems that the user 102 either employs or lacks, as discussed below), and R2 represents the adjusted attack vector relevance score for the second attack vector, and so on. These adjusted target scores reflect targets that account for not only the attack activity of via a given vector in a given peer group, as revealed through the data in source 1403, but also vulnerabilities or strengths the enterprise's systems may have by virtue of making use of various control systems. The adjusted relevance scores 1410 may be presented via the user interface, such as the user interface 700 of FIG. 7A.

According to some embodiments, the vector adjustment data matrix 1404 is determined as described now. A data store 1412, in some implementations, is queried to determine the identity of particular control systems that a given enterprise's systems employ. Control systems are tools that suppress, detect or otherwise prevent cyber attacks. Network event monitoring tools, firewalls, system event logs, automated patching systems and the like are examples of such control systems. The result of the query is that, for a given enterprise, a controls matrix 1414 is returned. An example of a controls matrix 1414 is depicted in matrix 1420 of FIG. 14B. According to some embodiments, the controls matrix 1414 is of dimension 1×q, where q represents the quantity of control system types that, for a given enterprise, such control system is in use. Thus, control value C1 indicates whether or not a first type of control system is being employed by the enterprise's systems (e.g., a value of 1 indicates employment, while a value of 0 indicates non-employment), control value C2 indicates whether a second type of control system is being employed, and so on.

The controls matrix 1414, in some implementations, is used in combination with a vector sensitivity to controls matrix 1416 to determine the vector relevance adjustment data 1404. An example of a vector sensitivity to controls matrix 1416 is shown in matrix 1422 of FIG. 14C.

The vector sensitivity to controls matrix 1416 is of dimension q×m, where q is equal to the quantity of control system types that the platform determines employment of, and m is equal to the number of attack vectors monitored by the platform. The vector sensitivity to controls matrix 1416 may contain a quantity of q*m sensitivity values. A sensitivity value is a quantity that reveals the extent to which the employment of a given control system suppresses threats originating from a given attack vector. Therefore, a given sensitivity value within the vector sensitivity to controls matrix 1416, Sij, reveals the extent to which the employment of the ith type of control system tends to suppress an attack that is conducted via a the jth attack.

According to some embodiments, the sensitivity values, Sij, take on a range of values where a smaller value (absolute value) indicates little or no suppressive effect of a particular control system upon a cyber attack conducted via a particular attack vector, and a greater value (absolute value) indicates a greater or more direct suppressive effect of a particular control system upon a cyber attack conducted via a particular attack vector. For example, according to some embodiments, Sij could take on values chosen from {0, −0.025, −0.05, −0.075, −0.1}. A value of 0 represents no suppressive effect; a value of −0.025 represents slight suppressive effect; a value of −0.05 represents moderate suppressive effect; a value of −0.075 represents strong suppressive effect; and a value of −0.1 represents a direct suppressive effect. These numbers are negative because a suppressive effect should result in a baseline attack vector relevance score being reduced, as opposed to being increased. Therefore, if Sij was equal to −0.05, this would indicate that the ith type of control system had a moderate suppressive effect upon cyber attacks conducted via the jth attack vector.

The vector relevance adjustment data 1404, in some implementations, is arrived at via a matrix multiplication operation 1418 that multiplies the controls matrix (1×q) 1414 by the sensitivity matrix (q×m) 1416, yielding the vector relevance adjustment matrix (1×m) 1404.

Examining, for example, the first entry (A1) in the example vector relevance adjustment matrix 1424 in FIG. 14D, one can see that A1=C1*S1,1+C2*S2,1+ ... Cq*Sq,1. Assuming an example in which (1) control values Ci took on a value of either 0 (indicating non-employment of control type Ci) or 1 (indicating employment of control type Ci), (2) there were 20 control types (q=20), and (3) sensitivity values, Sij, were chosen from {0, −0.025, −0.05, −0.075, −0.1}, the result is that a given adjustment value could be as small as 0 or as great as −200% (e.g., −200%, if every control value Ci was assigned a value of 1, and every sensitivity value Sij was assigned a value of −0.1). This would mean that any given baseline attack vector relevance value Ri (see matrix 1300 of FIG. 13A) could be decreased by as much as 200 percentage points (all the way to 0%), but never increased. For a given attack vector relevance score, any decrease in its value would be the result of the implementation of a control system that suppressed attacks originating through the particular attack vector.

According to some embodiments, the vector relevance adjustment matrix 1404 can include positive numbers (in addition to negative numbers), which would therefore increase attack vector relevance values because of the failure of the user 102 to implement controls that tended to suppress attacks originating from the particular attack vector. According to these embodiments, the control values Ci in the controls matrix 1414 (e.g., matrix 1422 of FIG. 14B) take on a value of either −1 (indicating non-employment of a corresponding control system type) or +1 (indicating employment of a corresponding control system type). As a result, the adjustment values in the vector relevance adjustment matrix 1404 would be determined by Ai=C1*S1,i+C2*S2,i+ ... Cq*Sq,I, where C1-q took on values of either −1 or +1, q represented the number of control system types, and S1-q,i was a sensitivity value (e.g., 0, −0.025, −0.05, −0.075, or −0.1). According to this example, any particular baseline vector relevance score could be increased or decreased as much as +/−(q*Smaximum_score).

Figure 15:
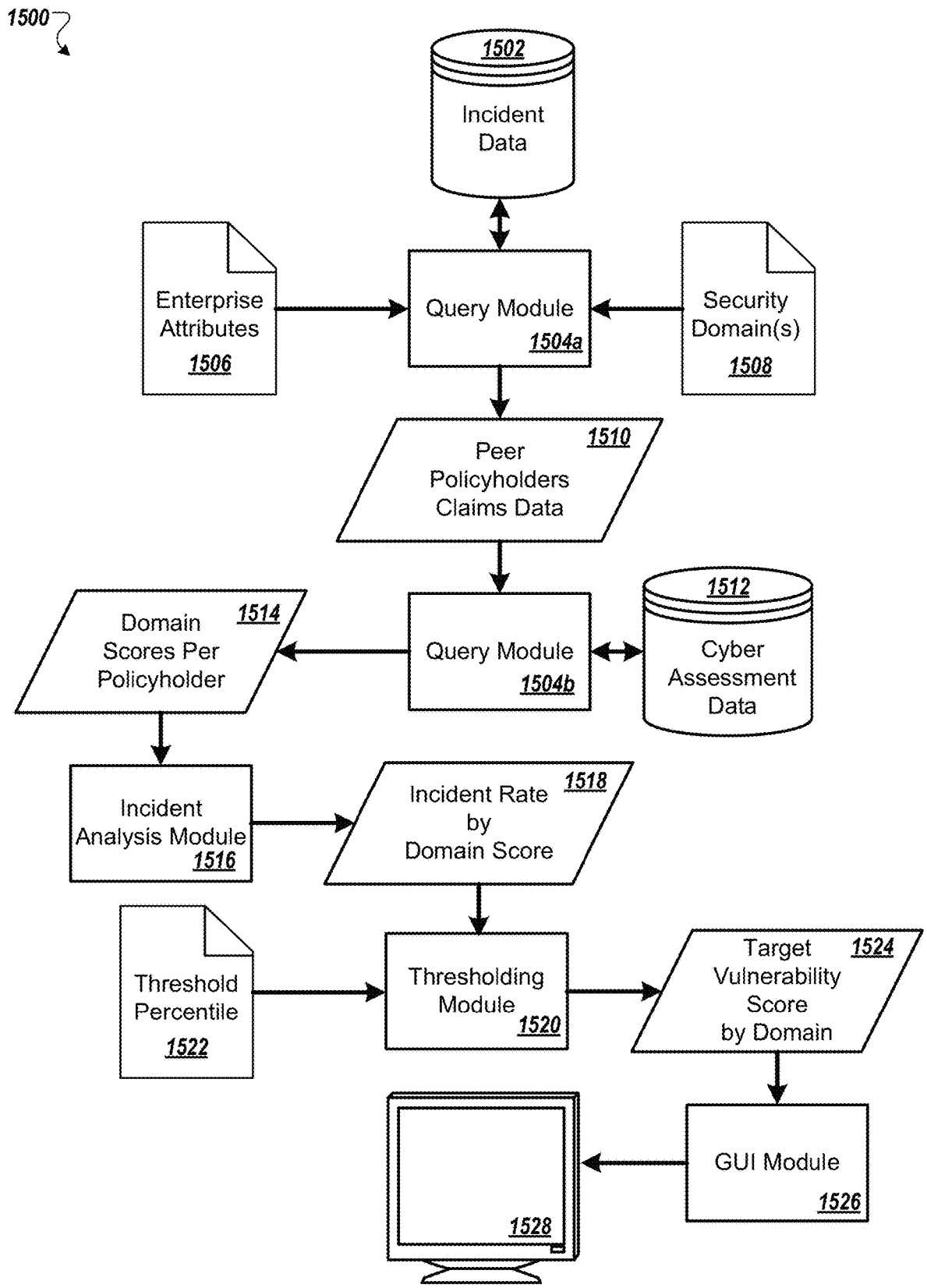
FIG. 15 depicts an operational flow of an example process by which to determine target scores.

FIG. 15 depicts an operational flow diagram of an example process 1500 by which target scores may be determined for each domain. According to some embodiments, the target scores determined by the scheme 1500 of FIG. 15 are used as the baseline target scores 1202 that are subsequently adjusted pursuant to the process 1200 of FIG. 12. In other embodiments, the target scores determined the process 1500 are used without adjustment, and are presented via the user interface, such as the user interface 700 shown in FIG. 7A.

In some implementations, a source of cyber insurance incident data 1502, such as insurance claims data, is queried by a query module 1504a to identify a set of claims 1510 where the policyholder satisfies enterprise attribute data 1506 (such as industry of participation), and where the cyber loss was attributed to a failure within a particular security domain 1508. For example, the query may locate all claims by policyholders in the automotive manufacturing industry where the cyber loss was attributed to a failure within the network security domain. According to some embodiments, data sources other than or in addition to claims data are queried, such as digital forensics data and incident response data.

The query module 1504a, in some embodiments, repeats the query for each security domain identified in the security domain(s) 1508, so that for a given peer group identified using the enterprise attributes 1506, a set of cyber insurance claims pertaining to each security domain 1508 is found. In an illustrative example, for a peer group defined as participation in the factoring industry, a set of all claims arising out of a failure in the network security domain is found, and a set of all claims arising out of a failure in the physical security domain is found, and so on, until one such set is obtained for each security domain. According to some embodiments, the query performed by the query module 1504a is restricted in time, for example to include only claims arising during an insurance policy period of the enterprise.

In some implementations, a query module 1504b (e.g., same as the query module 1504a or a different query module) queries a cyber assessment data source 1512 using the sets of claim data 1510. The query module 1504b, for example, may extract policyholder identification information from the sets of claims data and query the cyber assessment data 1512 using the policyholder identification (e.g., enterprise identification of a customer 102 of the platform 100) to determine the enterprises' respective domain-level vulnerability scores. In illustration, the policyholders may be entities or individuals that have previously used the platform 100 to obtain vulnerability scores, and to obtain cyber insurance brokerage services in the wake of having received their scores. Therefore, according to the illustration, the cyber vulnerability scores of these populations of policyholders are available to the platform 100 by virtue of having previously scored their cyber vulnerability pursuant to schemes described herein. As mentioned previously herein, the vulnerability scores may be useful in the context of not only brokering insurance, but also in the context of underwriting.

Figure 16:
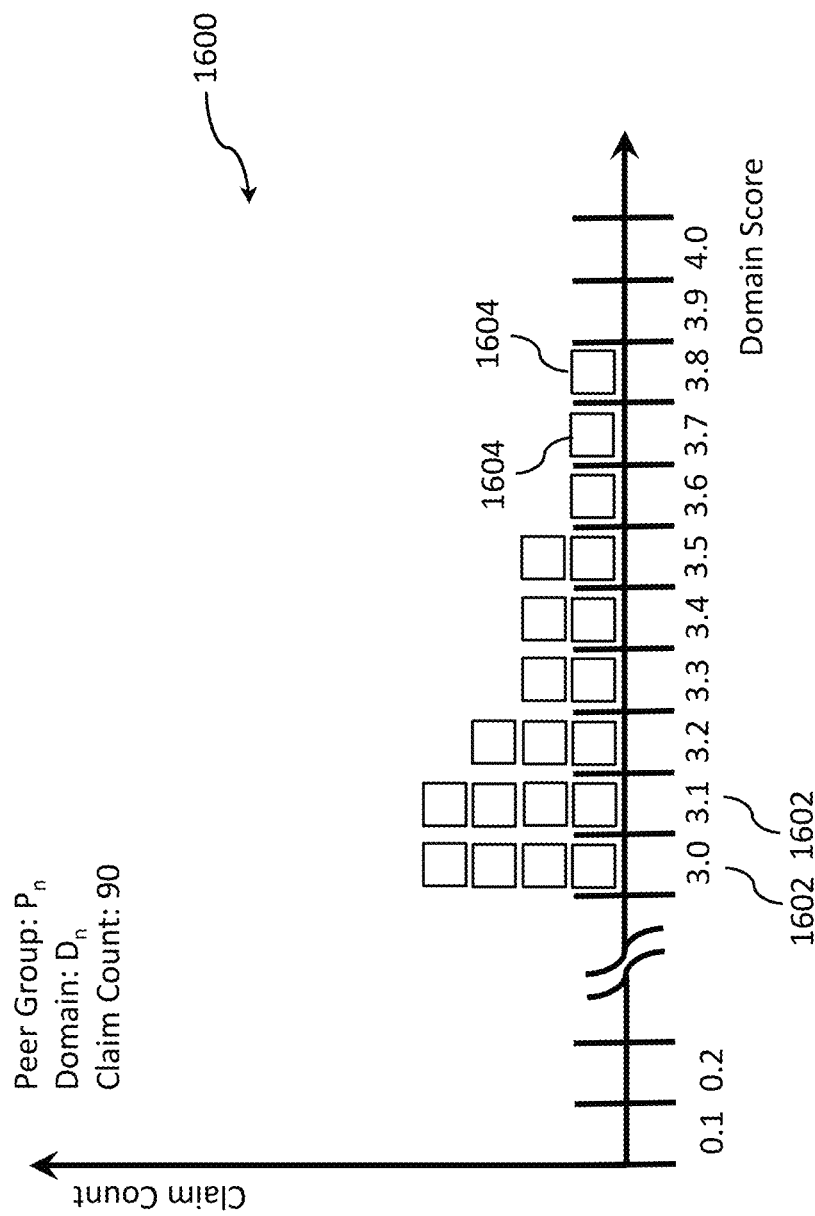
FIG. 16 depicts an example organization of peer score data.

In some implementations, an incident analysis module 1516 determines a claim incident rate by domain score 1518 for each domain 1508. The incident analysis module 1516, for example, may arrange the vulnerability scores 1514 so that for the particular peer group and a particular security domain of the security domains 1508, a vulnerability score corresponding to a threshold percentile of claim incidents may be determined. Turn to FIG. 16, for example, and assume that a threshold of 90th percentile was chosen, and further assume that peer group Pn and security domain Dn was under consideration. FIG. 16 depicts a histogram 1600, where domain score categories 1602 (only some of which are identified with reference numerals, in order to eliminate visual clutter) are arranged along the x-axis of the histogram 1600. Claim count is measured along the y-axis.

Each category 1602 contains a number of square icons 1604 (again, only some of which are identified for the sake of visual clarity) corresponding to the number of cyber insurance claims filed within peer group Pn, where the policyholder has a vulnerability score equal to that associated with the category 1602 for security domain Dn. Therefore, in the example histogram 1600 of FIG. 16, there were four claims 1604*a* filed by policyholders in peer group Pn having a vulnerability score of 3.0 1602*a* for security domain Dn. Similarly, there were two claims 1604*d* filed by policyholders in peer group Pn having a vulnerability score of 3.3 1602*d* for security domain Dn.

Looking at FIG. 16, one can see that if a chosen threshold percentile was the 90th percentile, for example, and if a total of 90 claims had been filed by policyholders in peer group Pn because of a loss arising out of a failure within security domain Dn, then if one were to have a vulnerability score of 3.3 1602*d* for security domain Dn, then one would be at the 90th percentile of the group of claimants in terms of security scores earned in security domain Dn. Stated another way, 90% of the claimants had a security score lower than a 3.3. Thus, 3.3 could be selected as the target score, based upon an example threshold of 90%.

In some implementations, a thresholding module 1520 applies a threshold percentile 1522 to find the particular score within the incident rate by domain score data 1518 required for a particular security domain and peer group, so that a chosen percentage of the claimants identified by the threshold percentile 1522 would have scored less than the aforementioned particular score. The aforementioned particular score is then designated the target score in a target score per domain data set 1524 for the particular peer group and security domain under consideration.

In some implementations, a GUI module 1526 arranges the target vulnerability scores by domain 1524 for presentation at a user interface 1528.

The process 1500 has been discussed with reference to finding target scores for security domains. According to some embodiments, however, the same process 1500 is employed to find target scores for subdomains and the overall composite vulnerability score.

Figure 20:
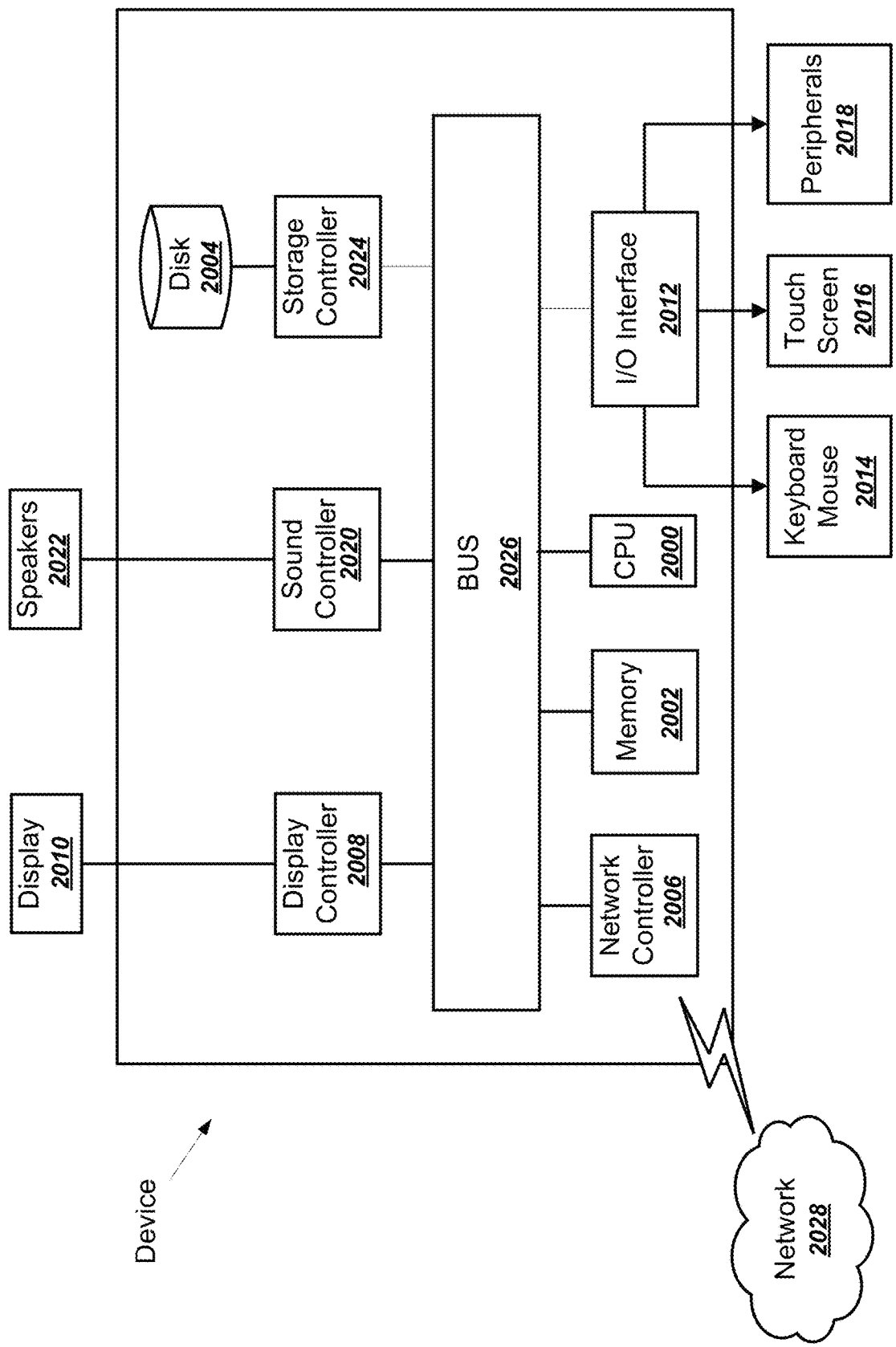
FIGS. 20 and 21 illustrate example computing systems on which the processes described herein can be implemented.
Figure 21:
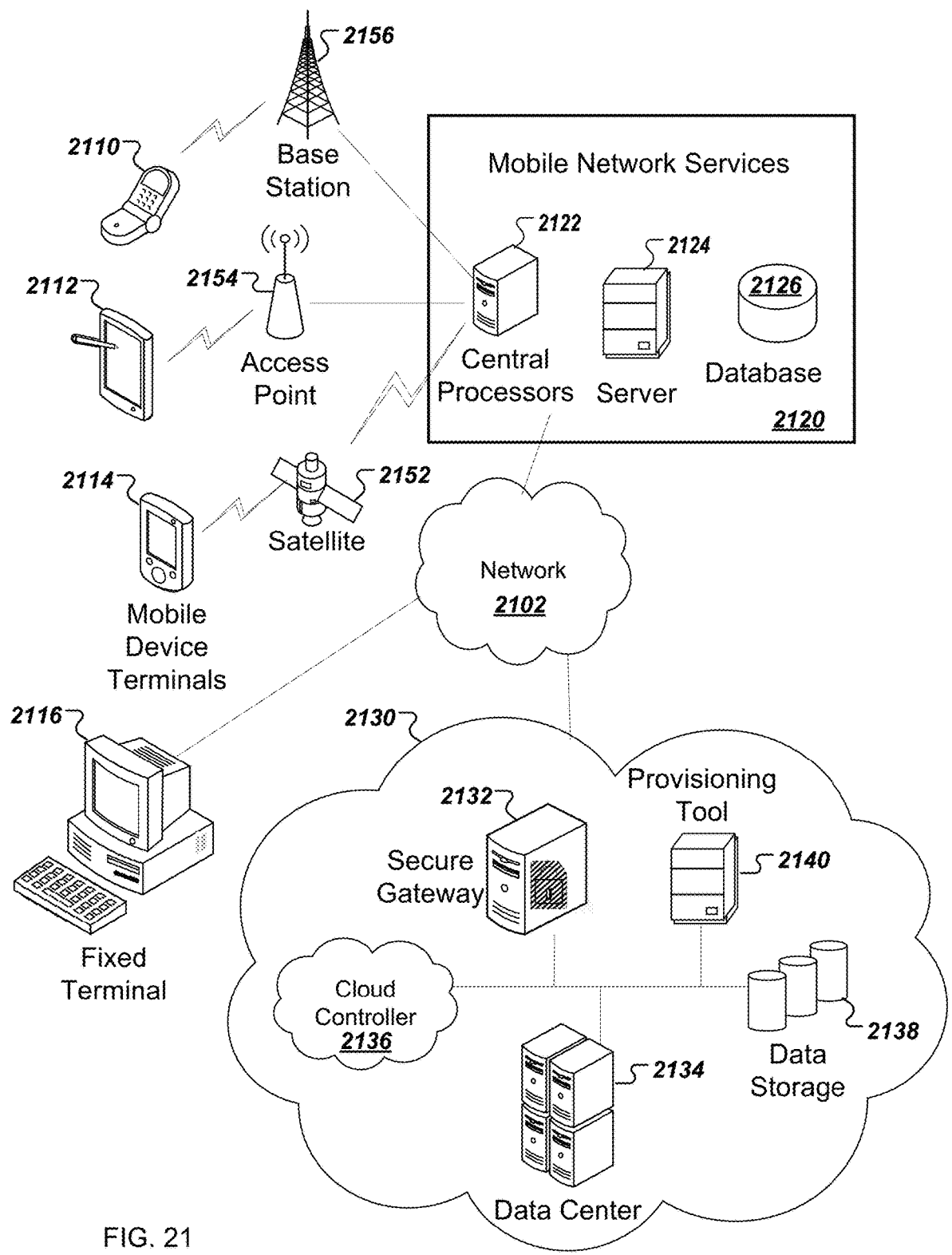

Next, a hardware description of the computing device, mobile computing device, or server according to exemplary embodiments is described with reference to FIG. 20. The computing device, for example, may represent the platform 100, the capability partners 114, the customers 102, the distribution partners 104, the carriers 118, the portable computing device(s) 113, and/or the data centers 128 of FIG. 1A. In FIG. 20, the computing device, mobile computing device, or server includes a CPU 2000 which performs the processes described above. The process data and instructions may be stored in memory 2002. The processing circuitry and stored instructions may enable the computing device to perform, in some examples, at least portions of the process 150 of FIG. 1B, the method 300 of FIG. 3, the method 600 of FIG. 6, the method 800 of FIG. 8, the method 900 of FIG. 9, the method 1100 of FIG. 11, the method 1200 of FIG. 12, the method 1400 of FIG. 14, the method 1500 of FIG. 15, and/or the method 1700 of FIG. 17. These processes and instructions may also be stored on a storage medium disk 2004 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer. The storage medium disk 2004, in some examples, may store the contents of the capability data 116, customer attributes 106, application data 120, service data 111, and/or claims data 126 of the platform 100 of FIG. 1A, memory components of the data centers 128 of FIG. 1A, the data store 152 of FIG. 1B, the data structure of FIG. 2, the data stores 802 of FIG. 8, the peer scheme data 1102 and/or platform data 1110 of FIG. 11, the source data 1212 of FIG. 12, the data store 1412 and/or source data 1405 of FIG. 14A, the incident data 1502 and/or cyber assessment data 1512 of FIG. 15, and/or the peer scores 1904 and/or remedies 1906 of FIG. 19.

Further, a portion of the claimed advancements may be provided as a utility application, background daemon, or component of an operating system, or combination thereof, executing in conjunction with CPU 2000 and an operating system such as Microsoft Windows 9, UNIX, Solaris, LINUX, Apple MAC-OS and other systems known to those skilled in the art.

CPU 2000 may be a Xenon or Core processor from Intel of America or an Opteron processor from AMD of America, or may be other processor types that would be recognized by one of ordinary skill in the art. Alternatively, the CPU 2000 may be implemented on an FPGA, ASIC, PLD or using discrete logic circuits, as one of ordinary skill in the art would recognize. Further, C P U 2000 may be implemented as multiple processors cooperatively working in parallel to perform the instructions of the inventive processes described above.

The computing device, mobile computing device, or server in FIG. 20 also includes a network controller 2006, such as an Intel Ethernet PRO network interface card from Intel Corporation of America, for interfacing with network 2028. As can be appreciated, the network 2028 can be a public network, such as the Internet, or a private network such as an LAN or WAN network, or any combination thereof and can also include PSTN or ISDN sub-networks. The network 2028 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known. The network 2028, for example, may support communications between the platform 100 and the capability partners 114, customers 102, distribution partners 104, carriers 118, mobile devices 113, resources 132, and/or data centers 128 of FIG. 1A. The network 2028, in another example, may support communications between the query module 804 and the data stores 802 of FIG. 8 and/or the query modules 1104*a,b* and the peer scheme data 1102 and/or platform data 1110 of FIG. 11, as well as communications between the GUI module 1120 and a computing device driving the display 1122 of FIG. 11. Further, the network 2028 may support communications between the query modules 1504*a,b* of FIG. 15 and the incident data 1502 and cyber assessment data 1512, as well as between the GUI module 1526 and a computing device driving the display 1528.

The computing device, mobile computing device, or server further includes a display controller 2008, such as a NVIDIA GeForce GTX or Quadro graphics adaptor from NVIDIA Corporation of America for interfacing with display 2010, such as a Hewlett Packard HPL2445w LCD monitor. A general purpose I/O interface 2012 interfaces with a keyboard and/or mouse 2014 as well as a touch screen panel 2016 on or separate from display 2010. General purpose I/O interface also connects to a variety of peripherals 2018 including printers and scanners, such as an OfficeJet or DeskJet from Hewlett Packard. The display controller 2008 and display 2010 may enable presentation of the user interfaces illustrated, in some examples, in FIGS. 4A-4B, FIGS. 5A-5D, FIGS. 7A-7H and/or FIGS. 18A-18C.

A sound controller 2020 is also provided in the computing device, mobile computing device, or server, such as Sound Blaster X-Fi Titanium from Creative, to interface with speakers/microphone 2022 thereby providing sounds and/or music.

The general purpose storage controller 2024 connects the storage medium disk 2004 with communication bus 2026, which may be an ISA, EISA, VESA, PCI, or similar, for interconnecting all of the components of the computing device, mobile computing device, or server. A description of the general features and functionality of the display 2010, keyboard and/or mouse 2014, as well as the display controller 2008, storage controller 2024, network controller 2006, sound controller 2020, and general purpose I/O interface 2012 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 17, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the described herein may interface with a cloud computing environment 2130, such as Google Cloud Platform™ to perform at least portions of methods or algorithms detailed above. The processes associated with the methods described herein can be executed on a computation processor, such as the Google Compute Engine by data center 2134. The data center 2134, for example, can also include an application processor, such as the Google App Engine, that can be used as the interface with the systems described herein to receive data and output corresponding information. The cloud computing environment 2130 may also include one or more databases 2138 or other data storage, such as cloud storage and a query database. In some implementations, the cloud storage database 2138, such as the Google Cloud Storage, may store processed and unprocessed data supplied by systems described herein. For example, the capability data 116, customer attributes 106, application data 120, service data 111, and/or claims data 126 of the platform 100 of FIG. 1A, memory components of the data centers 128 of FIG. 1A, the data store 152 of FIG. 1B, the data structure of FIG. 2, the data stores 802 of FIG. 8, the peer scheme data 1102 and/or platform data 1110 of FIG. 11, the source data 1212 of FIG. 12, the data store 1412 and/or source data 1405 of FIG. 14A, the incident data 1502 and/or cyber assessment data 1512 of FIG. 15, and/or the peer scores 1904 and/or remedies 1906 of FIG. 19 may be maintained in a database structure such as the databases 2138.

The systems described herein may communicate with the cloud computing environment 2130 through a secure gateway 2132. In some implementations, the secure gateway 2132 includes a database querying interface, such as the Google BigQuery platform. The data querying interface, for example, may support access by the vulnerability management tool 112 and/or learning engine 130 of FIG. 1A, the query module 804 of FIG. 8A, the query modules 1104*a-c* of FIG. 11, and/or the query modules 1504*a,b* of FIG. 15.

The cloud computing environment 2130 may include a provisioning tool 2140 for resource management. The provisioning tool 2140 may be connected to the computing devices of a data center 2134 to facilitate the provision of computing resources of the data center 2134. The provisioning tool 2140 may receive a request for a computing resource via the secure gateway 2132 or a cloud controller 2136. The provisioning tool 2140 may facilitate a connection to a particular computing device of the data center 2134.

A network 2102 represents one or more networks, such as the Internet, connecting the cloud environment 2130 to a number of client devices such as, in some examples, a cellular telephone 2110, a tablet computer 2112, a mobile computing device 2114, and a desktop computing device 2116. The network 2102 can also communicate via wireless networks using a variety of mobile network services 2120 such as Wi-Fi, Bluetooth, cellular networks including EDGE, 3G, 4G, and 5G wireless cellular systems, or any other wireless form of communication that is known. In some examples, the wireless network services 2120 may include central processors 2122, servers 2124, and databases 2126. In some embodiments, the network 2102 is agnostic to local interfaces and networks associated with the client devices to allow for integration of the local interfaces and networks configured to perform the processes described herein. Additionally, external devices such as the cellular telephone 2110, tablet computer 2112, and mobile computing device 2114 may communicate with the mobile network services 2120 via a base station 2156, access point 2154, and/or satellite 2152.

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A method for conducting a cyber security vulnerability assessment of an enterprise, the method comprising:
    preparing, by processing circuitry for presentation to a first authorized representative of two or more authorized representatives of the enterprise at a first remote computing device, a first interactive survey user interface comprising a plurality of questions regarding one or more technology systems of the enterprise, wherein
        each question of the plurality of questions is logically linked, in a non-volatile storage region, to a respective security domain of a set of security domains, the set of security domains comprising at least two of a data security domain, a cloud and network security domain, a physical security domain, and an application security domain, and
        each question of the plurality of questions is logically linked, in the non-volatile storage region, to at least two answer options, each answer option corresponding to a respective answer score of at least two predetermined answer scores;
    obtaining, by the processing circuitry from the first authorized representative via the first interactive survey user interface, a first set of answers to a portion of the plurality of questions;
    storing, by the processing circuitry to the non-volatile storage region, each answer of the first set of answers logically linked to a corresponding question of the plurality of questions;
    preparing, by the processing circuitry for presentation to a second authorized representative of the two or more authorized representatives at a second remote computing device, a second interactive survey user interface comprising the plurality of questions wherein, for each question of the portion of the plurality of questions, a corresponding answer of the first set of answers is presented in the second interactive survey user interface;
    obtaining, by the processing circuitry from the second authorized representative via the second interactive survey user interface, a second set of answers to a remaining portion of the plurality of questions;
    storing, by the processing circuitry to the non-volatile storage region, each answer of the second set of answers logically linked to a corresponding question of the plurality of questions;
    for each security domain of the set of security domains, calculating, by the processing circuitry, a respective domain-level score representing aggregated predetermined answer scores from a respective subset of answers of a plurality of answers logically linked to the respective security domain, wherein the plurality of answers comprises the first set of answers and the second set of answers;

identifying, by the processing circuitry for each security domain of the set of security domains, one or more attack vectors relevant to the enterprise based on at least one of the domain-level score and the subset of answers of the plurality of answers corresponding to the respective security domain, wherein the one or more attack vectors each represent a respective mechanism of cyber exploitation;

for each security domain of the set of security domains, applying, by the processing circuitry for each attack vector of the one or more attack vectors, the domain-level score and/or one or more answers of the subset of answers corresponding to the respective security domain to calculate a respective sensitivity of the enterprise to the mechanism of cyber exploitation of the respective attack vector;

for each security domain of the set of security domains, determining, by the processing circuitry based on the one or more attack vectors of the respective security domain and further on the respective sensitivity, at least one cost estimate associated with the one or more attack vectors; and preparing, by the processing circuitry for presentation in a report, an overview of cost estimates associated with the set of security domains.

2. The method of claim 1, wherein calculating the respective domain-level scores comprises applying, to a portion of the plurality of answers of at least one domain of the set of security domains, a weight to the associated answer score of the respective answer.

3. The method of claim 1, wherein the two or more authorized representatives comprise a field agent of a cyber security vulnerability assessment service provider.

4. The method of claim 3, further comprising preparing, by the processing circuitry for presentation to the field agent at a third remote computing device, a field agent user interface comprising the plurality of questions.

5. The method of claim 4, wherein the field agent user interface comprises at least one input control for adding information different from the information available within the plurality of questions and/or the plurality of answers, wherein the at least one input control is unavailable in the first interactive survey user interface and the second interactive survey user interface.

6. The method of claim 1, wherein the overview of cost estimates comprises at least one cyber insurance cost.

7. The method of claim 1, wherein the overview of cost estimates comprises a plurality of recommended mitigations to cyber security risk, wherein each recommended mitigation comprises a respective cost estimate.

8. The method of claim 7, wherein each mitigation of the plurality of recommended mitigations is associated with a corresponding urgency of application of the respective mitigation.

9. The method of claim 7, wherein each mitigation of the plurality of recommended mitigations is associated with a number of risks mitigated by the respective mitigation.

10. The method of claim 7, wherein one or more mitigations of the plurality of recommended mitigations is dependent upon first applying another mitigation of the plurality of recommended mitigations.

11. The method of claim 1, wherein the overview of cost estimates further comprises an expert commentary section including analysis entered by a field agent of a cyber security vulnerability assessment service provider via a field agent user interface comprising the plurality of questions and the plurality of answers.

12. A system for assessing cyber security risk exposure of an enterprise, the system comprising:

at least one non-transitory computer readable storage configured to store an array of question data, each question of the array of question data comprising question text, wherein each question of the array of question data is logically linked to a respective cyber security domain of a plurality of cyber security domains, and each question of the array of question data is logically linked to at least two response selections, each response selection being logically linked to a respective response value of at least two response values, and an array of answer data, each answer of the array of answer data being logically linked to a respective response value of the at least two response values of a corresponding question of the array of question data, wherein each response value is logically linked to a relative risk exposure; and a platform comprising software and/or hardware logic configured, when executed, to perform operations comprising obtaining, from at least two users of a plurality of users, at least two sets of answers to a plurality of questions presented in a cyber security questionnaire associated with the enterprise, wherein obtaining the respective sets of answers comprises preparing, for presentation to the respective user at a computing device of the respective user, an interactive user interface presenting at least a portion of the plurality of questions, each question presenting the question text of a respective question of the array of question data, receiving, via the interactive user interface, a respective set of answers of the at least two sets of answers, wherein each user of the at least two users is associated with the enterprise, and preparing the interactive user interface comprises presenting, for each question already answered in the respective set of answers of the at least two sets of answers, the answer entered corresponding to the respective question, and storing, to the at least one non-transitory computer readable storage, each answer of the at least two sets of answers logically linked to a corresponding question of the plurality of questions;

for each cyber security domain of the plurality of cyber security domains, calculating a domain-level exposure value using the response values logically linked to each answer obtained in the at least two sets of answers corresponding to a question of the plurality of questions logically linked to the respective cyber security domain, identifying, for each domain of the plurality of cyber security domains, one or more attack vectors relevant to the enterprise based on at least one of the domain-level exposure value and the answers corresponding to the respective cyber security domain, wherein the one or more attack vectors each represent a respective mechanism of cyber exploitation, for each cyber security domain of the plurality of cyber security domains, applying, for each attack vector of the one or more attack vectors, the domain-level exposure value and/or one or more answers of a subset of answers corresponding to the respective cyber security domain to calculate a respective sensitivity of the enterprise to the mechanism of cyber exploitation of the respective attack vector;

for each cyber security domain of the plurality of cyber security domains, estimating, based on the one or more attack vectors of the respective cyber security domain and further on the respective sensitivity, at least one cost associated with the one or more attack vectors, and preparing a report for the enterprise comprising a plurality of cost estimations associated with the plurality of cyber security domains.

13. The system of claim 12, wherein:

the at least one non-transitory computer readable storage is configured to store user identification data representing the plurality of users, wherein the user identification data comprises a plurality of user identifiers; and each set of answers of the at least two sets of answers is associated with a respective user identifier of the user identification data.

14. The system of claim 12, wherein:

each cyber security domain of the plurality of cyber security domains is associated with a respective set of domain-level categories of a plurality of domain-level categories; and each question of the array of question data corresponds to a respective domain level category of the respective cyber security domain.

15. The system of claim 12, wherein:

preparing the report comprises preparing an interactive report comprising
  the domain-level exposure value of each domain of the plurality of cyber security domains, and
  at least one control for adjusting the domain-level exposure value associated with a given domain of the plurality of cyber security domains; and the operations comprise
  receiving, from a remote computing system via the interactive report, adjustment of a first control of the at least one control, and
  adjusting, responsive to an updated value of the corresponding domain of the plurality of cyber security domains, at least one cost estimation of the plurality of cost estimations.

16. The system of claim 15, wherein the plurality of cost estimations comprises at least one cyber security insurance cost.

17. The system of claim 12, wherein each cost estimation of at least a portion of the plurality of cost estimations is associated with a respective implementation time.

18. The system of claim 12, wherein each cost estimation of at least a portion of the plurality of cost estimations is associated with a respective service provider.

19. The system of claim 12, the plurality of cost estimations comprises cost estimations for each product and/or service of a plurality of products and/or services for mitigating the cyber security risk exposure.

20. The system of claim 19, wherein the plurality of products and/or services are arranged in the report according to a respective impact on the cyber security risk exposure.

* * * * *